(12) United States Patent
Baek et al.

(10) Patent No.: US 11,387,938 B2
(45) Date of Patent: Jul. 12, 2022

(54) BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

(71) Applicant: LG ELECTRONICS INC., Seoul (KR)

(72) Inventors: Jongseob Baek, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 54 days.

(21) Appl. No.: 16/304,573

(22) PCT Filed: May 24, 2016

(86) PCT No.: PCT/KR2016/005499
§ 371 (c)(1),
(2) Date: Nov. 26, 2018

(87) PCT Pub. No.: WO2017/204376
PCT Pub. Date: Nov. 30, 2017

(65) Prior Publication Data
US 2019/0305886 A1    Oct. 3, 2019

(51) Int. Cl.
*H04L 1/00* (2006.01)
*H04L 1/06* (2006.01)
(Continued)

(52) U.S. Cl.
CPC .............. *H04L 1/0059* (2013.01); *H04L 1/00* (2013.01); *H04L 1/0071* (2013.01); *H04L 1/065* (2013.01);
(Continued)

(58) Field of Classification Search
CPC ......... H04L 1/0059; H04L 1/00; H04L 29/06; H04L 27/26; H04L 5/00; H04L 1/0071;
(Continued)

(56) References Cited

U.S. PATENT DOCUMENTS

2011/0131464 A1   6/2011  Ko et al.
2012/0327879 A1  12/2012  Stadelmeier et al.
(Continued)

FOREIGN PATENT DOCUMENTS

KR   10-2013-0040951 A   4/2013
KR   10-2016-0003756 A   1/2016
KR   10-2016-0030498 A   3/2016

*Primary Examiner* — Albert Decady
*Assistant Examiner* — Osman M Alshack
(74) *Attorney, Agent, or Firm* — Dentons US LLP

(57) ABSTRACT

A broadcast signal reception method, according to one embodiment of the present invention, may comprise the steps of: receiving a broadcast signal, demodulating the received broadcast signal by an orthogonal frequency-division multiplexing (OFDM) method, parsing at least one signal frame from the demodulated broadcast signal, convolutionally deinterleaving data in the at least one parsed signal frame, block deinterleaving the convolutionally deinterleaved data, cell deinterleaving the block deinterleaved data, and decoding the cell deinterleaved data.

14 Claims, 28 Drawing Sheets

(51) Int. Cl.
*H04L 5/00* (2006.01)
*H04L 9/40* (2022.01)
*H04L 27/26* (2006.01)

(52) U.S. Cl.
CPC ............. *H04L 5/00* (2013.01); *H04L 5/0007* (2013.01); *H04L 27/26* (2013.01); *H04L 29/06* (2013.01)

(58) Field of Classification Search
CPC ... H04L 1/065; H04L 5/0007; H04L 27/0002; H04L 27/14; H04L 27/22; H04L 1/0065; H04L 47/806; H04L 12/18; H04L 12/1845; H04L 29/06455; H04L 29/12292; H03M 13/6325
USPC .............................. 714/766; 398/66; 329/311
See application file for complete search history.

(56) References Cited

U.S. PATENT DOCUMENTS

| | | | |
|---|---|---|---|
| 2014/0198874 A1* | 7/2014 | Kim | H04L 1/0631 375/295 |
| 2014/0198875 A1* | 7/2014 | Kim | H04L 5/0007 375/295 |
| 2014/0294002 A1* | 10/2014 | Kim | H04L 27/2613 370/390 |
| 2014/0314177 A1* | 10/2014 | Choi | H04L 1/0065 375/296 |
| 2014/0334570 A1* | 11/2014 | Baek | H04L 27/2649 375/295 |
| 2015/0020143 A1* | 1/2015 | Kim | H04N 21/2365 725/118 |
| 2015/0063491 A1* | 3/2015 | Kim | H04L 27/2649 375/295 |
| 2015/0139353 A1* | 5/2015 | Baek | H04L 27/2647 375/295 |
| 2015/0304070 A1* | 10/2015 | Baek | H04L 65/607 375/295 |
| 2015/0349871 A1* | 12/2015 | Baek | H04L 27/12 375/267 |
| 2015/0358034 A1* | 12/2015 | Baek | H03M 13/6541 714/776 |
| 2016/0056922 A1* | 2/2016 | Baek | H03M 13/1102 375/267 |

* cited by examiner

FIG. 4
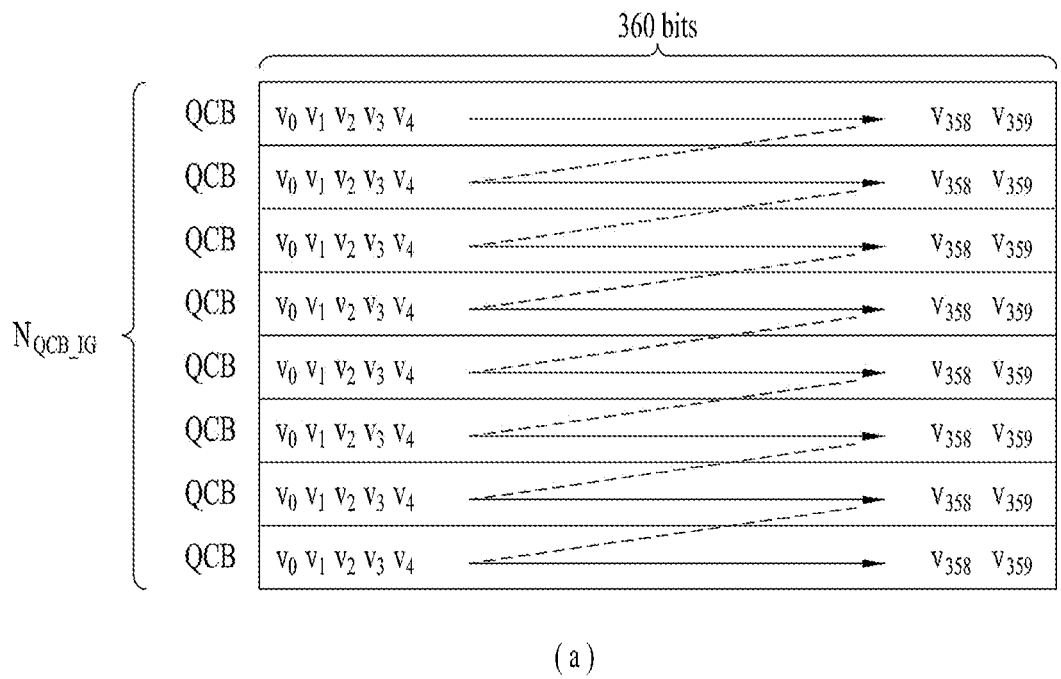
(a)
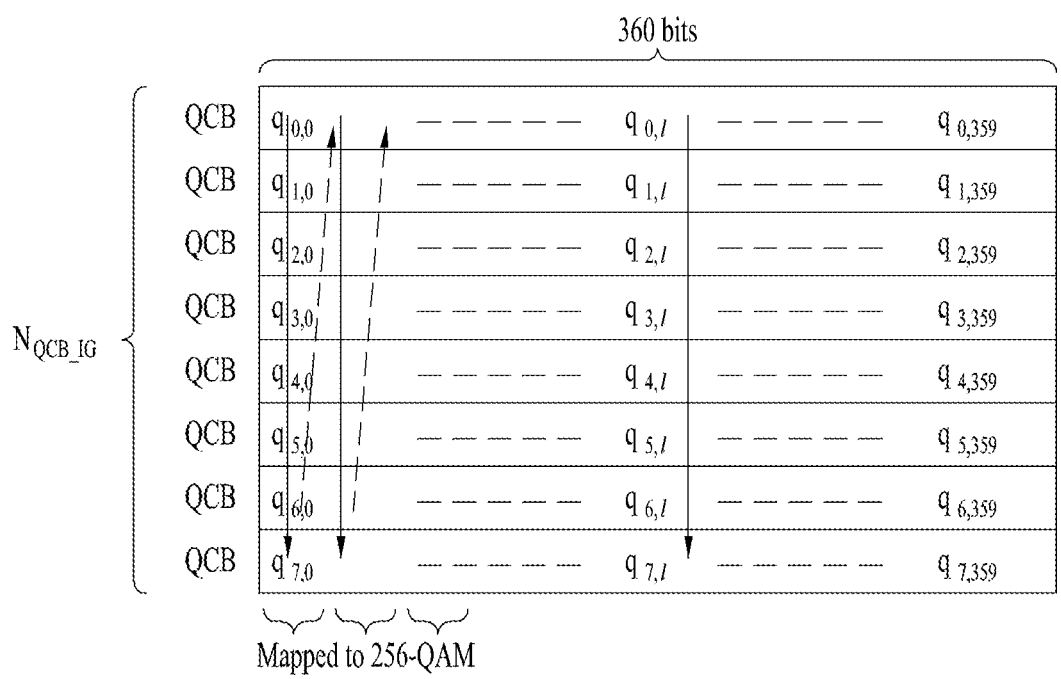
(b)

FIG. 9

FIG. 14
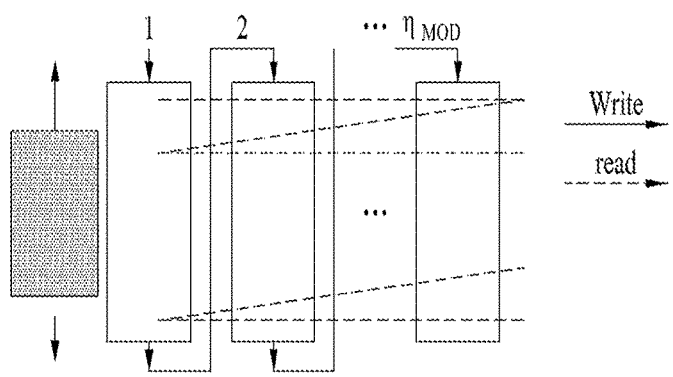
(a)
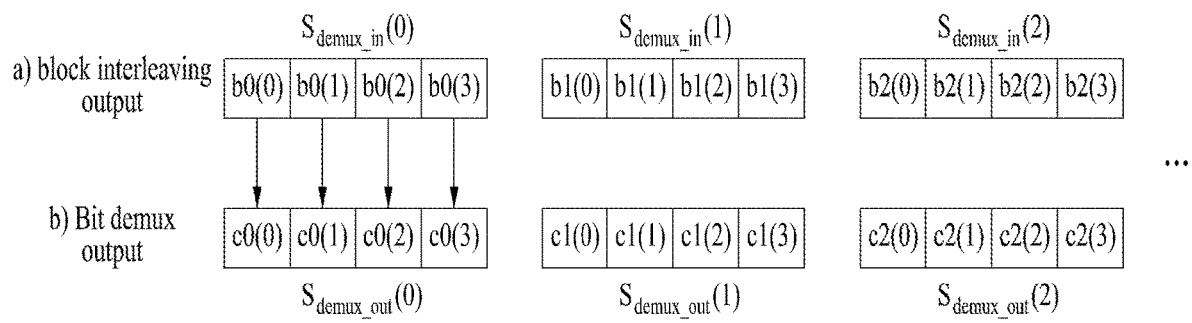
(b)

FIG. 15

| Syntax | # of bits | Format |
|---|---|---|
| L1_Basic_signaling( ) { | | |
|     L1B_version | 3 | uimsbf |
|     L1B_mimo_scattered_pilot_encoding | 1 | uimsbf |
|     L1B_lls_flag | 1 | uimsbf |
|     L1B_time_info_flag | 2 | uimsbf |
|     L1B_return_channel_flag | 1 | uimsbf |
|     L1B_papr | 2 | uimsbf |
|     L1B_frame_length_mode | 1 | uimsbf |
|     if( L1B_frame_length_mode=0 ) { | | |
|         L1B_frame_length | 10 | uimsbf |
|         L1B_excess_samples_per_symbol | 13 | uimsbf |
|     } else { | | |
|         L1B_time_offset | 16 | uimsbf |
|         L1B_additional_samples | 7 | uimsbf |
|     } | | |
|     L1B_num_subframes | 8 | uimsbf |
|     L1B_preamble_num_symbols | 3 | uimsbf |
|     L1B_preamble_reduced_carriers | 3 | uimsbf |
|     L1B_L1_Detail_content_tag | 2 | uimsbf |
|     L1B_L1_Detail_size_bytes | 13 | uimsbf |
|     L1B_L1_Detail_fec_type | 3 | uimsbf |
|     L1B_L1_Detail_additional_parity_mode | 2 | uimsbf |
|     L1B_L1_Detail_total_cells | 19 | uimsbf |
|     L1B_first_sub_mimo | 1 | uimsbf |
|     L1B_first_sub_miso | 2 | uimsbf |
|     L1B_first_sub_fft_size | 2 | uimsbf |
|     L1B_first_sub_reduced_carriers | 3 | uimsbf |
|     L1B_first_sub_guard_interval | 4 | uimsbf |
|     L1B_first_sub_num_ofdm_symbols | 11 | uimsbf |
|     L1B_first_sub_scattered_pilot_pattern | 5 | uimsbf |
|     L1B_first_sub_scattered_pilot_boost | 3 | uimsbf |
|     L1B_first_sub_sbs_first | 1 | uimsbf |
|     L1B_first_sub_sbs_last | 1 | uimsbf |
|     L1B_reserved | 48 | uimsbf |
|     L1B_crc | 32 | uimsbf |
| } | | |

FIG. 16

| Syntax | # of bits | Format |
|---|---|---|
| L1_Detail_signaling( ) { | | |
|   L1D_version | 4 | uimsbf |
|   L1D_num_rf | 3 | uimsbf |
|   for (L1D_rf_id=1 .. L1D_num_rf) { | | |
|     L1D_rf_frequency | 19 | uimsbf |
|   } | | |
|   if (L1B_time_info_flag != 00) { | | |
|     L1D_time_sec | 32 | uimsbf |
|     L1D_time_msec | 10 | uimsbf |
|     if (L1B_time_info_flag != 01) { | | |
|       L1D_time_usec | 10 | uimsbf |
|       if (L1B_time_info_flag != 10) { | | |
|         L1D_time_nsec | 10 | uimsbf |
|       } | | |
|     } | | |
|   } | | |
| | | |
|   for (i=0 .. L1B_num_subframes) { | | |
|     if (i > 0) { | | |
|       L1D_mimo | 1 | uimsbf |
|       L1D_miso | 2 | uimsbf |
|       L1D_fft_size | 2 | uimsbf |
|       L1D_reduced_carriers | 3 | uimsbf |
|       L1D_guard_interval | 4 | uimsbf |
|       L1D_num_ofdm_symbols | 11 | uimsbf |
|       L1D_scattered_pilot_pattern | 5 | uimsbf |
|       L1D_scattered_pilot_boost | 3 | uimsbf |
|       L1D_sbs_first | 1 | uimsbf |
|       L1D_sbs_last | 1 | uimsbf |
|     } | | |
|     if (L1B_num_subframes>0) { | | |
|       L1D_subframe_multiplex | 1 | uimsbf |
|     } | | |

FIG. 17

| Syntax | # of bits | Format |
|---|---|---|
| L1D_frequency_interleaver | 1 | uimsbf |
| if(((i=0)&&(L1B_first_sub_sbs_first || L1B_first_sub_sbs_last)) || | | |
| ((i>0)&&(L1D_sbs_first | L1D_sbs_last))) { | | |
|     L1D_sbs_null_cells | 13 | uimsbf |
| } | | |
| L1D_num_plp | 6 | uimsbf |
| | | |
| for (j=0 .. L1D_num_plp) { | | |
|     L1D_plp_id | 6 | uimsbf |
|     L1D_plp_lls_flag | 1 | uimsbf |
|     L1D_plp_layer | 2 | uimsbf |
|     L1D_plp_start | 24 | uimsbf |
|     L1D_plp_size | 24 | uimsbf |
|     L1D_plp_scrambler_type | 2 | uimsbf |
|     L1D_plp_fec_type | 4 | uimsbf |
|     if(L1D_plp_fec_type I {0,1,2,3,4,5}) { | | |
|         L1D_plp_mod | 4 | uimsbf |
|         L1D_plp_cod | 4 | uimsbf |
|     } | | |
|     L1D_plp_TI_mode | 2 | uimsbf |
|     if(L1D_plp_TI_mode=00) { | | |
|         L1D_plp_fecframe_start | 15 | uimsbf |
|     } else if(L1D_plp_TI_mode=01) { | | |
|         L1D_plp_CTI_fecframe_start | 22 | uimsbf |
|     } | | |
|     if(L1D_num_rf>0) { | | |
|         L1D_plp_num_channel_bonded | 3 | uimsbf |
|         if(L1D_plp_num_channel_bonded>0) { | | |
|             L1D_plp_channel_bonding_format | 2 | uimsbf |
|             for (k=0..L1D_plp_num_channel_bonded){ | | |
|                 L1D_plp_bonded_rf_id | 3 | uimsbf |
|             } | | |
|         } | | |
|     } | | |

FIG. 18

| Syntax | # of bits | Format |
|---|---|---|
| if (i=0 && L1B_first_sub_mimo=1) \|\| (i >1 && L1D_mimo=1) { | | |
|     L1D_plp_mimo_stream_combining | 1 | uimsbf |
|     L1D_plp_mimo_IQ_interleaving | 1 | uimsbf |
|     L1D_plp_mimo_PH | 1 | uimsbf |
| } | | |
| if (L1D_plp_layer=0) { | | |
|     L1D_plp_type | 1 | uimsbf |
|     if (L1D_plp_type=1) { | | |
|         L1D_plp_num_subslices | 14 | uimsbf |
|         L1D_plp_subslice_interval | 24 | uimsbf |
|     } | | |
|     if (((L1D_plp_TI_mode=01) \|\| | | |
|     (L1D_plp_TI_mode=10))&&(L1D_plp_mod=0000)) { | | |
|         L1D_plp_TI_extended_interleaving | 1 | uimsbf |
|     } | | |
|     if (L1D_plp_TI_mode=01) { | | |
|         L1D_plp_CTI_depth | 3 | uimsbf |
|         L1D_plp_CTI_start_row | 11 | uimsbf |
|     } else if (L1D_plp_TI_mode=10) { | | |
|         L1D_plp_HTI_inter_subframe | 1 | uimsbf |
|         L1D_plp_HTI_num_ti_blocks | 4 | uimsbf |
|         L1D_plp_HTI_num_fec_blocks_max | 12 | uimsbf |
|         if (L1D_plp_HTI_inter_subframe=0) { | | |
|             L1D_plp_HTI_num_fec_blocks | 12 | uimsbf |
|         } else { | | |
|             for (k=0..L1D_plp_HTI_num_ti_blocks) { | | |
|                 L1D_plp_HTI_num_fec_blocks | 12 | uimsbf |
|             } | | |
|         } | | |
|         L1D_plp_HTI_cell_interleaver | 1 | uimsbf |
|     } | | |
| } else { | | |
|     L1D_plp_ldm_injection_level | 5 | uimsbf |
|     } | | |
|   } | | |
| } | | |
| L1D_reserved | as needed | uimsbf |
| L1D_crc | 32 | uimsbf |
| } | | |

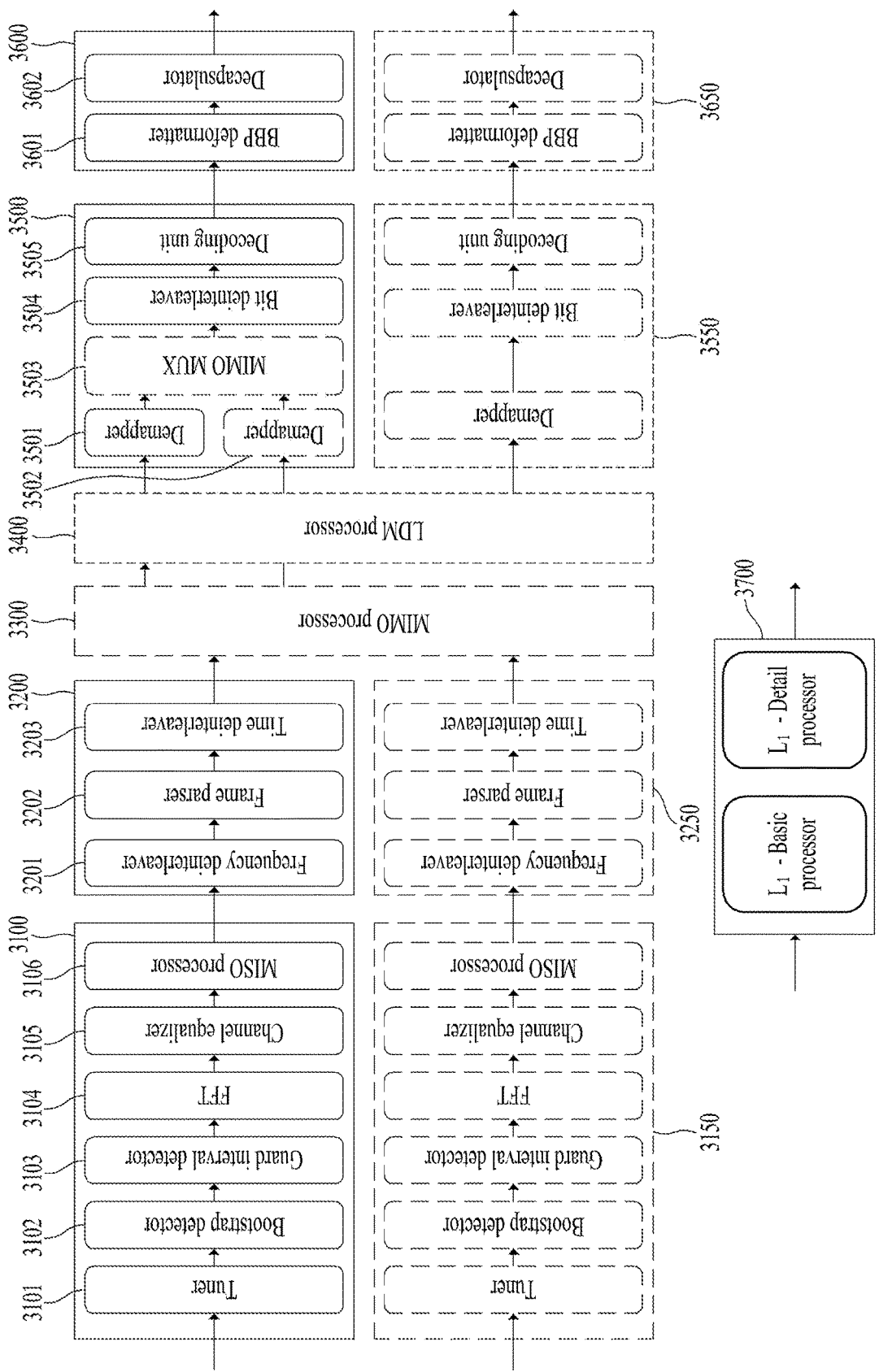

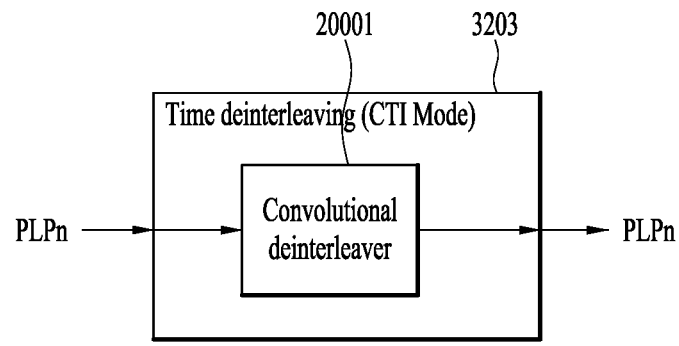
FIG. 20(a)
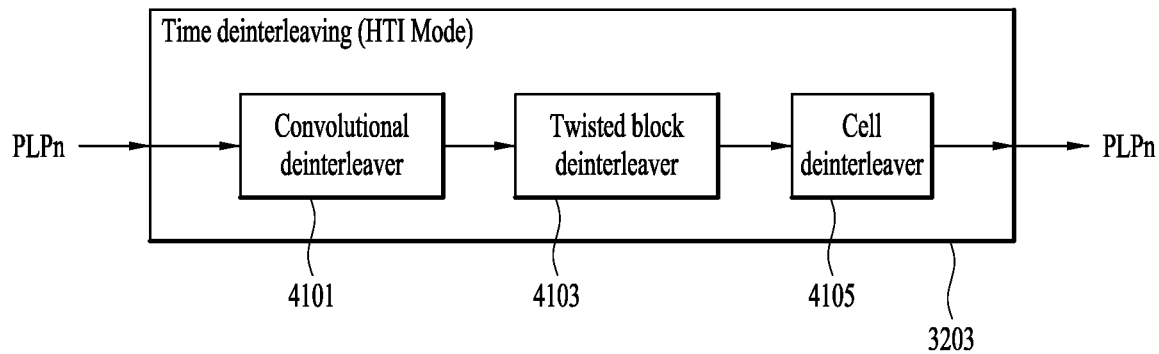
FIG 20(b)
FIG. 21
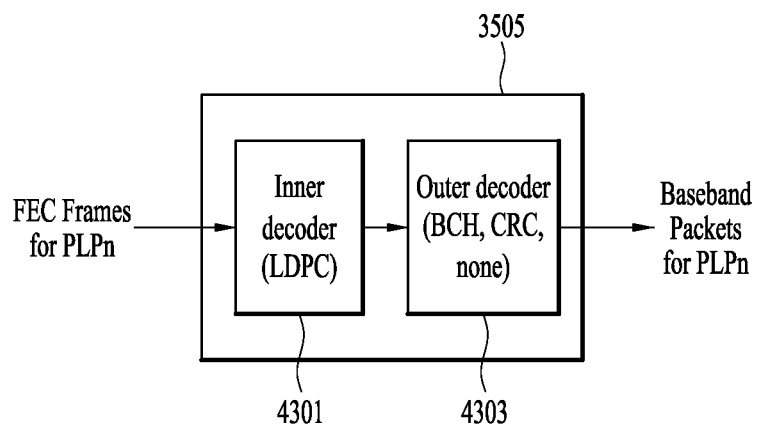

BROADCAST SIGNAL TRANSMISSION DEVICE, BROADCAST SIGNAL RECEPTION DEVICE, BROADCAST SIGNAL TRANSMISSION METHOD, AND BROADCAST SIGNAL RECEPTION METHOD

This application is the National Phase of PCT/KR2016/005499 filed on May 24, 2016, which is hereby expressly incorporated by reference into the present application.

TECHNICAL FIELD

The present invention relates to a broadcast signal transmission apparatus, a broadcast signal reception apparatus, and broadcast signal transmission and reception methods.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

That is, a digital broadcast system can provide HD (high definition) images, multichannel audio and various additional services. However, data transmission efficiency for transmission of large amounts of data, robustness of transmission/reception networks and network flexibility in consideration of mobile reception equipment need to be improved for digital broadcast.

An object of the present invention is to provide a broadcast signal transmission apparatus, a broadcast signal transmission method, a broadcast signal reception apparatus, and a broadcast signal reception method, which are intended to improve network flexibility considering data transmission efficiency for a lot of data transmission, robustness of a transmission and reception network, and a mobile reception apparatus.

Technical Solution

To achieve the aforementioned object and other advantages, a broadcast signal reception method according to one embodiment of the present invention comprises the steps of receiving a broadcast signal, demodulating the received broadcast signal by an orthogonal frequency-division multiplexing (OFDM) method, parsing at least one signal frame from the demodulated broadcast signal, convolutionally deinterleaving data in the at least one parsed signal frame, block deinterleaving the convolutionally deinterleaved data, cell deinterleaving the block deinterleaved data; and decoding the cell deinterleaved data.

Advantageous Effects

The present invention may provide various broadcast services by processing data in accordance with service property and controlling Quality of Service (QoS) for each service or service component.

The present invention may achieve transmission flexibility by transmitting various broadcast services through the same radio frequency (RF) signal bandwidth.

The present invention may improve data transmission efficiency and transmission and reception robustness of a broadcast signal by using a Multiple-Input Multiple-Output (MIMO) system.

According to the present invention, a digital broadcast signal may be received without any error even though a mobile reception apparatus is used or even in case of an indoor environment.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a diagram illustrating one embodiment of a block interleaving procedure of a type B according to the present invention;

FIG. 9 is a diagram illustrating another embodiment of a block interleaving procedure of a hybrid time interleaver according to the present invention;

FIG. 14(*a*) is a diagram illustrating one embodiment of a block interleaving procedure of L1 signaling data according to the present invention;

FIG. 14(*b*) is a diagram illustrating one embodiment of a bit demultiplexing procedure of L1 signaling data according to the present invention;

FIG. 15 is a diagram illustrating one embodiment of a syntax structure of L1-Basic signaling data of L1 signaling data according to the present invention;

FIGS. 16 to 18 are diagrams illustrating one embodiment of a syntax structure of L1-Detail signaling data of L1 signaling data according to the present invention;

FIG. 19 is a schematic block diagram illustrating one embodiment of a reception system according to the present invention;

FIG. 20(a) and FIG. 20(b) are schematic block diagrams illustrating one embodiment of a time deinterleaver of a CTI mode and a time deinterleaver of an HTI mode according to the present invention;

FIG. 21 is a schematic block diagram illustrating one embodiment of a decoding unit within a reverse BICM unit of a reception system according to the present invention;

BEST MODE FOR CARRYING OUT THE INVENTION

Figure 1:
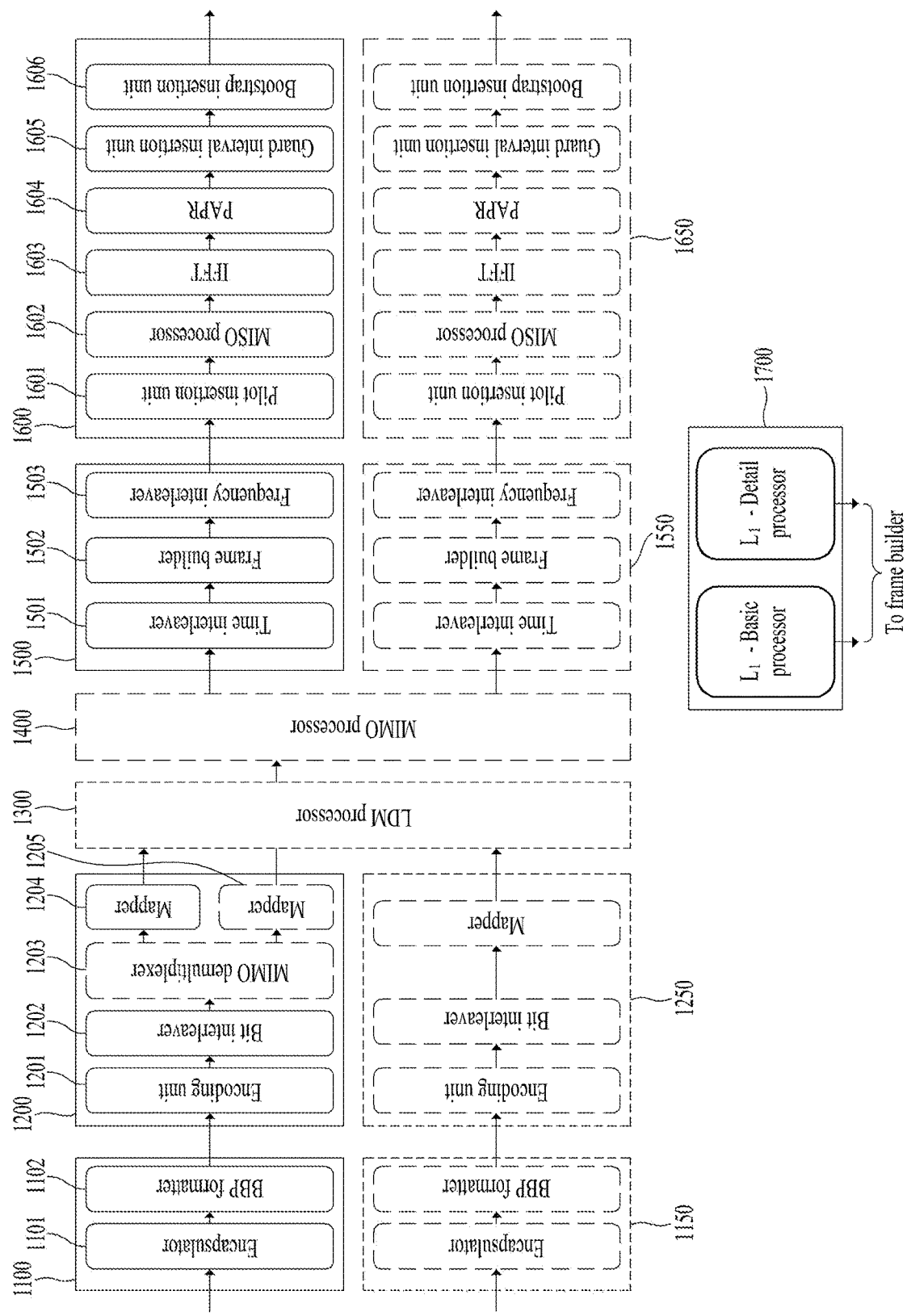
FIG. 1 is a schematic block diagram illustrating a transmission system according to the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services.

Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

Hereinafter, for convenience of description, although the MISO or MIMO scheme uses two antennas, the present invention may be applied to a system that uses two or more antennas.

The present invention suggests a physical profile (or system) optimized to minimize receiver complexity while achieving throughput required for a specific purpose of use.

Also, the present invention may process a broadcast signal for future broadcast services by using at least one of a Time Division Multiplexing (TDM) scheme, a Frequency Division Multiplexing (FDM) scheme, and a Layered Division Multiplexing (LDM) scheme.

According to one embodiment of the present invention, the MIMO scheme and the LDM scheme are not used together when a broadcast signal for future broadcast services is processed. This is one embodiment, and the MIMO scheme and the LDM scheme may be used together.

In the present invention, the number of transmission subcarriers (NoC) is the number of entire subcarriers that may be transmitted from OFDM symbols depending on FFT size and mode, and the number of useful data subcarriers is the number of subcarriers that may transmit data except pilot and null cell and reserved tone from the entire subcarriers of the OFDM symbols.

In one embodiment of the present invention, three types of FFT sizes, that is, 8K, 16K, and 32K are used.

Also, in the present invention, a Data Pipe (DP) is a basic unit for robustness control, and one or more services or service components may be delivered to one data pipe. That is, the data pipe is a logical channel in a physical layer for delivering service data or related meta data that may deliver one or more services or service components. In the present invention, a physical layer pipe (PLP) is a physical path used as the same concept as the aforementioned DP, and its title may be changed depending on intention of a designer.

Also, in the present invention, a signal frame (or frame or A3 frame or physical layer frame) is categorized into three regions, wherein a first region located at the front of the signal frame is referred to as a bootstrap (or bootstrap region), a second region next to the first region is referred to as a preamble (or preamble region), and a third region next to the second region is referred to as a data region.

Bootstrap data are included in the bootstrap region, and L1 (Layer 1) signaling data (or L1 control signaling data) applicable to the other of this frame are included in the preamble region. The data region is again divided into one or more subframes. If a plurality of subframes exist in one signal frame, the plurality of subframes are concatenated together in time. One subframe includes a set of time-frequency resources in the signal frame.

The L1 signaling data provides information required to configure physical layer parameters. The L1 signaling data includes L1-Basic signaling data and L1-Detail signaling data. At this time, the bootstrap data may be included in the L1 signaling data. Information and/or data included in each region will be described later in detail.

In the information included in the L1 signaling data which will be described later, information starting from L1B is included in L1-Basic signaling data, and information starting from L1D is included in L1-Detail signaling data in accordance with one embodiment of the present invention.

Transmission System

FIG. 1 illustrates a broadcast signal transmission apparatus (or transmission system) of a physical layer according to one embodiment of the present invention.

The broadcast signal transmission apparatus of FIG. 1 includes a first input formatting unit 1100, a first bit interleaved coding & modulation (BICM) unit 1200, a first frame builder 1300, a first orthogonal frequency division multiplexing (OFDM) generation unit 1600, and an L1 signaling processor 1700.

The broadcast signal transmission apparatus of FIG. 1 may further include a second input formatting unit 1150 and an LDM processor 1300. These units are blocks additionally required when the LDM scheme is applied to the present invention.

The broadcast signal transmission apparatus of FIG. 1 may further include a MIMO processor 1400 and a second OFDM generation unit 1650. These units are blocks additionally required when the MIMO scheme is applied to the present invention.

That is, the second input formatting unit 1150 and the LDM processor 1300 are used only in the LDM scheme, and a MIMO demultiplexer 1203 and a second mapper 1205 of the first BICM unit 1200, the MIMO processor 1400 and the second OFDM generation unit 1650 are used only in the MIMO scheme. The first input formatting unit 1100, the other blocks except the MIMO demultiplexer 1203 and the second mapper 1205 from the first BICM unit 1200, the first frame builder 1300, and the first OFDM generation unit 1600 are commonly used in the LDM scheme and the MIMO scheme. The aforementioned blocks may be omitted in accordance with intention of the designer, or may be replaced with other blocks having similar or identical functions thereto.

In one embodiment, the first input formatting unit 1100 includes an encapsulator 1101 and a BBP formatter 1102. Although not shown, the first input formatting unit 1100 may further include a scheduler. In one embodiment, the scheduler controls the BBP formatter 1102.

In the present invention, data input to the encapsulator 1101 may be IP stream/packet and MPEG2-TS, and the other stream types are dealt with generic streams.

The encapsulator 1101 encapsulates all types of input packets including IP packet and MPEG-TS packet as a packet of a single format. In the present invention, this packet will be referred to as an ATSC Link-Layer Protocol (ALP) packet. The ALP packet is one example for assisting understanding of the present invention, and may be referred to as another name in accordance with a designer.

Each ALP packet includes a header and a payload, and an input packet is included in a payload of at least one ALP packet. At this time, one input packet may be included in a payload of one ALP packet, or may be divided into a plurality of input packets and then included in a payload of the plurality of ALP packets or the plurality of input packets may be included in a payload of one ALP packet. The header of the ALP packet always includes a base header, and may further include an additional header and an optional header. The base header has a fixed length (e.g., 2 bytes), and includes information indicating a type or protocol of the input packet before the input packet is packetized to a corresponding ALP packet.

At this time, if the input packets are IP packets, a header of the IP packets may be compressed and then encapsulated in at least one ALP packet to reduce overhead of the IP packets. Also, after TS null packets are identified from streams comprised of TS packets and the TS null packets and then deleted, the other packets may be encapsulated in at least one ALP packet. At this time, in one embodiment, information for identifying the number of the deleted TS null packets may be transmitted to a receiver. In the present invention, as one embodiment, the information for identifying the number of the deleted TS null packets is transmitted by being signaled to a deleted null packets field in a header of a corresponding ALP packet.

In one embodiment, a length of each ALP packet is variable, and length information is signaled to a header of a corresponding ALP packet.

At this time, the encapsulator 1101 may be provided in a higher layer, for example, a link layer. In this case, the encapsulator 1101 is omitted in the physical layer, and the BBP formatter 1102 receives ALP packets provided in the link layer as one embodiment.

The BBP formatter 1102 generates a baseband packet by adding a BBP header to a BBP payload that includes at least one ALP packet. In one embodiment of the present invention, scrambling is performed for the generated baseband packet. The scrambling is also referred to as randomizing.

The baseband packet also includes a header and a payload, wherein the header includes a base field, and may further include an optional field and an extension field.

At this time, the ALP packets are allocated to the payload of the baseband packet in an input order as one embodiment. If the number of input ALP packets is not enough to fill the corresponding baseband packet, padding may be used to completely fill the corresponding baseband packet. To this end, information for identifying whether padding has been used for the corresponding baseband packet is signaled to the header of the corresponding baseband packet as one embodiment.

Also, since one ALP packet may be split to two or more baseband packets, starting of the payload of the baseband packet does not always mean starting of the ALP packet. To this end, the base field of the baseband packet signals starting position information of the first ALP packet that starts from the baseband packet by using a pointer field as one embodiment. As one embodiment, a value of the pointer field is offset (byte unit) from the start of the payload of the baseband to the start of the first ALP packet starting from the baseband packet.

The base field further includes a mode field that indicates whether the length of the base field is 1 byte or 2 bytes. If the mode field indicates that the length of the base field is 1 byte, a pointer field comprised of 7 lower bits and 6 higher bits is included next to the mode field. If the mode field indicates that the length of the base field is 2 bytes, a pointer field comprised of 7 lower bits and 6 higher bits and an optional field indicator (OFI) field of 2 bits are included next to the mode field. The OFI field indicates a header extension mode of the corresponding baseband packet, and signals whether to include an optional field and an extension field.

For example, if a value of the OFI field is 01 (that is, short extension mode) or 10 (that is, long extension mode), an EXT TYPE field value of the optional field is set to 111, whereby the extension field may be used only for padding.

In one embodiment, encapsulation and BBP formatting operation in the first input formatting unit 1100 is performed independently per PLP.

In the present invention, since the second input formatting unit 1150 is configured in the same manner as the first input formatting unit 1100, the second input formatting unit 1150 will be understood with reference to the detailed description of the first input formatting unit 1100 and its detailed description will be omitted.

The baseband packets subjected to scrambling in the first input formatting unit 1100 are input to the first BICM unit 1200 and subjected to forward error correction (FEC) encoding, bit interleaving, and symbol mapping (or constellation mapping) in due order.

To this end, the first BICM unit 1200 includes an encoding unit 1201, a bit interleaver 1202, and a first mapper 1204. If the MIMO scheme is applied to the present invention, the MIMO demultiplexer 1203 and the second mapper 1205 are further provided.

At this time, the first BICM unit 1200 is performed per PLP. That is, FEC encoding, bit interleaving and symbol mapping are independently applied to each PLP.

Figure 2:
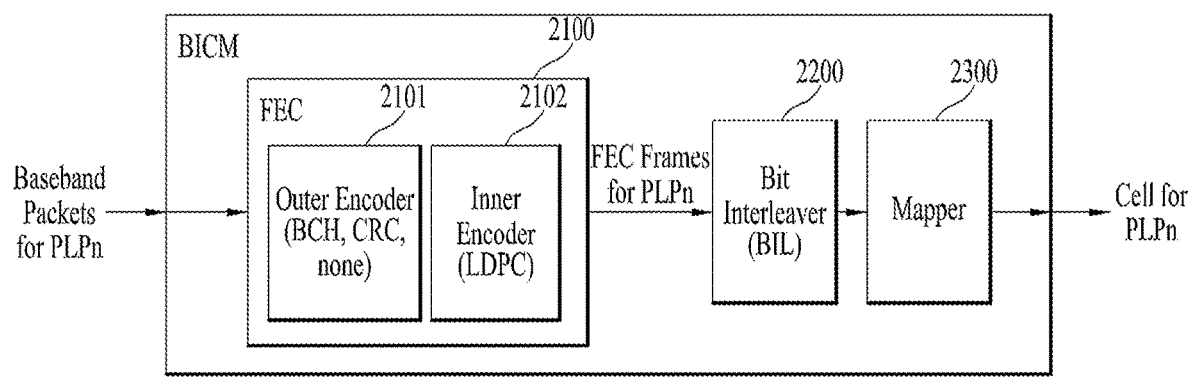
FIG. 2 is a detailed schematic block diagram illustrating one embodiment of a BICM unit for a specific PLP according to the present invention.

FIG. 2 is a detailed block diagram illustrating one embodiment of a BICM unit for an nth PLP (PLPn).

In FIG. 2, the encoding unit 2100 generates an FEC frame by performing FEC encoding for an input baseband packet generated for the nth PLP from the first input formatting unit 1100.

At this time, the encoding unit 2100 includes an outer encoder 2101 and an inner encoder 2102. The outer encoder 2101 may have three options. That is, BCH encoding may be performed for data of the input baseband packet, CRC encoding may be performed the same, or outer encoding may not be performed for the same. In this case, BCH encoding provides an error correction function and an error detection function, and CRC encoding provides an error detection function only. If BCH encoding is performed, an outer code parity of 192 bits (that is, when FEC frame length is 64800 bits) or 168 bits (that is, when FEC frame length is 16200 bits) is added to the baseband packet. If CRC encoding is performed, an outer code parity of 32 bits is added to the baseband packet.

The inner encoder 2102 employs cyclic-structured LDPC codes as one embodiment. That is, the outer encoder 2101 generates an inner code parity by performing LDPC encoding for data subjected to BCH encoding or data subjected to CRC encoding or data bypassing the outer encoder 2101 at a specific code rate. In the present invention, a code rate applied for LDPC encoding is one of 2/15, 3/15, 4/15, 5/15, 6/15, 7/15, 8/15, 9/15, 10/15, 11/15, 12/15, and 13/15 as one embodiment. Particularly, in one embodiment, when the FEC frame length is 16K, LDPC encoding is performed at any one of code rates 6/15, 7/15, 9/15, 11/15, and 13/15, and when the FEC frame length is 64K, LDPC encoding is performed at a code rate 10/15.

If outer encoding is performed by the outer encoder 2101 to generate an outer code parity, the inner code parity is added next to the outer code parity, and if outer encoding is not performed, the inner code parity is added next to the baseband packet. That is, the outer of the inner encoder 2102 may be the FEC frame, wherein the FEC frame may include one baseband packet, an outer code parity and an inner code parity, or may include one baseband packet and an inner code parity.

At this time, one FEC frame includes one baseband packet as one embodiment, and has a length of 64800 bits or 16200 bits. This means that a size of the FEC frame is determined by a code length (that is, 16200 bits or 64800 bits) only. One baseband packet has a fixed length of Kpayload size, wherein the length is determined by an inner code rate selected for the corresponding PLP, a code length, and an outer code type (that is, BCH encoding, CRC encoding, None) as one embodiment.

The inner encoder 2102 employs two types of coding structures, type A and type B, wherein the type A achieves better throughput at a low code rate, whereas the type B achieves better throughput at a high code rate. For example, if the FEC frame length corresponds to 64800 bits, the type A may be applied to the code rates 2/15, 3/15, 4/15, 5/15, and 7/15, and the type B may be applied to the code rates 6/15, 8/15, 9/15, 10/15, 11/15, 12/15, and 13/15. For another example, if the FEC frame length corresponds to 16200 bits, the type A may be applied to the code rates 2/15, 3/15, 4/15, and 5/15, and the type B may be applied to the code rates 6/15, 7/15, 8/15, 9/15, 10/15, 11/15, 12/15, and 13/15.

The data of the FEC frame generated by the inner encoder 2102 are output to the bit interleaver 2200.

The bit interleaver 2200 includes a parity interleaver, a group-wise interleaver, and a block interleaver.

In one embodiment, the parity interleaver performs interleaving for only input parity bits of the FEC frame, and does not perform interleaving for information bits. Also, the parity interleaver is not used for LDPC codes of the type A but used for LDPC codes of the type B. This is one embodiment, the parity interleaver may be used for LDPC codes of the type A but may not be used for LDPC codes of the type B. Alternatively, the parity interleaver may be used for both of the LDPC codes of the type A and the type B. The parity interleaver is performed to convert a parity part of a staircase structure of an LDPC parity-check matrix to a quasi-cyclic structure similar to an information part of the matrix.

The parity interleaved bits of the FEC frame are split into a plurality of groups and then interleaved by a group-wise interleaver on a group basis based on a permutation order for group-wise interleaving. At this time, each group includes 360 bits as one embodiment.

The data (that is, LDPC codewords) group interleaved by the group-wise interleaver are output to the block interleaver and then block interleaved.

At this time, the block interleaving is performed by selection of one from a type A block interleaver and a type B block interleaver as one embodiment. At this time, selection of the type A block interleaver or the type B block interleaver is determined by LDPC type and constellation combinations.

Figure 3:
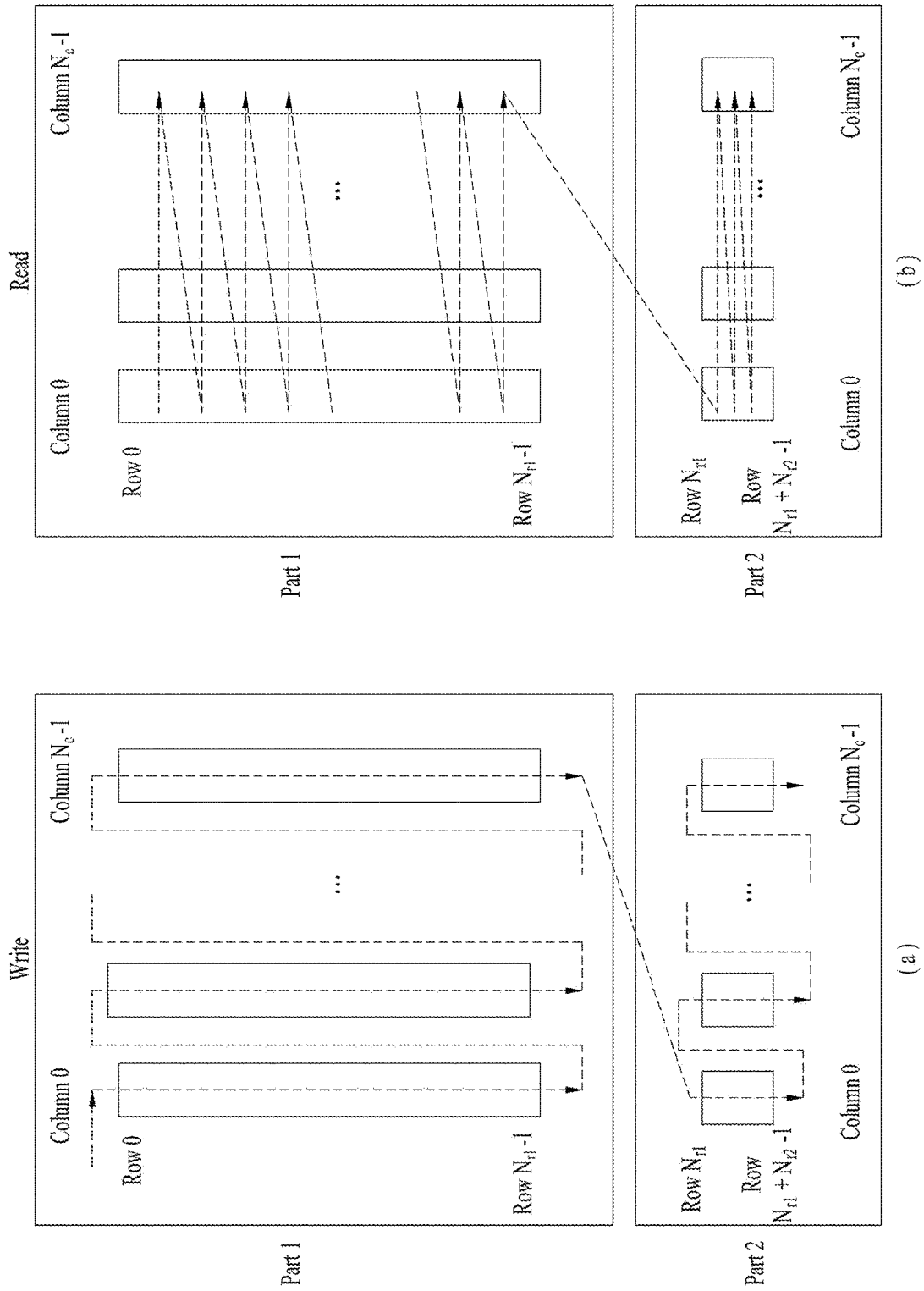
FIG. 3 is a diagram illustrating one embodiment of a block interleaving procedure of a type A according to the present invention.

FIG. 3(*a*) and FIG. 3(*b*) illustrate a block interleaving procedure of the type A, wherein FIG. 3(*a*) illustrates that LDPC codewords are written in a memory, and FIG. 3(*b*) illustrates that the LDPC codewords written in the memory are read.

In the type A block interleaver, the memory includes a part 1 and a part 2. At this time, the part 1 and the part 2 are calculated using information of a row size and bit group size (e.g., 360) of the block interleaver. In the part 1, bits constituting a bit group are written in the same row as shown in FIG. 3(*a*), and if writing is completed in the part 1, the bits constituting the bit group are written over at least two rows in the part 2. Meanwhile, when the bits are read from the memory after writing is completed in the memory, the bits are read in a column direction as shown in FIG. 3(*b*). As a result, the bits read in the same column direction are mapped into one modulation cell.

FIG. 4(*a*) and FIG. 4(*b*) illustrate a block interleaving procedure of the type B, particularly illustrating a block interleaving procedure of the type B when a modulation order is 256QAM. In this case, FIG. 4(*a*) illustrates that LDPC codewords are written in a memory, and FIG. 4(*b*) illustrates that the LDPC codewords written in the memory are read.

Even in the type B block interleaver, the memory includes a part 1 and a part 2 similarly to the type A block interleaver. However, the part 1 and the part 2 of the type B are operated differently from the part 1 and the part 2 of the type A block interleaver. A parameter $N_{QCB\_IG}$ for determining a column size of the memory in the type B block interleaver is determined in accordance with a modulation order. For example, the parameter $N_{QCB\_IG}$ is defined as 2 in QPSK, as 4 in 16QAM, as 6 in 64QAM, as 8 in 256QAM, as 9 in 1024QAM, and as 12 in 4096QAM.

The part 1 is operated for $N_{QCB\_IG}$ bit groups on a basis of output bits of the group-wise interleaver.

In case of the type B block interleaving considering 256QAM, the memory of the type B block interleaver has $N_{QCB\_IG}$ columns and 360 rows. At this time, the bits output from the group-wise interleaver are written in a column direction as shown in FIG. 4(a), and if writing is completed, the bits are read in a row direction as shown in FIG. 4(b). At this time, bits of each row are mapped into one modulation cell. In the part 2, the bits are continuously mapped into a modulation cell without block interleaving as one embodiment.

The bits bit interleaved by the bit interleaver 2200 are mapped into QAM constellation points having complex values on an IQ plane in the mapper 2300. At this time, streams of the bit interleaved FEC frames are input to the mapper 2300, and cells are output from the mapper 2300, and these may be grouped into one FEC block if necessary.

The mapper 2300 includes a demultiplexer for demultiplexing bits constituting FEC frame input to generate data cells into parallel sub streams, and a bit-IQ mapping block for mapping the data cells output from the demultiplexer into constellation values. At this time, the number sub streams is determined by a modulation order. For example, if the modulation order is 16QAM, the number of sub streams is 4, and if the modulation order is 64QAM, the number of sub streams is 6.

In the present invention, the modulation order is defined by uniform QPSK modulation and 5 non-uniform constellation (NUC) sizes, for example, 16QAM, 64QAM, 256QAM, 1024QAM, and 4096QAM. At this time, although different constellations may exist in accordance with combination of each NUC modulation order and code rate, constellation is not changed in accordance with code lengths (e.g., 64800 bits or 16200 bits) as one embodiment. This means that the same constellation is used for the respective code lengths if the code rate and the modulation order are maintained uniformly.

The bit-IQ mapping block may provide a constellation point, of which power is normalized, by modulating data cells output from the bit interleaver or the demultiplexer using uniform QPSK modulation and non-uniform constellation (16QAM, 64QAM, 256QAM, 1024QAM, and 4096QAM).

At this time, QPSK constellation is one-dimensional QAM type, and the same constellation is used for all code rates as one embodiment.

Non-uniform constellations such as 16QAM, 64QAM and 256QAM are two-dimensional quadrant-symmetric QAM constellations, and are constructed using symmetry from a single quadrant. Meanwhile, to reduce complexity when the receiver performs QAM demapping, non-uniform constellation such as 1024QAM and 4096QAM is derived from one-dimensional non-uniform pulse amplitude modulation (PAM) constellation for both of I component and Q component.

If the LDM scheme is applied to the present invention, the data output from the mapper 2300 are input to the LDM processor 1300. The LDM is constellation superposition technology for combining a plurality of PLPs at different power levels prior to transmission to one RF channel. At this time, each data stream may have different modulation and channel coding schemes. In the present invention, LDM of two layers will be described as one embodiment. In this case, two layers will be referred to as a core layer and an enhanced layer, respectively. This is one embodiment, and each layer may be referred to another title in accordance with a designer.

The LDM processor 1300 combines two or more PLPs prior to time interleaving. Each layer includes one or more PLPs. In the present invention, for convenience, a PLP of the core layer is also referred to as a core PLP, and a PLP of the enhanced layer is also referred to as an enhanced PLP.

The core layer uses a modulation and coding (ModCod) scheme the same as or more robust than that of the enhanced layer as one embodiment. Particularly, each PLP may use its respective FEC encoding and constellation mapping, which includes a code length and a code rate. This is one embodiment, and the same code length may be applied to each PLP, or the same code rate or the same constellation mapping may be applied to each PLP.

Figure 5:
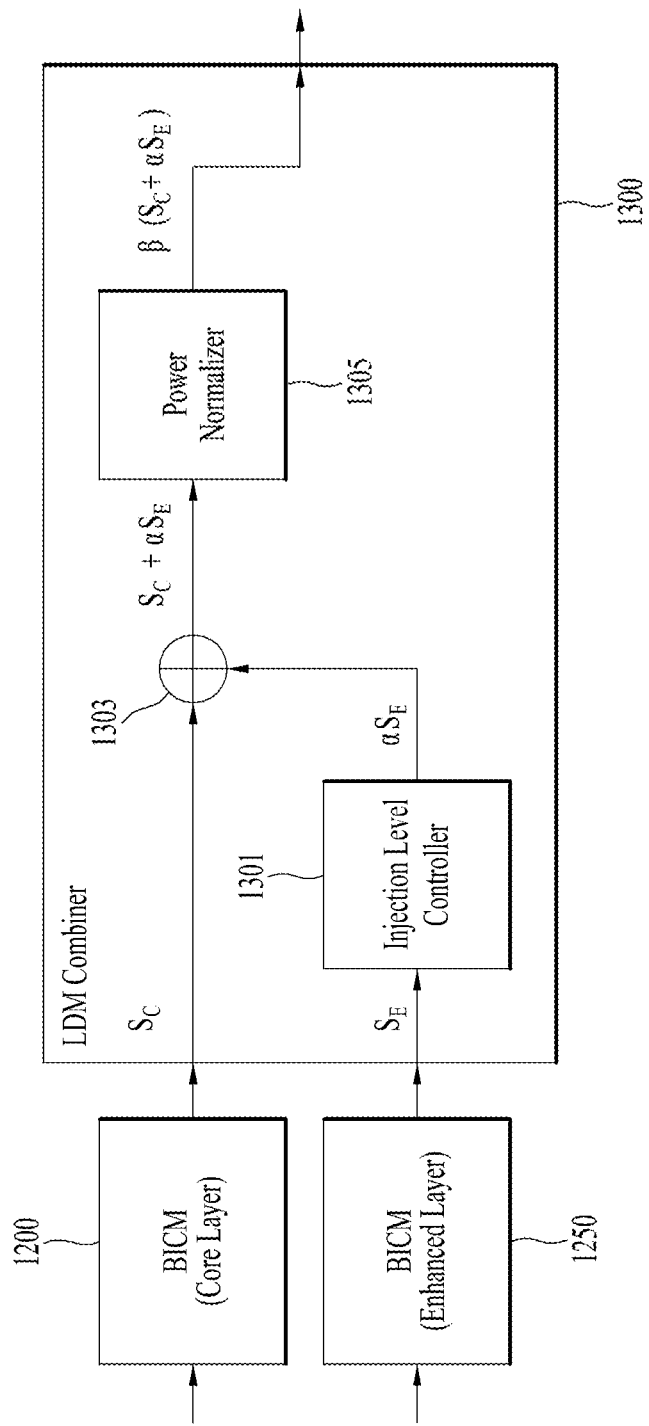
FIG. 5 is a detailed block diagram illustrating one embodiment of an LDM processor of a transmission system according to the present invention.

FIG. 5 is a detailed block diagram illustrating the LDM processor 1300. The LDM processor 1300 is also referred to as an LDM combiner.

The first BICM unit 1200 of FIG. 5 is the same block as the BICM unit 1200 of FIG. 1, and if the LDM scheme is applied, FEC encoding, bit interleaving and symbol mapping are performed for PLP data of the core layer. Also, the second BICM unit 1250 of FIG. 5 is the same block as the second BICM unit 1250 of FIG. 1, and FEC encoding, bit interleaving and symbol mapping are performed for PLP data of the enhanced layer.

In the present invention, the second BICM unit 1250 is configured in the same manner as the first BICM unit 1200 except that the MIMO scheme is used, a detailed description of the second BICM unit 1250 will be omitted.

The PLP data of the core layer, which are output from the first BICM unit 1200, are combined with the PLP data of the enhanced layer, which are output from the second BICM unit 1250, by a combining operator 1303 of the LDM processor 1300 and then output to a power normalizer 1305. At this time, the PLP data of the enhanced layer, which are output from the second BICM unit 1250, are output to the combining operator 1303 through an injection level controller 1301. The injection level controller 1301 serves to reduce a power of the enhance layer as compared with the core layer to obtain transmission energy desired by each layer. At this time, a transmission energy level is selected together with combination with a modulation and code rate parameter to achieve a desired coverage region as well as a desired code rate. An injection level of the enhanced layer compared with the core layer may be selected on a basis of 0.5 dB or 1.0 dB from 0.0 dB to 25.0 dB.

An injection level of an enhanced layer signal compared with a core layer signal is a transmission parameter that enables distribution of transmission powers between the two layers. As the injection level controller 1301 changes the injection level, transmission robust of each layer is changed. This provides additional method in addition to a method for selecting modulation and code rate parameter combination.

The power normalizer 1305 normalizes an entire power of signals combined by the combining operator 1303 to 1.

The output of the LDM processor 1300 is input to the first frame builder 1500. The first frame builder 1500 includes a time interleaver 1501, a frame builder 1502, and a frequency interleaver 1503 as one embodiment. The inputs of the time interleaver 1501 and the frame builder 1502 may include one or more PLPs. On the other hand, the outputs of the frame builder 1502 are OFDM symbols of preamble or data, which are sequentially arranged in a final frame, and frequency interleaving is performed for the OFDM symbols as one embodiment.

In the time interleaver 1501, one of no time interleaving, a convolutional time interleaver (CTI) mode, and a hybrid time interleaver (HTI) mode may be applied to each PLP. A time interleaver mode is signaled to L1D_plp_TI_mode field of L1-Detail signaling data. Also, the time interleaver mode for enhanced PLP is the same as time interleaver modes of the enhanced PLP and layered division multiplexed core PLP (or PLPs) as one embodiment.

If one service includes a single PLP of a constant cell rate or includes a single core PLP of a constant cell rate and one or more enhanced PLPs layered division multiplexed with the single core PLP, one of no time interleaving, CTI mode and HTI mode may be applied to PLP (or PLPs) constituting the corresponding service. On the other hand, no time interleaving or HTI mode may be applied to PLPs which are not included in the above categories.

Also, in one embodiment, a time interleaver mode (or modes) for PLPs of a specific service is applied independently from a time interleaver mode (or modes) for PLP (or PLPs) of other services transmitted through the same RF channel. If the specific service includes a plurality of core PLPs and/or layer division non-multiplexed PLPs, the same or different time interleaving modes (that is, no time interleaving and/or HTI mode) may be applied to these PLPs, and/or the same or different time interleaver parameters may be applied thereto.

For another example, if one service includes a plurality of components each of which is transmitted through each PLP, each PLP may be operated in a no time interleaving or HIT mode, and at this time, respective parameters of the HTI mode may be different from each other.

If time interleaving is not applied to the specific PLP, cells of the corresponding PLP are output without delay in the same order as one embodiment.

For another example, a maximum size of a time interleaver (TI) memory for one service is $M_{TI}=2^{19}$ cells. However, an extended interleaving mode in which a maximum size of a TI memory for a single service becomes $M_{TI}=2^{20}$ cells is excluded. At this time, the TI memory size includes all necessary parts, that is, a convolutional time interleaver of the CTI mode, a cell of the HTI mode, block, and delay line interleavers. That is, a size of a TI memory allocated to each PLP is determined by the amount of data transmitted to the corresponding PLP.

For example, in the CTI mode, the entire TI memory size may be used by the corresponding PLP in accordance with a configured depth of the convolutional time interleaver. For another example, in the HTI mode, the entire memory size is shared between the PLPs for transmitting components of the same service, and the memory allocated to each PLP is determined by the amount of data transmitted from the corresponding PLP.

The extended interleaving mode is not applied to LDM, and is selectively applied to QPSK modulation as one embodiment. At this time, the extended interleaving mode is transmitted by being signaled to an L1D_plp_TI_extended_Interleaving field. If extended interleaving is used in the CTI mode, a time interleaving depth may be extended, and is signaled to an L1D_plp_CTI_depth field of L1-detail signaling data. If extended interleaving for a specific PLP is used in the HTI mode, a maximum time interleaving memory size corresponds to $2^{20}$ cells, and the maximum number $N_{BLOCK\_IF\_MAX}$ of FEC blocks per interleaving frame (IF) cannot exceed 517. If extended interleaving for a specific PLP is not used in the HTI mode, the maximum time interleaving memory size corresponds to $2^{19}$ cells, and the maximum number $N_{BLOCK\_IF\_MAX}$ of FEC blocks per IF cannot exceed 258.

Figure 6:
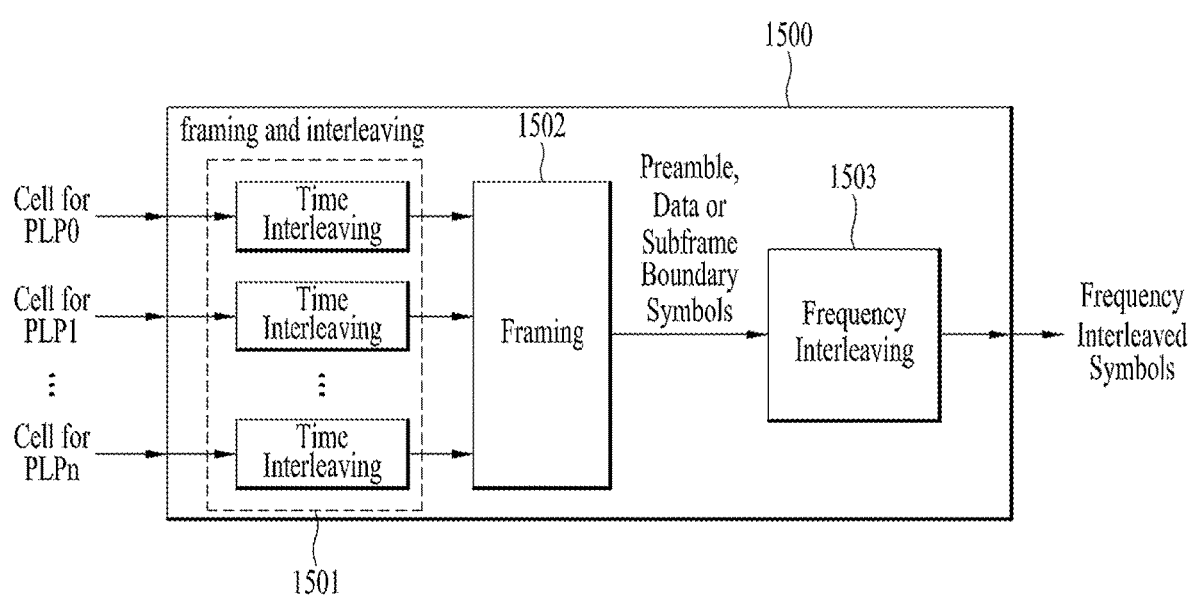
FIG. 6 is a detailed block diagram illustrating one embodiment of a frame builder of a transmission system according to the present invention.

FIG. 6 is a detailed block diagram illustrating one embodiment of a frame builder 1500 according to the present invention, wherein the frame builder 1500 may include a time interleaving unit 1501 that includes n time interleavers to perform time interleaving per PLP, a frame builder 1502 for generating a signal frame based on PLPs output from one or more time interleavers of the time interleaving unit 1501, and a frequency interleaver 1503 for performing frequency interleaving for the output of the frame builder 1502.

Next, a time interleaving procedure of the nth PLP will be described in detail. Since a time interleaving procedure of the other PLPs may be understood with reference to the time interleaving procedure of the nth PLP which will be described below, its detailed description will be omitted in the present invention.

Figure 7A:
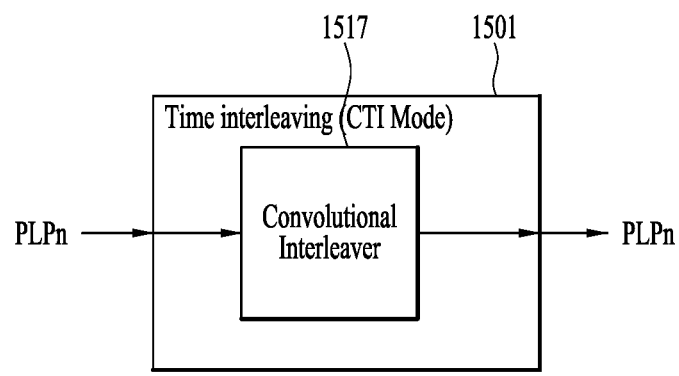
FIG. 7 is a schematic block diagram illustrating one embodiment of a time interleaver of a CTI mode and a time interleaver of an HTI mode according to the present invention.
Figure 7B:
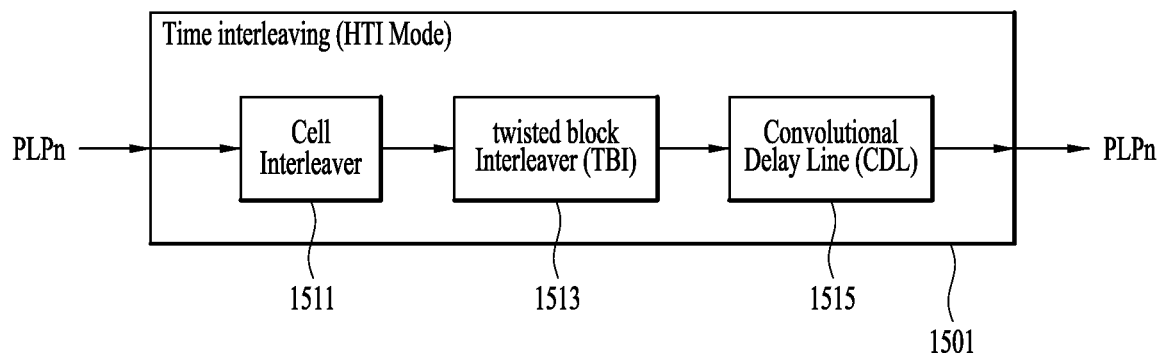

FIG. 7(*a*) is a schematic block diagram illustrating a convolution time interleaver 1517 of a CTI mode applied to the nth PLP of the present invention. That is, the convolution time interleaver performs convolutional interleaving by receiving a sequence of cells from the first BICM unit 1200 or the LDM processor 1300. Signaling information related to the convolutional time interleaver is signaled to L1D_plp_CTI_depth field, L1D_plp_CTI_start_row field, and L1D_plp_CTI_fecframe_start field, and detailed description of each field will be given later.

FIG. 7(*b*) is a schematic block diagram illustrating a hybrid time interleaver of an HTI mode applied to the nth PLP of the present invention, wherein the hybrid time interleaver includes a cell interleaver 1511, a block interleaver 15143, and a delay line 1515 as one embodiment. At this time, the block interleaver 1513 is also referred to as a twisted block interleaver (TBI), and the delay line 1515 is also referred to as a convolutional delay line (CDL) or convolutional interleaver.

The cell interleaver 1511 performs interleaving for cells within each FEC block by receiving input cells on a basis of FEC blocks and arranges the interleaved cells in TI blocks. Cell interleaving in the cell interleaver 1511 is performed in such a manner that the FEC blocks are linearly written and pseudo-randomly read. At this time, in one embodiment, permutation sequence used to pseudo-randomly read the FEC blocks linearly written in the memory is changed per FEC block in the TI block, and different permutation sequences are generated by shifting one permutation sequence.

However, in the present invention, the cell interleaver 1511 is selectively used, and whether to use the cell interleaver 1511 is signaled to L1D_plp_HTI_cell_interleaver field which is a parameter included in the L1-detail signaling data.

In the present invention, one TI block includes one or more cell interleaved FEC blocks (in this case, L1D_plp_HTI_cell_interleaver field value is 1), or includes one or more FEC blocks directly output from the first BICM unit 1200 (in this case, L1D_plp_HTI_cell_interleaver field value is 0) as one embodiment.

The block interleaver 1513 performs intra-subframe interleaving by twisted block interleaving the TI blocks.

The delay line 1515 performs inter-subframe interleaving for cells of the block interleaved TI blocks. As a result, one block interleaved TI block is spread to several subframes. At this time, the delay line 1515 is selectively used, and whether to use the delay line 1515 is signaled to L1D_plp_HTI_inter_subframe field which is a parameter included in the L1-detail signaling data as one embodiment.

In the present invention, the FEC blocks input to the time interleaver 1501 may be grouped into interleaving frames (IFs). The interleaving frames are independent from physical layer frames. At this time, the number $N_{BLOCK\_IF(n)}$ of FEC blocks within IF may be changed within the range from minimum 1 to maximum $N_{BLOCK\_IF\_MAX}$, the number of FEC blocks may be changed between IFs. Information related to the number of FEC blocks within IF is signaled to L1D_plp_HTI_num_ti_block of the L1-detail signaling data.

At this time, each IF may directly be mapped into one subframe and spread into a plurality of subframes. Each IF may be divided into one or more TI blocks $N_{TI}$, and at this time, the TI block is a basic unit for the operation of the cell interleaver 1511, the block interleaver 1513 and the delay line 1515. The number of TI blocks within one IF block may include different number of FEC blocks.

In the intra-subframe interleaving mode (that is, L1D_plp_HTI_inter_subframe field=0), one IF may include one or more TI blocks, and TI blocks within IF may include their respective number of FEC blocks. That is, in the intra-subframe interleaving mode, one IF is mapped into one subframe, and if the interleaving frame includes one or more TI blocks, a transmission bit rate of PLP may be enhanced. At this time, the number of TI blocks per interleaving frame is signaled to L1D_plp_HTI_num_ti_block field of the L1-detail signaling data.

On the other hand, in the inter-subframe interleaving mode (that is, L1D_plp_HTI_inter_subframe field=1), one IF may be spread and mapped into a plurality of subframes, and one IF includes one TI block as one embodiment. This inter-subframe interleaving mode may improve time diversity throughput with respect to a low transmission data service. At this time, the number of subframes for which one IF is spread is signaled to L1D_plp_HTI_num_ti_block field of the L1-detail signaling data.

Also, if the L1D_plp_HTI_num_ti_block field value is 1, one TI block is mapped into one subframe regardless of the L1D_plp_HTI_inter_subframe field value.

Figure 8:
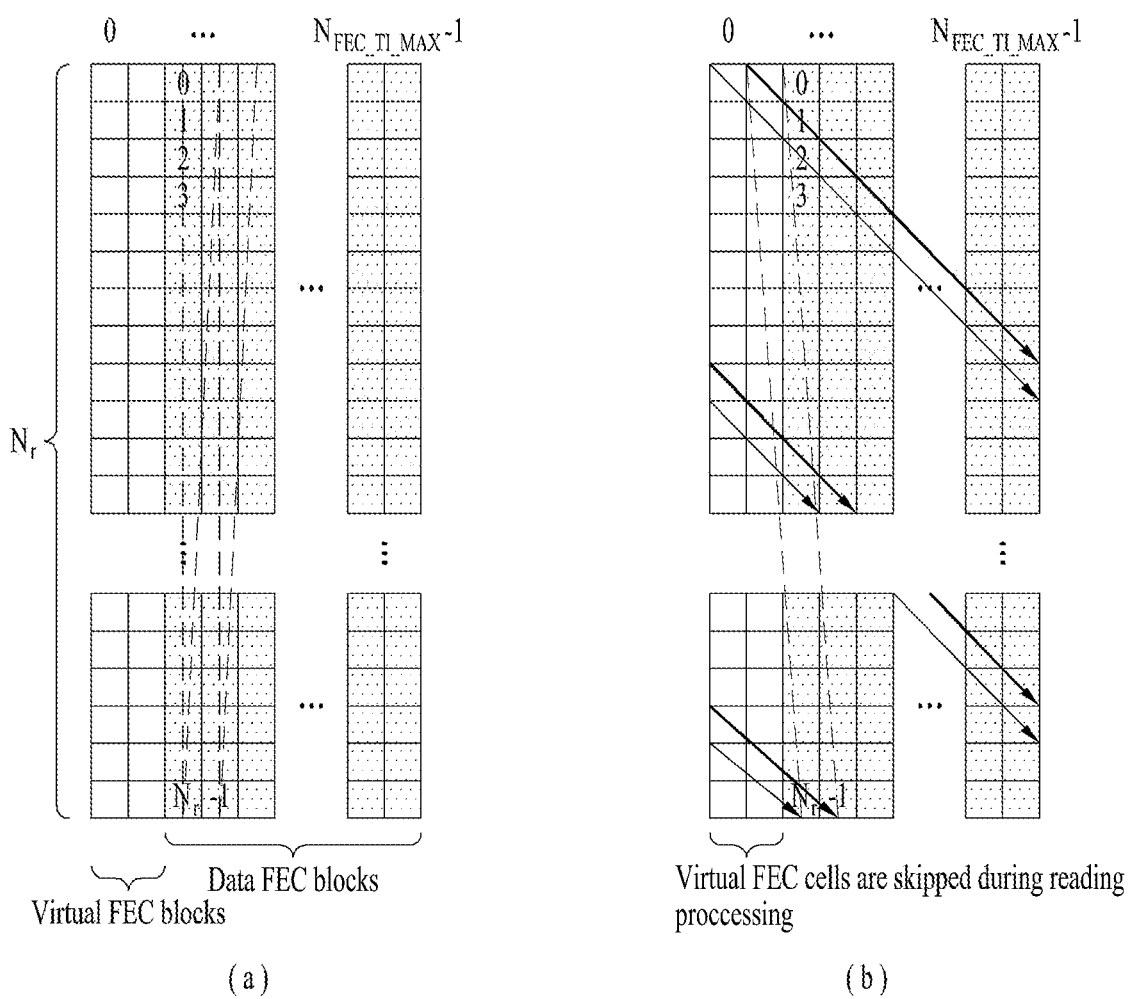
FIG. 8 is a diagram illustrating one embodiment of a block interleaving procedure of a hybrid time interleaver according to the present invention.

A twisted block interleaving procedure of the block interleaver 1513 will be described in detail with reference to FIG. 8(a) and FIG. 8(b). FIG. 8(a) illustrates one embodiment of a linear writing operation according to the present invention, and FIG. 8(b) illustrates one embodiment of a diagonal reading operation according to the present invention.

One TI block corresponds to a use of one block interleaver memory. In interleaving of each TI block, the block interleaver 1513 stores next consecutive cells $d_{n,s,0,0}$, $d_{n,s,0,1}, \ldots, d_{n,s,0,N_{cells}-1}, d_{n,s,1,0}, d_{n,s,1,1}, \ldots, d_{n,s,N_{FEC\_TI}(n,s)-1,0}$, $d_{n,s,N_{FEC\_TI}(n,s)-1,1}, \ldots, d_{n,s,N_{FEC\_TI}(n,s)-1,N_{cells}-1}$ of $N_{FEC\_TI}(n,s)$ FEC blocks input for block interleaving of the corresponding PLP in the block interleaver memory (one per PLP). In this case, $d_{n,s,r,q}$ is an input cell which belongs to a TI block 's' of an interleaving frame 'n'. If the cell interleaver 1511 has been used, the cell corresponds to a cell which belongs to the TI block 's' of the interleaving frame 'n' output from the cell interleaver 1511. The number Nr (that is, column size) of rows of a memory in the block interleaver 1511 is equal to the number (that is, FEC block length) of cells included in one FEC block, and the number Nc (that is, row size) of columns is set to $N_{FEC\_TI\_MAX}$.

The twisted block interleaving is performed in such a manner that input cells are serially written in the memory in a column wise direction and read in a diagonal-wise direction from the first row (right side along a row starting from the leftmost column) to the last row.

Particularly, the block interleaver 1513 according to one embodiment of the present invention writes the first FEC block in the first row of the time interleaving memory in a column direction, writes the second FEC block in a subsequent row, and writes the other FEC block within the TI block in the same manner.

At this time, if the number $N_{FEC\_TI\_MAX}$ of columns of the block interleaver memory is greater than the number $N_{FEC\_TI}(n,s)$ of FEC blocks input for block interleaving, a virtual FEC block is included in the memory. Therefore, the number of virtual FEC blocks included in one TI block is defined as $N_{FEC\_TI\_Diff}(n,s)=N_{FEC\_TI\_MAX}-N_{FEC\_TI}(n,s)$. That is, the virtual FEC block is considered to perform the same twisted block interleaving operation between TI blocks having different number of FEC blocks. Therefore, $N_{FEC\_TI\_Diff}(n,s) \neq 0$ means that the number (or column) of FEC blocks between TI blocks is varied depending on a cell rate. In one embodiment of the present invention, virtual cells which belong to the virtual FEC block are skipped without being read during a reading procedure for intra-subframe interleaving.

In one embodiment of the present invention, virtual FEC blocks included in one TI block is located ahead data FEC blocks included in the same TI block in a memory given as shown in FIG. 8(a). This is to allow the receiver to achieve time deinterleaving by using a single memory.

At this time, a procedure of reading cells written in the memory in an interleaving array in a diagonal_wise direction is performed by calculating positions of data and virtual cells as expressed by the following Equation 1.

$$R_i = i \bmod N_r,$$
$$T_i = R_i \bmod N_c,$$
$$C_i = \left(T_i + \left\lfloor \frac{i}{N_r} \right\rfloor\right) \bmod N_c.$$

[Equation 1]

In this case, $R_i$ and $C_i$ (i=0, ..., $N_r N_c-1$) respectively indicate indexes of column and row of the block interleaver memory, and $T_i$ indicates a twisted parameter. At this time, when supposing that cells are continuously read from a linear memory array, a position of a cell may be calculated as $\theta_i = N_r C_i + R_i$ during a reading procedure. The virtual cells are skipped without being output during a reading procedure if the following condition $\theta_i \geq N_{FEC\_TI\_Diff}(n,s)$. $N_r$ is not satisfied.

Figure 9:
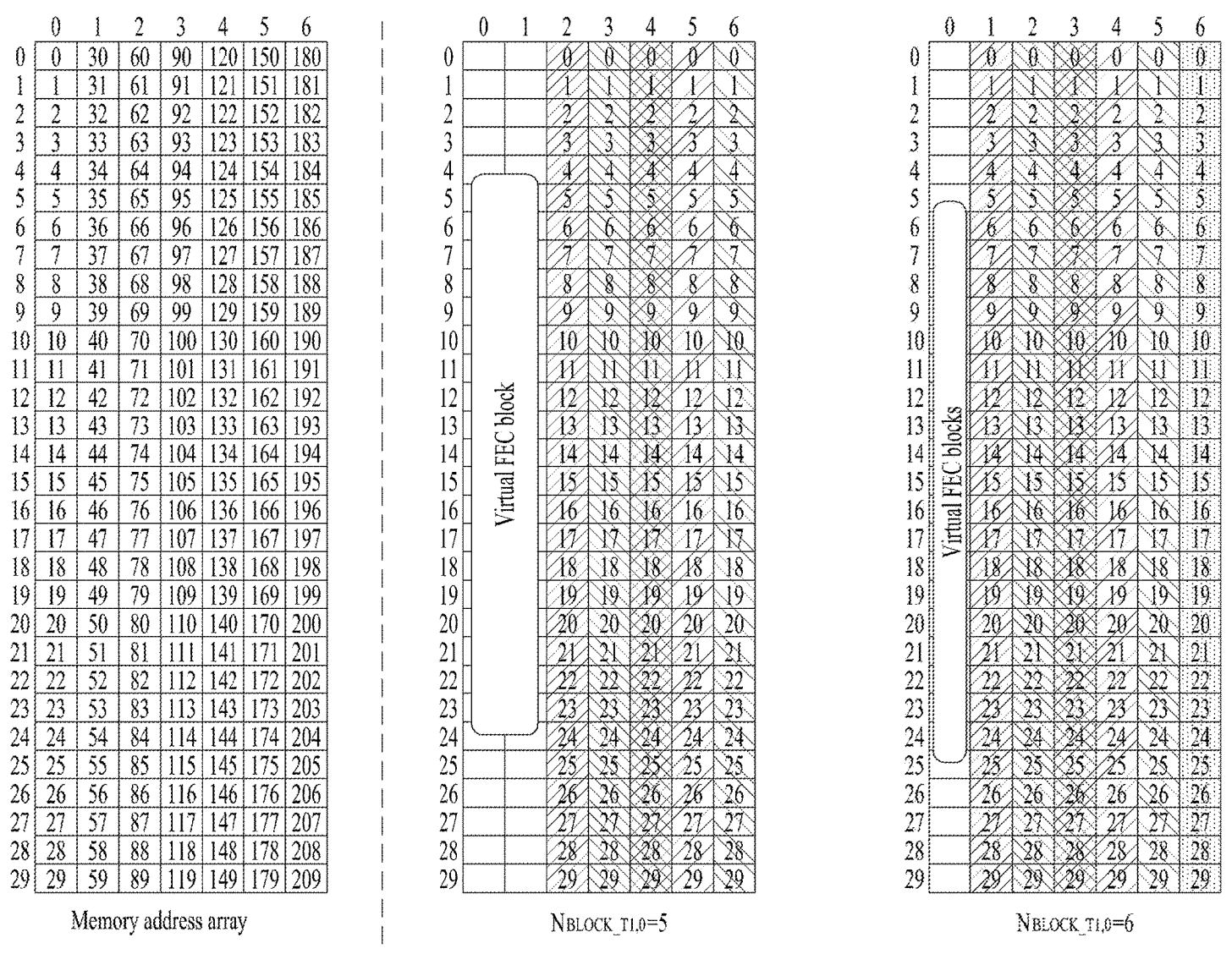

FIG. 9 illustrates a writing operation of a block interleaver according to the present invention.

A block shown in a left side of FIG. 9 illustrates a TI memory address array, and blocks shown in a right side of FIG. 9 illustrates a writing operation when two virtual FEC blocks and one virtual FEC block are inserted to the front of each TI block with respect to two consecutive TI blocks.

As described above, the HTI mode provides intra-subframe interleaving and inter-subframe interleaving (optional).

Data time interleaved by the time interleaver 1501 are input to the frame builder 1502.

In one embodiment of the present invention, time interleaving is not performed for L1 signaling data.

The data input to the frame builder 1502 are data of one or more PLPs in the form of a cell, and in the frame builder 1502, input cells are mapped into cells of data symbols of each subframe within a signal frame. Also, the frame builder 1502 receives L1 signaling data in the form of a cell from an L1 signaling processor 1700, and the input cells are mapped into cells of preamble symbol(s) of a preamble within the corresponding signal frame. The outputs of the frame builder 1502 are frame symbols. The frame symbols indicate a set of a frequency domain prior to pilot insertion of the OFDM generation unit 1600 and optional frequency interleaving, and are transformed (that is, modulated) to time domain OFDM symbols through IFFT and guard interval insertion of the OFDM generation unit 1600.

Figure 10:
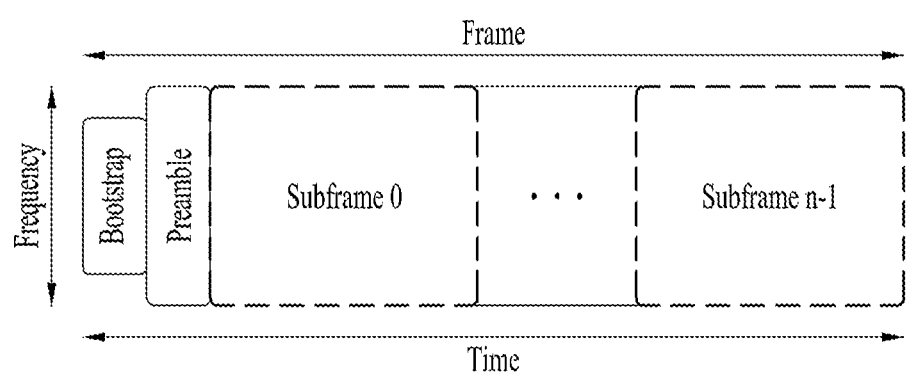
FIG. 10 is a diagram illustrating one embodiment of a structure of a signal frame according to the present invention.

FIG. 10 is a diagram illustrating one embodiment of a signal frame according to the present invention. A preamble region 1523 and a data region 1525 are made by the frame builder 1502. A bootstrap region 1521 is made by the OFDM generation unit 1600.

In the present invention, one subframe includes a set of time-frequency resources within the signal frame. Particularly, one subframe spans a full range of carriers configured in a frequency dimension, and includes an integer number of OFDM symbols in a time dimension.

In one embodiment of the present invention, waveform attributes of a subframe include a subframe type. In one embodiment, at least one of an FFT size, a guard interval duration, a scattered pilot pattern, the number (that is, NoC) of useful carriers, whether to use a frequency interleaver, and whether the corresponding subframe is SISO mode or MIMO mode is included in the waveform attributes. In one embodiment of the present invention, the waveform attributes of the subframe are not changed for the duration of the subframe. Also, the signal frame may include a plurality of subframes of the same subframe type, and/or may include a plurality of subframes of different subframe types. Subframes within the same signal frame may include a different number of OFDM symbols. In one embodiment, the FFT size of the preamble is the same as FFT size of the first subframe of the signal frame.

In one embodiment, a specific PLP is mapped into only subframes of the same subframe type. At this time, if a specific PLP is time interleaved through a plurality of subframes within RF channel, these subframes may be the same subframe type, and may be located in the same signal frame and/or different signal frames. This means that subframes more than the PLPs may exist. At this time, although the number of subframes may exceed the maximum number of PLPs, the maximum number of PLPs is determined regardless of the number of subframes which are used.

In one embodiment of the present invention, a length of the signal frame is designated in one type of a time-aligned frame and a symbol-aligned frame. The entire frame length in the time-aligned frame is equal to a sum of a bootstrap 1521, a preamble 1523 and subframes 1525. In one embodiment, no additional sample excluding a length signaled for a guard interval duration of OFDM symbols is inserted to the symbol-aligned frame. The time-aligned frame may be identified by setting L1B_frame_length_mode field included in the L1-basic signaling data of the L1 signaling data to 0, and the symbol-aligned frame may be identified by setting the L1B_frame_length_mode field to 1.

In one embodiment of the present invention, all subframes include at least 4×Dy data and subframe boundary symbols. In this case, Dy is a parameter for designating a scattered pilot length of a time direction. That is, Dx indicates a spaced distance between scattered pilots in a time direction.

In the present invention, the number NoC of carriers is defined by the following equation, $NoC = NoC_{max} - C_{red\_coff} \times C_{unit}$. In this case, $C_{red\_coff}$ is a coefficient multiplied by a control unit $C_{unit}$ to determine the number of carriers to be reduced to a positive integer value. $C_{red\_coff}$ has a value from 0 to 4, which is signaled to parameters included in the L1 signaling data, for example, L1B_preamble_reduced_carriers field, L1D_reduced_carriers field and L1B_first_sub_reduced_carriers field. In this case, the L1B_preamble_reduced_carriers field signals a value which will be applied to the other preamble symbols except the first preamble symbol, the L1B_first_sub_reduced carriers field signals a value which will be applied to the first subframe, and the L1D_reduced_carriers field signals a value which will be applied to the second subframe and subsequent subframes within the corresponding frame, as one embodiment. The $NoC_{max}$ indicates the maximum number NoC of carriers, $C_{unit}$ indicates a control unit, and a value of $C_{unit} = \max(Dx)$ is 96 in case of 8K FFT, 192 in case of 16K FFT and 384 in case of 32K FFT. In this case, Dx is a parameter for designating a scattered pilot length of a frequency direction. That is, Dx indicates a spaced distance between scattered pilots in a frequency direction.

In the present invention, each subframe is configured in the order of subframe boundary symbol (none or one), data symbols, subframe boundary symbol (none or one). That is, the subframe boundary symbols may not exist in the corresponding subframe. In this case, the corresponding subframe includes data symbols only. In one embodiment of the present invention, the subframe boundary symbols have scattered pilots of density higher than data symbols so that the receiver may facilitate exact channel estimation.

In one embodiment of the present invention, one data symbol has a scattered pilot density in accordance with a scattered pilot pattern of a corresponding subframe. The scattered pilot pattern is signaled to the L1 signaling data.

In one embodiment, a sum of data included in the subframe of which FFT size is 32K and the number of subframe boundary symbols is always an even number except the first subframe. Also, in the first subframe, a sum of a preamble, a subframe boundary and the number of data symbols is an even number as one embodiment.

Also, in one embodiment, if the subframe boundary symbol exists at the start of the subframe, all data symbols within the same subframe are located behind the subframe boundary symbol. And, if the subframe boundary symbol exists at the end of the subframe, the corresponding boundary symbol is located behind the last data symbol of the same subframe.

In the present invention, the preamble includes one or more preamble symbols, and transmits L1 signaling data for the corresponding frame.

In one embodiment, FFT size of the preamble symbols, a guard interval duration, a scattered pilot pattern, and FEC mode of L1-Basic signaling data are signaled to a preamble_structure parameter of a bootstrap, and the number Np of the preamble symbols is signaled from the L1 signaling data. In this case, FFT size and guard interval duration are equally maintained in all preamble symbols within the frame. Particularly, if the FEC mode of the L1-Basic signaling data is identified, information required for processing the L1-Basic signaling data in the transmission/reception system may be identified.

The maximum number NoC of the first preamble symbols may be used for a given FFT size, whereas NoC of the other preamble symbols may be signaled to L1-basic of the L1 signaling data. Also, in one embodiment, frequency interleaving is always applied to all preamble symbols.

In one embodiment, when the L1 signaling data are mapped into preamble symbol (or symbols), L1-Basic cells are mapped into only available cells of the first preamble symbol, and L1-Detail cells are interleaved and mapped into available cells remaining after mapping L1-Basic cells at the first preamble symbol and available cells of the other preamble symbols. In one embodiment, available cells which are not used for L1-Detail cells at the last preamble symbol are used for preamble data cells.

In one embodiment of the present invention, the MISO or MIMO scheme is not applied to any preamble symbol. Meanwhile, in one embodiment, although the LDM scheme is not applied to any cells of the preamble for transmitting L1-Basic and L1-Detail data, the LDM scheme is applied to payload data cells transmitted to the last preamble symbol.

Also, in the present invention, in accordance with exact subframe configuration and PLP multiplexing parameters, PLP data are fully or partially mapped into available data cells within the subframe. However, if PLP data are not mapped into all of the available data cells, empty data cells (that is, unoccupied data cells) are generated. At this time, in one embodiment of the present invention, to make sure of a constant transmission power, pseudo-random (PN) dummy modulation values are allocated to the empty data cells.

In one embodiment of the present invention, two types of PLPs exist, wherein one of the types is a non-dispersed PLP type, and the other one type is a dispersed PLP type. In one embodiment of the present invention, each PLP has one of the non-dispersed PLP and the dispersed PLP. At this time, in one embodiment of the present invention, PLP of the enhanced layer of the LDM scheme is excluded.

In one embodiment of the present invention, data cells of the non-dispersed PLP are allocated contiguous data cell indexes of a corresponding subframe. That is, all data cell indexes between the lowest data cell index allocated to the non-dispersed PLP and the highest data cell index allocated to the same non-dispersed PLP are allocated to the same non-dispersed PLP.

In one embodiment of the present invention, the dispersed PLP is divided into two or more sub-slices. Data cells within any one sub-slice of the dispersed PLP are allocated to contiguous data cell indexes of the corresponding subframe. However, in one embodiment, two contiguous sub-slices within the same dispersed PLP do not have contiguous data cell indexes. That is, a difference between the minimum data cell index allocated to the sub-slice of the dispersed PLP and the maximum data cell index allocated to a previous sub-slice of the same dispersed PLP should be greater than 1.

In one embodiment, all sub-slices of a specific dispersed PLP within one subframe have the same size. In one embodiment, a sub-slice interval between the lowest data cell index of a sub-slice of the dispersed PLP and the lowest data cell index of next sub-slice of the same dispersed PLP is identical for all sub-slices of the corresponding PL within the subframe. At this time, the sub-slice interval is signaled to L1D_plp_subslice_interval field of the L1 signaling data. The number of sub-slices for one dispersed PLP within one subframe, a sub-slice size therefor, and a sub-slice interval therefor are independent from the number of sub-slices of all other dispersed PLP within the same subframe, a sub-slice size thereof, and a sub-slice interval thereof, and are signaled independently. In addition, the number of sub-slices for one dispersed PLP within one subframe, a sub-slice size therefor, and a sub-slice interval therefor are independent from the number of sub-slices of the same PLP included in all other subframes, a sub-slice size thereof, and a sub-slice interval thereof, and are signaled independently. If the LDM scheme is used, the number of sub-slices, a sub-slice size, and a sub-slice interval are signaled to only dispersed core layer PLPs. The non-dispersed PLP is not sub-sliced, and does not have any related sub-slicing parameters.

In the present invention, a type of a PLP is signaled to L1D_plp_type field of the L1 signaling data. At this time, in one embodiment, the L1D_plp_type field is independently included in each subframe having the corresponding PLP. One PLP may use different PLP types for two different subframes. That is, one PLP does not have the same type for two different subframes having the corresponding PLP. In one embodiment, if the LDM scheme is used, the L1D_plp_type field exists in only a core layer PLP. That is, since a PLP of the enhanced layer does not have a specific PLP type, the L1D_plp_type field does not exist.

In the present invention, a starting position of the PLP is signaled to L1D_plp_start field of the L1 signaling data, and the L1D_plp_start field indicates the starting position of the PLP within a subframe regardless of the PLP type. The starting portion of the PLP is an index of a data cell allocated to hold a first data cell value of the corresponding PLP.

In the present invention, a length of the PLP is signaled to L1D_plp_size field of the L1 signaling data, wherein the L1D_plp_size field indicates a total number of data cells included in the corresponding PLP at the current subframe.

A starting position and length of a specific PLP at a specific subframe are independent from a starting position and length of the same PLP at the other subframes, and are signaled independently. In one embodiment, a starting position and length of all PLPs existing at a subframe are signaled regardless of a use of the LDM scheme.

In the present invention, all data cells allocated to a PLP exist within a range of useful data cell indexes of the current frame in accordance with cell allocation parameters (e.g., starting position, length, and sub-slicing parameters) of the PLP. In this case, the sub-slicing parameters are included in the dispersed PLP only. Also, each data cell within the subframe is allocated to a maximum one PLP per LDM layer.

At least one of a single PLP multiplexing, LDM (layered division multiplexing), TDM (time division multiplexing), FDM (frequency division multiplexing), and TFDM (time-frequency division multiplexing) may be applied to the present invention as a multiplexing scheme.

As an example of the single PLP multiplexing, if only one core layer PLP exists, the outputs of the time interleaver may be mapped into data symbols within a frame in due order.

In one embodiment, the TDM scheme employs a dispersed PLP for concatenation of a plurality of PLPs within a subframe in time.

If the LDM scheme is used, each PLP within the subframe is categorized into the core layer PLP or the enhanced layer PLP, and a value for identifying each layer is signaled to the L1D_plp_layer field of the L1 signaling data. Each core layer PLP within the subframe indicates one time interleaver group. Therefore, each core layer PLP exactly belongs to each time interleaver group within the subframe, and is directly related to the L1 signaling data that include time interleaving parameters for the corresponding PLP. Meanwhile, each enhanced layer PLP is associated with one or more time interleaver groups within the subframe but is not directly associated with the L1 signaling data related to time interleaving. Therefore, in one embodiment, the enhanced layer PLP follows time interleaving of time interleaver group (or groups) related therewith. In one embodiment of the present invention, the time interleaver groups are indexed within the subframe in accordance with the order of related core layer PLPs which are indicated in control signaling for the subframe. For example, the first core layer PLP is indexed to TI_group_0, and the second core layer PLP is indexed to TI_Group_1. In one embodiment, indexes and order of time interleaver groups which are implicitly designated are independent from L1D_plp_id field values for core layer PLPs existing at the subframe. In the present invention, time interleaving, cell multiplexing and sub-slicing (if any) are performed based on the core layer PLPs. Also, in one embodiment, the enhanced layer PLP follows time interleaver of the core layer PLP (or PLPs) related therewith and cell multiplexing. An injection level is signaled per layer PLP, and is not signaled for the core layer PLP. If one enhanced layer PLP is spread into a plurality time interleaving groups, each core layer PLP related with the enhanced layer PLP includes an integer number of FEC blocks within each subframe for which two layer PLPs are subjected to LDM, regardless of a TI mode.

The FDM scheme is obtained by configuring a plurality of PLPs within each subframe as dispersed PLPs. In one embodiment, a sub-slice interval of each dispersed PLP is configured by the number of data cells per data symbol for current subframe configuration. Also, FDM effect may be obtained only if frequency interleaving is not used at the subframe.

The TFDM scheme is configured by properly setting a PLP size and sub-slice related parameters in a method used to configure FDM. Also, one or more non-dispersed PLPs may selectively be included in a TFDM subframe.

Next, the frequency interleaver 1503 of the frame builder 1500 will be described.

In the present invention, frequency interleaving is optional for data symbols included in the subframe but is essential for preamble symbols included in the preamble. That is, frequency interleaving may be used or not for data cells within the data symbols and subframe boundary symbols. Whether to use frequency interleaving is signaled to L1D_frequency_interleaver field of the L1 signaling data. The frequency interleaver 1503 is operated for data cells within one OFDM symbol.

The frequency interleaver 1503 according to the present invention may provide frequency diversity by randomly interleaving input cells. Also, the frequency interleaver 1503 may be operated for data corresponding to an OFDM symbol pair comprised of two sequential OFDM symbols or data corresponding to one OFDM symbol by using different interleaving seed orders to obtain maximum interleaving gain in a single frame.

At this time, cells input to the frequency interleaver 1503 may be defined as follows.

$X_{m,l}=(x_{m,l,0},x_{m,l,1},x_{m,l,2}, \ldots, x_{m,l,N_{data}-1})$, where $x_{m,l,q}$ indicates a qth cell index of $l(l=0, \ldots, L_{Fm}-1)$th symbol of the mth subframe. Also, $L_{Fm}$ indicates preamble, data and the number of subframe boundary symbols included in the first subframe (m=1) or the number of data and subframe boundary symbols of the second subframe and a subsequent subframe m. $N_{data}$ indicates the number of data cells within a symbol. $A_{m,l}=(a_{m,l,0}, a_{n,i,1}, a_{m,l,2}, \ldots, a_{m,l,N_{data}-1})$ indicates output cells of the frequency interleaver 1503. In this case, $A_{m,l}$ indicates the lth symbol of the mth subframe. In one embodiment, at the subframe boundary symbols, frequency interleaving is operated for all of null and active cells.

The frequency interleaver 1503 needs interleaving sequence to perform frequency interleaving for input cells. The interleaving sequence means interleaving address or frequency interleaving sequence. For convenience, interleaving sequence, interleaving address and frequency interleaving sequence will be used together.

That is, in the present invention, the frequency interleaver 1503 may perform frequency interleaving by applying a difference interleaving sequence to each cell of at least one OFDM symbol, that is, each OFDM symbol or two paired OFDM symbols (pair-wise OFDM symbol or each OFDM symbol pair), thereby acquiring frequency diversity.

To this end, the frequency interleaver 1503 includes a frequency interleaving address generator for generating interleaving sequence in one embodiment.

The frequency interleaving address generator may include a basic interleaving sequence generator, a symbol offset generator, a computation operator, and an address check block. The basic interleaving sequence generator may include a basic random address generator and a wire permutation block. The basic interleaving sequence generator may further include 1-bit toggle block, and is toggled as the most significant bit of the basic interleaving sequence in accordance with a control of a control unit.

In one embodiment, the wire permutation block changes the order of bits within a sequence generated from the basic random address generator. In this case, the wire permutation block may change the order of bits by using a preset wire permutation table.

In one embodiment, the symbol offset generator generates a new offset sequence per two OFDM symbols. That is, the symbol offset generator operates on an OFDM symbol pair basis.

In one embodiment, the computation operator performs exclusive OR (XOR) computation by receive the output of the basic interleaving sequence generator and the output of the symbol offset generator. The output sequence of the computation operator becomes interleaving sequence (that is, interleaving address). The computation operator serves to cyclically shift the basic interleaving sequence output from the basic interleaving sequence generator every pair of OFDM symbols based on the output of the symbol offset generator. That is, the basic interleaving sequence value may be rotated as much as symbol offset to generate another sequence.

The address check block validates whether interleaving sequence (that is, interleaving address) output from the computation operator is within the range of allowable carrier indexes for a specific OFDM symbol which is subjected frequency interleaving.

The address check block validates whether the output of the computation operator exceeds the number of entire data cells within a symbol, and disregards the output if the generated address value is greater than the number of data cells.

Figure 11:
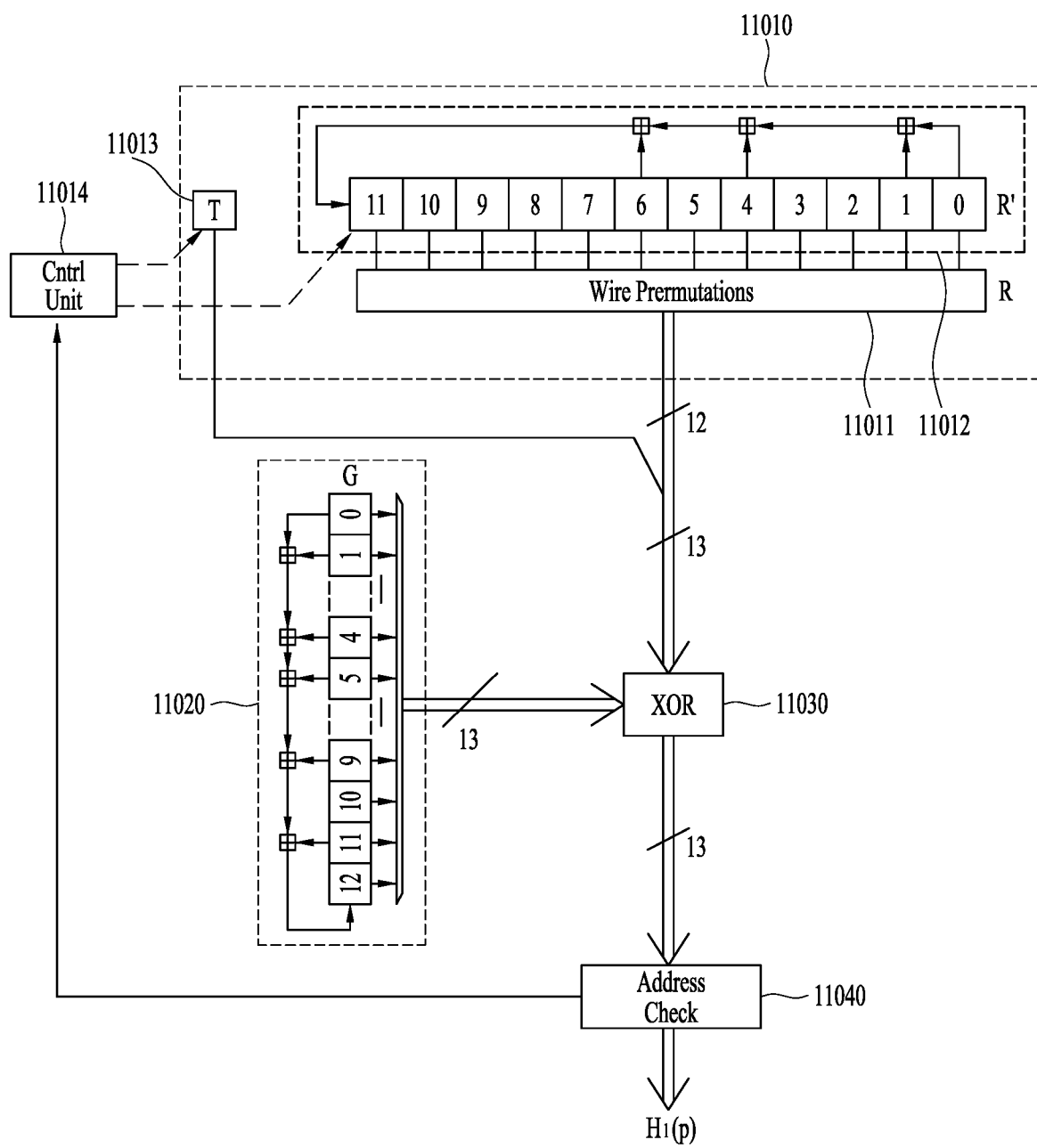
FIGS. 11 to 13 are block diagrams illustrating a frequency interleaving address generator in each of 8K, 16K and 32K FFT sizes according to one embodiment of the present invention.
Figure 12:
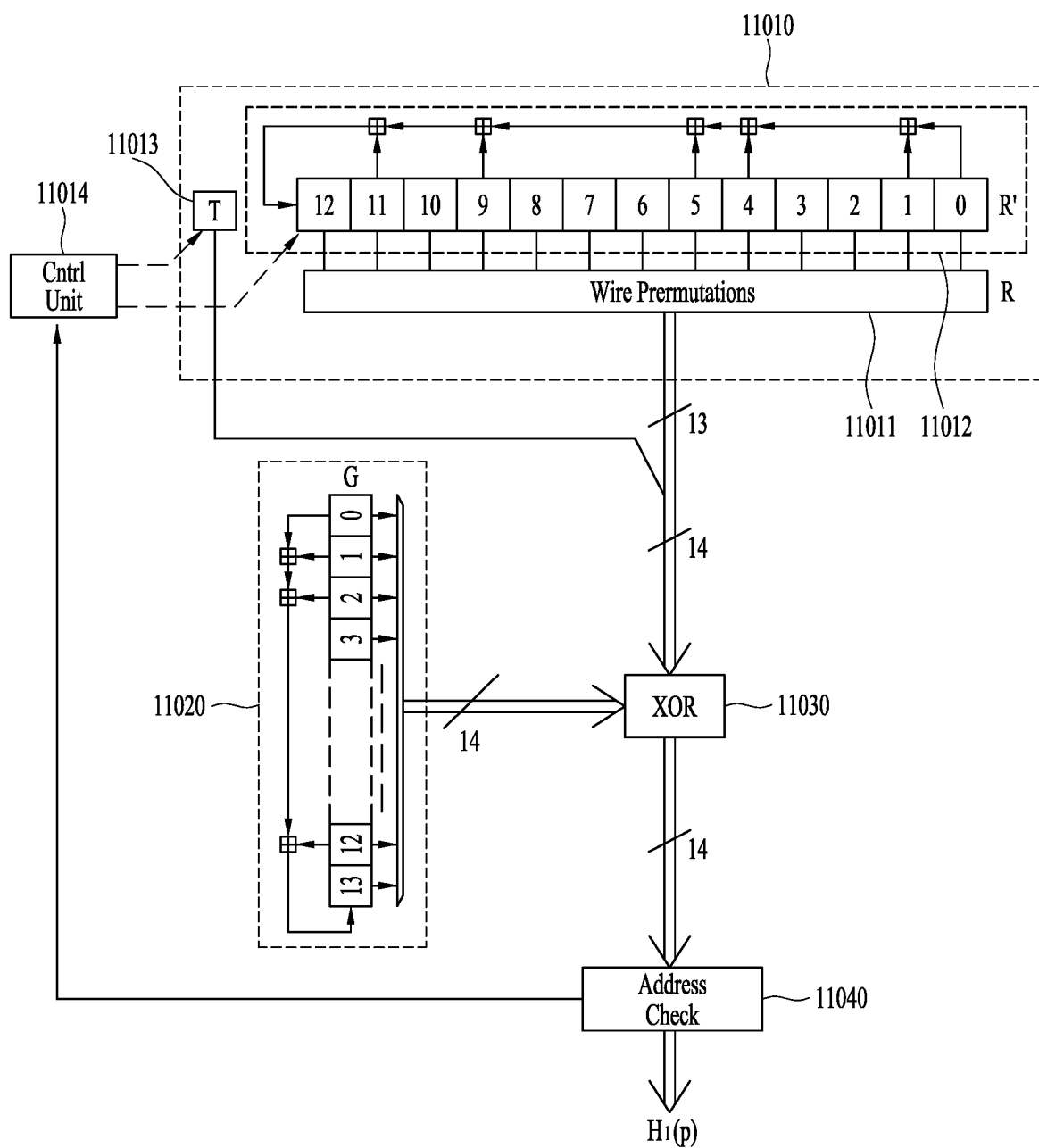
Figure 13:
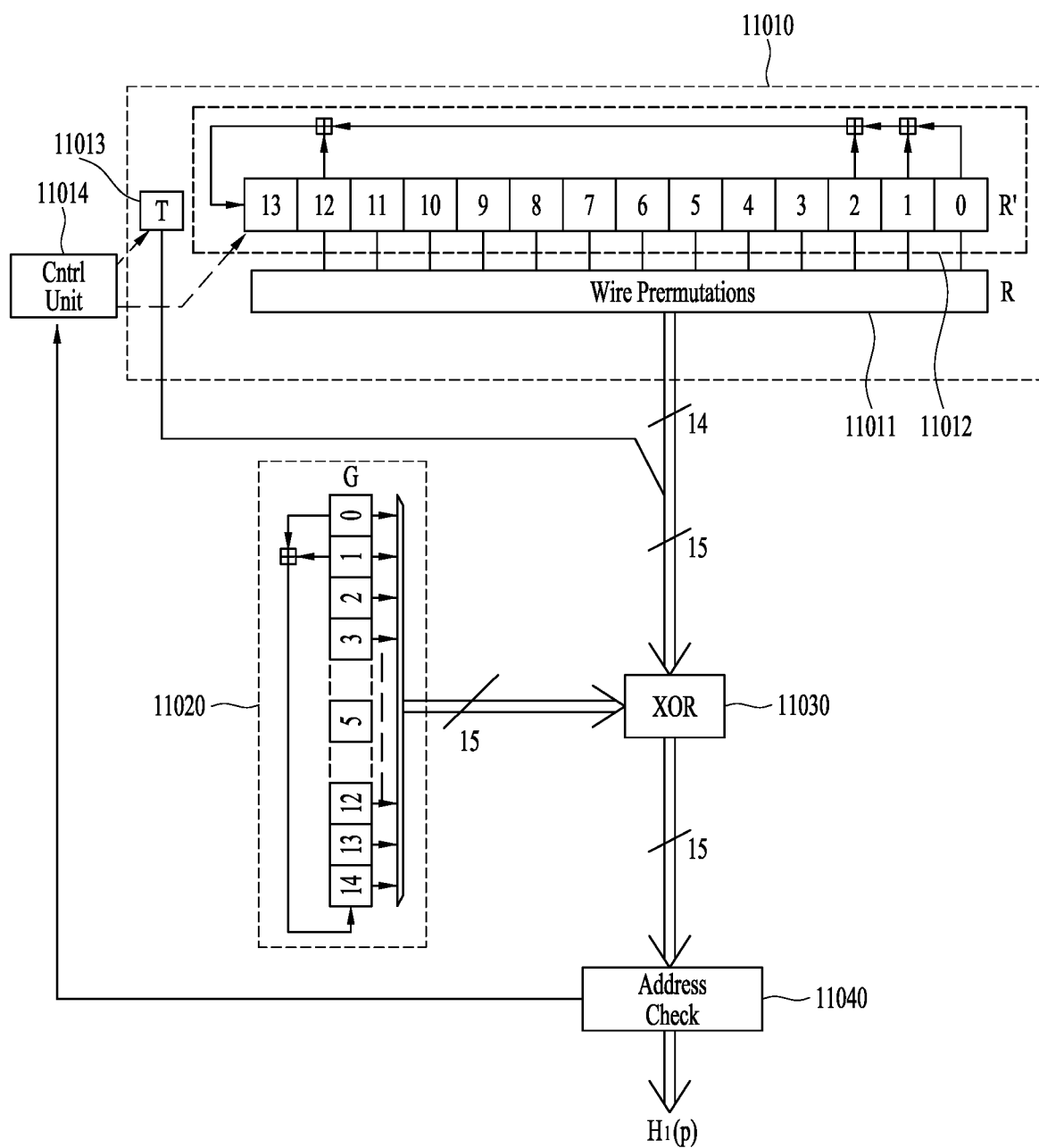

FIGS. 11 to 13 are block diagrams illustrating a frequency interleaving address generator in each of 8K, 16K and 32K FFT sizes according to one embodiment of the present invention. Interleaving sequence of a length corresponding to a corresponding FFT size is generated per FFT size, and a procedure of generating interleaving sequence is a little different per FFT size.

FIG. 11 is a diagram illustrating a frequency interleaving address generator of an 8K FFT mode according to one embodiment of the present invention. The frequency interleaver 1503 according to the present invention may perform frequency interleaving of input symbols of a subframe having FFT size of 8K by using interleaving sequence (or interleaving address) generated from the frequency interleaving address generator of the 8K FFT mode.

To generate interleaving sequence or interleaving address, the frequency interleaving address generator of 8K FFT mode shown in FIG. 11 may include a basic interleaving sequence generator 11010, a symbol offset generator 11020, a computation operator 11030, and an address check block 11040.

In one embodiment, the basic interleaving sequence generator includes a basic random address generator and a wire permutation block 11011, and outputs a basic random sequence 11012 of 12 bits. The basic interleaving sequence generator may further include a 1-bit toggle block 11013, configures the most significant bit of the basic random sequence of 12 bits, and is toggled in accordance with the control of the control unit 11014. Therefore, the computation operator receives a basic random sequence of 13 bits through the wire permutation block. In one embodiment, the wire permutation block changes the bit order of the basic random sequence of 13 bits by using a wire permutation table previously set in the following Table 2 and then outputs the result to the computation operator. That is, in case of the 8K FFT mode, wire permutations different per data cells corresponding to each symbol constituting an OFDM symbol pair are used as one embodiment. In other words, two different wire permutations for shuffling an output vector of the basic random address generator corresponding to odd and even numbered symbols constituting the OFDM symbol pair are applied to the 8K FFT mode. This means that different wire permutations generate different interleaving sequences for one symbol pair even though the same basic random address generator is used for one symbol pair.

The symbol offset generator operates on an OFDM symbol pair basis and thus generates a symbol offset sequence of 13 bits. The basic interleaving sequence of 13 bits output from the basic interleaving sequence generator and the symbol offset sequence of 13 bits output from the symbol offset generator are subjected to XOR operation by the computation operator and then input to the address check block.

If $H_i(p)$ of 13 bits output from the computation operator, that is, an interleaving sequence (or interleaving address) value is greater than an input data vector size Ndata, the address check block and the control unit disregard the output value without using it, and repeatedly controls the operation of the basic interleaving sequence generator to allow the interleaving address value not to exceed Mmax.

FIG. 12 is a diagram illustrating a frequency interleaving address generator of a 16K FFT mode according to one embodiment of the present invention. The frequency interleaver 1503 according to the present invention may perform frequency interleaving of data cells corresponding to an input OFDM symbol pair or an input OFDM symbol of a subframe having FFT size of 16K by using interleaving sequence (or interleaving address) generated from the frequency interleaving address generator of the 16K FFT mode.

To generate interleaving sequence or interleaving address, the frequency interleaving address generator of 16K FFT mode shown in FIG. 12 may include a basic interleaving sequence generator, a symbol offset generator, a computation operator, and an address check block.

In one embodiment, the basic interleaving sequence generator includes a basic random address generator and a wire permutation block, and outputs a basic random sequence of 13 bits. The basic interleaving sequence generator may further include a 1-bit toggle block, configures the most significant bit of the basic random sequence of 13 bits, and is toggled in accordance with the control of the control unit. Therefore, the computation operator receives a basic random sequence of 14 bits through the wire permutation block. In one embodiment, the wire permutation block changes the bit order of the basic random sequence of 14 bits by using a wire permutation table previously set in the following Table 3 and then outputs the result to the computation operator. In case of the 16K FFT mode, the same wire permutation table may be used for data cells corresponding to each symbol constituting an OFDM symbol pair, or wire permutations different per data cells corresponding to each symbol constituting an OFDM symbol pair may be used. In one embodiment, two different wire permutations for shuffling an output vector of the basic random address generator corresponding to odd and even numbered symbols constituting the OFDM symbol pair are applied to the 16K FFT mode. This means that different wire permutations generate different interleaving sequences for one symbol pair even though the same basic random address generator is used for one symbol pair.

The symbol offset generator operates on an OFDM symbol pair basis and thus generates a symbol offset sequence of 14 bits.

The basic interleaving sequence of 14 bits output from the basic interleaving sequence generator and the symbol offset sequence of 14 bits output from the symbol offset generator are subjected to XOR operation by the computation operator and then input to the address check block.

If $H_i(p)$ of 14 bits output from the computation operator, that is, an interleaving sequence (or interleaving address) value is greater than an input data vector size Ndata, the address check block and the control unit disregard the output value without using it, and repeatedly controls the operation of the basic interleaving sequence generator to allow the interleaving address value not to exceed Mmax.

FIG. 13 is a diagram illustrating a frequency interleaving address generator of a 32K FFT mode according to one embodiment of the present invention. The frequency interleaver 1503 according to the present invention may perform frequency interleaving of data cells corresponding to an input OFDM symbol pair or an input OFDM symbol of a subframe having FFT size of 32K by using interleaving sequence (or interleaving address) generated from the frequency interleaving address generator of the 32K FFT mode.

To generate interleaving sequence or interleaving address, the frequency interleaving address generator of 32K FFT mode shown in FIG. 13 may include a basic interleaving sequence generator, a symbol offset generator, a computation operator, and an address check block.

In one embodiment, the basic interleaving sequence generator includes a basic random address generator and a wire permutation block, and outputs a basic random sequence of 14 bits. The basic interleaving sequence generator may further include a 1-bit toggle block, configures the most significant bit of the basic random sequence of 14 bits, and is toggled in accordance with the control of the control unit. Therefore, the computation operator receives a basic random sequence of 15 bits through the wire permutation block. In one embodiment, the wire permutation block changes the bit order of the basic random sequence of 15 bits by using a wire permutation table previously set in the following Table 4 and then outputs the result to the computation operator.

In case of the 32K FFT mode, the same wire permutation table is used for data cells corresponding to each symbol constituting an OFDM symbol pair as one embodiment. This means that a single permutation is used for the 32K FFT size and the same interleaving sequence is used every symbol pair.

The symbol offset generator operates on an OFDM symbol pair basis and thus generates a symbol offset sequence of 15 bits.

The basic interleaving sequence of 15 bits output from the basic interleaving sequence generator and the symbol offset sequence of 15 bits output from the symbol offset generator are subjected to XOR operation by the computation operator and then input to the address check block.

If $H_i(p)$ of 15 bits output from the computation operator, that is, an interleaving sequence (or interleaving address) value is greater than an input data vector size Ndata, the address check block and the control unit disregard the output value without using it, and repeatedly controls the operation of the basic interleaving sequence generator to allow the interleaving address value not to exceed Mmax.

Next, a procedure of generating interleaving sequence (or interleaving address) according to one embodiment of the present invention will be described based on each FFT size.

In the basic interleaving sequence generator of FIGS. 11 to 13, $N_r$ bit binary word $R'_i$ is generated through the following process.

$$i = 0, 1 \quad : R'_i[N_r-2, N_r-3, \ldots, 1, 0] = [0, 0, \ldots, 0, 0],$$
$$i = 2 \quad : R'_i[N_r-2, N_r-3, \ldots, 1, 0] = [0, 0, \ldots, 0, 1],$$
$$2 < i < M_{max} \quad : \{R'_i[N_r-3, N_r-4, \ldots, 1, 0] = R'_{i-1}[N_r-2, N_r-3, \ldots, 2, 1];$$

8K FFT size: $R'_i[11] = R'_{i-1}[0] \oplus R'_{i-1}[1] \oplus R'_{i-1}[4] \oplus R'_{i-1}[6]$, 16K FFT size:

$R'_i[12] = R'_{i-1}[0] \oplus R'_{i-1}[1] \oplus R'_{i-1}[4] \oplus R'_{i-1}[5] \oplus R'_{i-1}[9] \oplus R'_{i-1}[11]$, 32K FFT size: $R'_i[13] = R'_{i-1}[0] \oplus R'_{i-1}[1] \oplus R'_{i-1}[2] \oplus R'_{i-1}[12]\}$ Where, $\oplus$ indicates XOR operation, $N_r = \log_2 M_{max}$, and a parameter $M_{max}$ is defined in Table 1 below. That is, Table 1 shows a value of $M_{max}$ according to FFT mode, that is, FFT size.

TABLE 1

| FFT Mode | Mmax |
|---|---|
| 8K | 8192 |
| 16K | 16384 |
| 32K | 32768 |

The following Table 2 shows a relation between bit word $R'_i$ output from the basic random address generator of FIG. 11 and a bit word $R_i$ of which position is changed by a wire permutation in the wire permutation block when FFT size is 8K. That is, in Table 2, the first column indicates a bit position of an input bit sequence, and the second and third columns indicate bit positions changed by the wire permutation. The bit position of the second column is applied to the even numbered symbol of the input OFDM symbol pair, and the bit position of the third column corresponds to the odd numbered symbol of the input OFDM symbol pair.

TABLE 2

| $R_i$ bit positions | 11 | 10 | 9 | 8 | 7 | 6 | 5 | 4 | 3 | 2 | 1 | 0 |
|---|---|---|---|---|---|---|---|---|---|---|---|---|
| $R_i$ bit positions (even) | 5 | 11 | 3 | 0 | 10 | 8 | 6 | 9 | 2 | 4 | 1 | 7 |
| $R_i$ bit positions (odd) | 8 | 10 | 7 | 6 | 0 | 5 | 2 | 1 | 3 | 9 | 4 | 11 |

The following Table 3 shows a relation between bit word $R'_i$ output from the basic random address generator of FIG. 12 and a bit word $R_i$ of which position is changed by a wire permutation in the wire permutation block when FFT size is 16K. That is, in Table 3, the first column indicates a bit position of an input bit sequence, and the second and third columns indicate bit positions changed by the wire permutation. In the same manner as the 8K FFT mode, the bit position of the second column is applied to the even numbered symbol of the input OFDM symbol pair, and the bit position of the third column corresponds to the odd numbered symbol of the input OFDM symbol pair.

TABLE 3

| $R_i$ bit positions | 12 | 11 | 10 | 9 | 8 | 7 | 6 | 5 | 4 | 3 | 2 | 1 | 0 |
|---|---|---|---|---|---|---|---|---|---|---|---|---|---|
| $R_i$ bit positions (even) | 8 | 4 | 3 | 2 | 0 | 11 | 1 | 5 | 12 | 10 | 6 | 7 | 9 |
| $R_i$ bit positions (odd) | 7 | 9 | 5 | 3 | 11 | 1 | 4 | 0 | 2 | 12 | 10 | 8 | 6 |

The following Table 4 shows a relation between bit word $R'_i$ output from the basic random address generator of FIG. 13 and a bit word $R_i$ of which position is changed by a wire permutation in the wire permutation block when FFT size is 32K. That is, in Table 4, the first column indicates a bit position of an input bit sequence, and the second column indicates a bit position changed by the wire permutation. That is, the bit position of the second column is equally applied to the even numbered symbol and the odd numbered symbol of the input OFDM symbol pair.

TABLE 4

| $R_i$ bit positions | 13 | 12 | 11 | 10 | 9 | 8 | 7 | 6 | 5 | 4 | 3 | 2 | 1 | 0 |
|---|---|---|---|---|---|---|---|---|---|---|---|---|---|---|
| $R_i$ bit positions | 6 | 5 | 0 | 10 | 8 | 1 | 11 | 12 | 2 | 9 | 4 | 3 | 13 | 7 |

The changed bit position of Table 2 to Table 4 above is one embodiment for assisting understanding of the present invention, and the bit position of each FFT mode may be changed by a designer.

Next, a procedure of generating symbol offset per FFT size will be described. That is, in the symbol offset generator of FIGS. 11 to 13, symbol offset is newly generated per two symbols. That is, a symbol offset value is constant at two contiguous symbols (2n and 2n+1).

In the symbol offset generator of FIGS. 11 to 13, $N_r$ bit binary word $G_k$ is generated through the following process.

$$k = 0 \quad : G_k[N_r-1, N_r-2, \ldots, 1, 0] = [1, 1, \ldots, 1, 1],$$
$$0 < k < \lfloor L_F/2 \rfloor \quad : \{G_k[N_r-2, N_r-3, \ldots, 1, 0] = G_{k-1}[N_r-1, N_r-2, \ldots, 2, 1];$$

-continued

8K FFT size:

$G_k[12] =$ $G_{k-1}[0] \oplus G_{k-1}[1] \oplus G_{k-1}[4] \oplus G_{k-1}[5] \oplus G_{k-1}[9] \oplus G_{k-1}[11]$, 16K FFT size:

$G_k[13] = G_{k-1}[0] \oplus G_{k-1}[1] \oplus G_{k-1}[2] \oplus G_{k-1}[12]$,

32K FFT size: $G_k[14] = G_{k-1}[0] \oplus G_{k-1}[1]\}$.

In this case, $\oplus$ indicates XOR operation.

In FIGS. 11 to 13, interleaving sequence $H_l(p)$ (p=0, ..., $N_{data}$−1) for performing frequency interleaving for an input symbol $X_{m,l}$ may be generated as follows.

for ($l = 0; l < L_F; l = l + 1$)
{
  $p = 0$;
  for ($i = 0; i < M_{max}; i = i + 1$) {

$H_l(p) = \left[\left((i \bmod 2)2^{N_r-1} + \sum_{j=0}^{N_r-2} R_i[j]2^j\right) \oplus \sum_{j=0}^{N_r-1} G_{\lfloor l/2 \rfloor}[j]2^j\right] \bmod M_{max}$;

if ($H_l(p) < N_{data}$) $p = p + 1$;}
}

In the present invention, two different wire permutations are used for 8K and 16K FFT sizes, as listed in Table 2 and Table 3 above. That is, a specific wire permutation used for a given data symbol is determined by values of (l mod 2) in Table 2 and Table 3. This indicates that different interleaving sequences are used per symbol.

On the other hand, a single permutation is used for 32K FFT size as listed in Table 4. This indicates that different interleaving sequences are used per symbol pair.

In each FFT mode, interleaved symbol $A_{m,l} = (a_{m,l,0}, a_{m,l,1}, a_{m,l,2}, \ldots, a_{m,l,N_{data}-1})$ is defined using interleaving sequence $H_l(p)$ (p=0, ..., $N_{data}$−1).

In case of 32K FFT size, an input and output relation of the frequency interleaver FI is as follows. That is, a left side of an equal sign (=) indicates output data (that is, interleaved vector) for which frequency interleaving is performed, and its right side indicates cells (that is, input vector) input for frequency interleaving. For example, $X_{m,l,p}$ may mean a cell index 'p' which will be mapped into a first OFDM symbol of an mth frame, and $A_{m,l,Hl(p)}$ means that the cell index 'p' which will be mapped into the first OFDM symbol of the mth frame has been read in accordance with interleaving address (or interleaving sequence).

$a_{m,l,Hl(p)} = x_{m,l,p}$, for the even symbol of a symbol pair, l=0, 2, 4, ..., $a_{m,l,p} = x_{m,l,H[l/2](p)}$, for the odd symbol of a symbol pair, l=1, 3, 5, ....

In case of 8K and 16K FFT sizes, an input and output relation of the frequency interleaver FI is as follows. That is, a left side of an equal sign (=) indicates output data (that is, interleaved vector) for which frequency interleaving is performed, and its right side indicates cells (that is, input vector) input for frequency interleaving $a_{m,l,p} = x_{m,l,Hl(p)}$, for any symbol, l=0, 1, 2, ....

In case of 32K FFT mode, one interleaving sequence is applied to cells corresponding to one OFDM symbol pair, whereby frequency interleaving is performed. In case of 8K and 16K FFT modes, one interleaving sequence is applied to cells corresponding to one OFDM symbol pair, whereby frequency interleaving is performed.

Also, the basic random address generator and/or the symbol offset generator of FIGS. 11 to 13 may be modified to a random pseudo random bit sequence (PRBS) register.

Next, an example of a frame basis frequency interleaving procedure will be described.

First of all, in one embodiment, the registers of the symbol offset generator and the basic interleaving sequence generator are reset at the first preamble symbol of the frame. That is, a contents feedback shift register (FBSR) G of the symbol offset generator is set to [1111 ... 11], and a contents FBSR R' of the basic interleaving sequence generator is set to [0000 ... 00].

In one embodiment, the symbol offset generator and the basic interleaving sequence generator are reset at the first symbol of the other subframes except the first subframe within the frame. That is, the contents FBSR G of the symbol offset generator is set to [1111 ... 11], and the contents FBSR R' of the basic interleaving sequence generator is set to [0000 ... 00]. In this case, the first symbol of the subframe may be a data symbol, or may be a subframe boundary symbol.

Preamble symbol(s) and data symbols within the signal frame output from the first frame builder 1500 are input to the first OFDM generation unit 1600.

In one embodiment, the first OFDM generation unit 1600 includes a pilot insertion unit 1601, a MISO processor 1602, an IFFT unit 1603, a guard interval insertion unit 1605, and a bootstrap insertion unit 1606. A peak-to-average-power reduction (PAPR) unit 1604 may be inserted between the IFFT unit 1603 and the guard interval insertion unit 1605. This is optional.

Symbols input to the first OFDM generation unit 1600 are transformed to time domain OFDM symbols after pilot insertion, MISO processing, PAPR processing and IFFT, and then are transmitted to the receiver through guard interval insertion and bootstrap symbol(s) insertion.

Various cells in the signal frame are modulated to reference information known to the transmitter/receiver. Cell including reference information may be transmitted to a boosted power level. In the present invention, these cells will be referred to as pilots.

Types of pilots inserted by the pilot insertion unit 1601 include a scattered pilot (SP), a continual pilot (CP), an edge pilot, a preamble pilot, and a subframe boundary pilot. These pilots may diversely be used for channel synchronization, channel estimation, phase noise estimation, etc.

The following Table 5 illustrates examples of pilot types that may be applied in accordance with a symbol type of the present invention.

TABLE 5

| Symbol Type | Preamble Pilot | Scattered Pilot | Subframe Boundary Pilot | Common Continual Pilot | Additional Continual Pilot | Edge Pilot |
|---|---|---|---|---|---|---|
| Preamble | ✓ | | | ✓ | | |
| Data | | ✓ | | ✓ | ✓ | ✓ |
| Subframe Boundary | | | ✓ | ✓ | ✓ | ✓ |

For example, as illustrated in Table 5 above, the scattered pilot cells are transmitted by being inserted to all data symbols, and are not inserted to preamble symbol(s) and subframe boundary symbol(s). A scattered pilot pattern is signaled to L1 signaling data.

In the present invention, an amplitude of the scattered pilot may be calculated from a parameter L1D_scattered_pilot_boost field value and the scattered pilot pattern.

In the present invention, continual pilot cells are transmitted by being inserted to preamble symbols, and all symbols of a frame that includes random subframe boundary symbols. The CP positions are determined from additional position of additional CP set and a common CP set. At this time, the common CP set is a pilot designed so as not to overlap the scattered pilot, and the additional CP set is a pilot designed such that the number of useful data carriers within every data symbol is constant. Therefore, the additional CP set may be overlapped with the scattered pilots as the case may be. That is, the additional CP set may be overlapped with the scattered pilots within the symbol in accordance with FFT size and pilot pattern. In one embodiment of the present invention, positions of the common CP used for 16K FFT mode and 8K FFT mode are calculated from position of the common CP set of the 32K FFT mode.

In the present invention, the edge pilot is applied to all symbols within the signal frame except the preamble symbol(s).

In one embodiment of the present invention, the preamble pilots relatively more than the scattered pilots inserted to the subframe for equalization of an exact preamble signal are inserted. Alternatively, in one embodiment, preamble pilots inserted to the preamble of the frame are selected to be dense equally to the scattered pilots of the first subframe of the same frame.

In one embodiment of the present invention, the preamble pilots relatively more than the scattered pilots inserted to the subframe for equalization of an exact preamble signal are inserted. Alternatively, in one embodiment, preamble pilots inserted to the preamble of the frame are selected to be dense equally to the scattered pilots of the first subframe of the same frame. In one embodiment, the pilot cells of the preamble symbol(s) are transmitted at a boosted power level.

In the present invention, the pilots for the subframe boundary symbols are denser than pilots for surrounding normal data symbols of the same subframe.

The symbols into which the pilots are inserted by the pilot insertion unit 1601 are input to the MISO processor 1602. A transmit diversity code filter set (TDCFS) in the MISO processor 1602 is MISO pre-distortion technology that artificially decorrelates signals from a plurality of transmitters in a single frequency network to minimize potential destructive interference, and this technology is applied to the output of the pilot insertion unit 1601 in one embodiment.

In one embodiment of the present invention, MISO is applied to only OFDM symbols of the subframe, and is not applied to bootstrap or preamble. Whether to apply MISO is signaled to L1B_first_sub_miso field and L1D_miso field of the L1 signaling data.

In the present invention, the IFFT unit 1603 transforms data symbols and preamble symbol(s) of the signal frame to symbols of the time domain. All symbols include data and reference information (that is, pilot), and each symbol includes a set of NoC carriers.

The PAPR unit 1604 is optional, and may reduce a PAPR of symbols transformed to time domain symbols in the IFFT unit 1603 by using tone reservation (TR) and/or ACE (active constellation extension) scheme.

The guard interval insertion unit 1605 inserts a guard interval to each symbol. In one embodiment of the present invention, a guard interval is inserted before a useful data interval of each symbol.

The bootstrap insertion unit 1606 forms a bootstrap by inserting bootstrap symbol(s) to the start of each signal frame.

Next, a bootstrap applied to the present invention will be described. In the present invention, the bootstrap provides a universal entry point through a digital transmission signal, and uses a fixed configuration (e.g., sampling rate, signal bandwidth, subcarrier spacing, and time domain structure) known to all receivers.

In the present invention, the bootstrap includes one or more symbols, and the first symbol (that is, bootstrap symbol 0) starts as a synchronization signal at a start part of each frame period to enable signal discovery, coarse synchronization, frequency offset estimation, and initial channel estimation. The other symbol(s) includes control signaling (hereinafter, referred to as bootstrap signaling information) for reception and decoding of the corresponding frame.

In the present invention, a bootstrap version is categorized into a major version number and a minor version number. The major version is marked in bootstrap_major_version as a code, and the minor version is marked in bootstrap_minor_version as a code. At this time, in one embodiment, a Zadoff-Chu (ZC) root and a PN sequence seed are used to generate a base encoding sequence for bootstrap symbol contents. The major version number is signaled by selecting ZC root corresponding to a specific signal type. The minor version number is signaled by selecting a PN sequence seed appropriate to exist within a specific major version.

In the present invention, values used for each bootstrap symbol are ZC sequences modulated by a PN sequence in a frequency domain. The ZC root and the PN seed signal the major and minor versions of the corresponding bootstrap as described above.

The ZC sequence modulated to the PN sequence has a complex number sequence, and is applied to each subcarrier in IFFT input. At this time, the PN sequence applies phase rotation to individual complex number subcarriers, whereby preferable constant amplitude zero auto-correlation (CA-ZAC) characteristic of the original ZC sequence is maintained. The PN sequence provides additional signal separation between cyclic shifts of the same root sequence by suppressing spurious peaks in an autocorrelation response.

In the present invention, the bootstrap symbols have two types of structures in accordance with their positions. That is, in one embodiment, the bootstrap symbol 0, that is, initial symbol is used for synchronization detection and uses a CAB structure, and the other bootstrap symbol(s) use(s) a BCA structure.

Control signaling transmitted by being signaled to the bootstrap symbols will be referred to as bootstrap signaling information.

In one embodiment of the present invention, information signaled to bootstrap symbol 1 includes an ea_wake_up_1 field, a min_time_to_next field, and a system_bandwidth field.

The ea_wake_up_1 field is an emergency alarm wakeup field, and indicates whether an emergency status exists.

The min_time_to_next field displays a minimum time from the start of the current frame A to the start of next frame B of the same major/minor version as the current frame A.

The system_bandwidth field indicates a system bandwidth used for a part subsequent to bootstrap of a current physical layer frame.

In one embodiment of the present invention, information signaled to bootstrap symbol 2 includes an ea_wake_up_2 field and a bsr_coefficient field.

The ea_wake_up_2 field indicates whether an emergency status exists, together with the ea_wake_up_1 field of the bootstrap symbol 1.

The bsr_coefficient field indicates a sampling rate for a signal after bootstrap of the current physical rate frame.

In the present invention, information signaled to bootstrap symbol 3 is a preamble_structure field. This field signals a transmission parameter of one or more preamble symbols located next to the last bootstrap symbol.

Meanwhile, the MIMO scheme may be applied to the present invention. Particularly, it is assumed that a 2×2 MIMO antennas system is applied. In this case, in one embodiment of the present invention, the transmission system includes a first input formatting unit 1100, a first BICM unit 1200, a MIMO processor 1400, first and second frame builders 1500 and 1550, and first and second OFDM generation units 1600 and 1650. The MIMO processor 1400 is also referred to as a MIMO precoding unit.

Since the first input formatting unit 1100, the first BICM unit 1200 except a MIMO demultiplexer 1203 and a second mapper 1205, the first frame builder 1500, and the first OFDM generation block 1600 have been described as above, their detailed description will be omitted. Also, since the second frame builder 1550 is configured in the same manner as the first frame builder 1500, the second frame builder 1550 will be understood with reference to the detailed description of the first frame builder 1500 and its detailed description will be omitted. Since the second OFDM generation unit 1650 is configured in the same manner as the first OFDM generation unit 1600, the second OFDM generation unit 1650 will be understood with reference to the detailed description of the first OFDM generation unit 1600 and its detailed description will be omitted.

Generally, the MIMO technology may increase robustness through additional spatial diversity and/or increase channel capacity by applying a spatial multiplexing scheme for transmitting two different data streams in a single RF channel. Particularly, spatial multiplexing gain is acquired through the MIMO technology only unlike Single-Input Multiple-Output (SIMO)/Multiple-Input Single-Output (MISO), and may overcome limitation of a transmission channel capacity through a single antenna without increase of additional transmission power.

In one embodiment of the present invention, the transmitter/receiver uses a cross-polarized antenna having two horizontal/vertical polarities.

The MIMO demultiplexer 1203 is used to split a single cell word stream to double cell word streams for MIMO processing. That is, output bits of the bit interleaver 1202 are split into a first input signal (for example, even numbered vector) and a second input signal (for example, odd numbered vector), wherein the first input signal is output to the first mapper 1204 and the second input signal is output to the second mapper 1205.

Each of the first mapper 1204 and the second mapper 1205 maps an input signal into QAM constellation points having a complex number value on an IQ plane. The first mapper 1204 and the second mapper 1205 will be understood with reference to the description of the aforementioned mapper 2300 and thus their detailed description will be omitted. However, for MIMO processing, the same constellations are used for MIMO in the present invention, and the same modulation order is transmitted from two transmitting antennas.

The outputs of the first mapper 1204 and the second mapper 1205 are input to the MIMO processor 1400.

The MIMO processor 1400 precodes a pair of cell symbols which are input thereto, and then outputs the pair of cell symbols. In the present invention, the MIMO processor 1400 may use a full-rate spatial multiplexing (FR-SM) scheme for providing capacity increase in accordance with relatively small complexity increase in the receiver as a MIMO precoding scheme. Also, in the present invention, MIMO processing is applied at a PLP level.

In one embodiment of the present invention, combination of FEC codes having a length of 16200 bits and 256QAM is not allowed in MIMO. Also, in one embodiment of the present invention, MIMO processing is not applied to bootstrap and preamble. Also, in one embodiment, MIMO processing is not applied to signaling elements. Also, MIMO is not used together with any one of ACE, LDM and channel bonding.

L1 Signaling

Meanwhile, in the present invention, L1 signaling provides information required to configure physical layer parameters. This L1 signaling is split into L1-Basic signaling data and L1-Detail signaling data, and the split data are transmitted to the preamble symbols. In one embodiment of the present invention, bootstrap signaling information transmitted to bootstrap symbols may also be included in L1 signaling.

The L1-Basic signaling data is the most basic system signaling information of the system, and defines parameters required for decoding of the L1-Detail signaling data. In one embodiment, a length of L1-Basic signaling data is fixed to 200 bits.

The L1-Detail signaling data defines data context and information required for decoding of the data context in detail. A length of the L1-Detail signaling data is variable from frame to frame.

In FIG. 1, the L1 signaling processor 1700 is a block for performing processing for protection of L1 signaling, and includes L1-Basic processor for performing processing for protection of the L1-Basic signaling data and L1-Detail processor for performing processing for protection of the L1-Detail signaling data.

The L1-Basic processor sequentially performs scrambling, BCH encoding, zero padding, LDPC encoding, parity permutation, repetition/puncturing, zero removing, bit demultiplexing and constellation mapping for the L1-Basic signaling data and then outputs the performed result to the frame builder 1500. Some of these functions may be performed only if a corresponding condition is satisfied, or may be omitted unconditionally. If the MIMO scheme is applied, the L1-Basic signaling data processed by the L1-Basic processor are output to the first and second frame builders 1500 and 1550.

The L1-Detail processor sequentially performs segmentation, scrambling, BCH encoding, zero padding, LDPC encoding, parity permutation, repetition/puncturing, zero removing, bit demultiplexing and constellation mapping for the L1-Detail signaling data and then outputs the performed result to the frame builder 1500. The L1-Detail processor may further perform additional parity generation, bit demultiplexing for the generated additional parity data, and constellation mapping for the L1-Detail signaling data. Some of these functions may be performed only if a corresponding condition is satisfied, or may be omitted unconditionally. If the MIMO scheme is applied, the L1-Detail signaling data processed by the L1-Detail processor are output to the first and second frame builders 1500 and 1550.

That is, the L1-Basic signaling data and the L1-Detail signaling data are encoded by a concatenation scheme of BCH outer code and LDPC inner code. At this time, to provide various robustness levels suitable for supporting a wide SNR range, protection levels of the L1-Basic signaling data and the L1-Detail signaling data are categorized into seven modes based on LDPC code, modulation order, and shortening/puncturing parameters. In one embodiment, the respective mode haves their respective combinations for LDPC code, modulation order, constellation and shortening/puncturing pattern.

In the present invention, the number of information bits in which one encoded block is included is referred to as Ksig. At this time, L1 signaling bits of a Ksig length correspond to one LDPC encoded block. In the present invention, since a value of Ksig for the L1-Basic signaling data is fixed to 200 but the number of bits of the L1-Detail signaling data is variable, a value of Ksig value for the L1-Detail signaling data is a variable. Therefore, if the number of bits of the L1-Detail signaling data is greater than a maximum value of Ksig, segmentation computation is additionally applied to the L1-Detail signaling data.

If a length of BCH encoded bit for the L1-Basic signaling data and the L1-Detail signaling data is smaller than a length of a bit which will be LDPC encoded, zero padding for filling zero padding bits in the bit which will be LDPC encoded as much as a difference between the lengths is performed and then LDPC encoding is performed. Therefore, zero padding is performed only if this condition is satisfied. If zero padding is performed, zero padding bits are removed after repetition/puncturing procedure without being transmitted.

Also, in one embodiment of the present invention, when bit demultiplexing is performed for the L1-Basic signaling data and the L1-Detail signaling data, demultiplexing is performed after block interleaving is performed.

FIG. 14(*a*) is a diagram illustrating one embodiment of a block interleaving procedure of a block interleaver within a bit demultiplexing block provided in each of the L1-basic processor and the L1-Detail processor, and FIG. 14(*b*) is a diagram illustrating one embodiment of a demultiplexing procedure after block interleaving.

First of all, referring to FIG. 14(*a*), a length of bits (e.g., $N_{FEC}$ or $N_{FEC}+N_{FECrepeat}$) input for bit demultiplexing is serially written in a column direction of a block interleaver memory. At this time, the number of columns is equal to the modulation order.

In reading computation, bits for one constellation symbol are sequentially read in a row direction and then fed for bit demultiplexing. This computation continues to reach the last column.

Each block interleaved group is demultiplexed prior to constellation mapping in a bit-by-bit unit within one group.

In the present invention, there are two mapping rules in accordance with the modulation order. That is, in case of QPSK, reliability of bits within a symbol is constant in one embodiment. Therefore, one bit group read from the block interleaver is directly mapped into QAM symbol without interleaving procedure. Meanwhile, in case of higher order modulation, one bit group is mapped into QAM symbol in accordance with a rule described below.

$$S_{demux\_in}(i)=\{b_i(0),b_i(1),b_i(2),\ldots,b_i(\eta_{MOD}-1)\},$$

$$S_{demux\_out}(i)=\{c_i(0),c_i(1),c_i(2),\ldots,c_i(\eta_{MOD}-1)\},$$

$$c_i(0)=b_i(i\ \%\ \eta_{MOD}), c_i(1)=b_i((i+1)\%\ \eta_{MOD}),\ldots,c_i(\eta_{MOD}-1)=b_i((i+\eta_{MOD}-1)\%\ \eta_{MOD})$$

In this case, i % $\eta_{MOD}$ means the remainder obtained by dividing i by $\eta_{MOD}$, and i indicates a bit group index corresponding to a row index in block interleaving. That is, an output bit group $S_{demux\_out}(i)$ is cyclically shifted from $S_{demux\_in}(i)$ in accordance with a bit group index i. FIG. 14(*b*) illustrates an example of a bit demultiplexing procedure for 16-NUC.

FIG. 15 is a diagram illustrating one embodiment of a syntax of L1-Basic signaling data according to the present invention.

The following fields are parameters related to system and frame.

L1B_version field indicates a version of L1-Basic signaling structure.

L1B_mimo_scattered_pilot_encoding field indicates which MIMO pilot encoding method is used by MIMO subframes of a current frame.

L1B_lls_flag field indicates whether Low Level Signaling (LLS) exists in one or more PLPs of the current frame.

L1B_time_info_flag field indicates whether timing information exists in the current frame.

L1B_return_channel_flag field indicates whether a dedicated return channel (DRC) of the current frame, the current frequency band and a current broadcast network exists.

L1B_papr field indicates whether a PAPR has been used, and indicates which scheme has been used if the PAPR has been used. The PAPR technology may be applied to all other OFDM symbols except the first preamble symbol of the current frame.

L1B_frame_length_mode field is set to 0 when the current frame is a time-aligned frame (that is, OFDM symbol not preamble) having arrangement of an excess sample added to a guard interval period of data payload OFDM symbols (that is, non-preamble OFDM symbols). On the contrary, the L1B_frame_length_mode field is set to 1 when the current frame is a symbol-aligned frame having no excess sample arrangement.

L1B_frame_length field indicates a time period from the start of a first sample of a bootstrap correlated with the current frame to the end of the last sample of the current frame.

L1B_excess_samples_per_symbol field exists only in case of the time-aligned frame, and indicates the number of excess samples included in a guard interval of each OFDM symbol (that is, non-Preamble OFDM symbol) not a preamble of a part after a bootstrap of the current frame.

L1B_time_offset field exists only in case of the symbol-aligned frame, and indicates the number of sample periods.

L1B_additional_samples field exists only in case of the symbol-aligned frame, and indicates the number of additional samples.

L1B_num_subframes field indicates the number of subframes within the current frame, and is set to a value smaller than the number of subframe within the current frame as much as 1.

The following fields are parameters that provide information required to decode the remaining part of the preamble, that is, L1-Detail signaling data.

L1B_preamble_num_symbols field indicates the number of OFDM symbols included in the other preambles except the first preamble symbol.

L1B_preamble_reduced_carriers field indicates the number of control unit of carriers for reducing the maximum number of carriers defined per FFT size used in the preamble. The carrier reduction may be applied to all the preamble symbols of the current frame except the first preamble symbol.

L1B_L1_Detail_content_tag field is increased by 1 when L1-Detail signaling data of the current frame is changed as compared with L1-Detail signaling data of a previous frame having a bootstrap of the same major version and the same minor version as those of the current frame.

L1B_L1_Detail_size_bytes field indicates a size of L1-Detail signaling data. At this time, additional parity is not included in the current frame for L1-Detail signaling data of next frame.

L1B_L1_Detail_fec_type field indicates FEC type for protection of L1-Detail signaling data.

L1B_L1_Detail_additional_parity_mode field indicates an Additional Parity Mode.

L1B_L1_Detail_total_cells field indicates a total size of additional modulated parity bits of coded and modulated L1-Detail signaling data combined for the current frame and L1-Detail signaling data of next frame on an OFDM cell basis.

The following fields are parameters for the first subframe, and in one embodiment, the first subframe of the current frame is signaled to the L1-Basic signaling data such that the receiver may immediately perform initial OFDM processing at the corresponding first subframe without waiting until the L1-Detail signaling data is decoded.

L1B_first_sub_mimo field indicates whether MIMO has been used at the first subframe of the current frame.

L1B_first_sub_miso field indicates whether MISO has been used at the first subframe of the current frame.

L1B_first_sub_fft_size fields indicates FFT size related to the first subframe of the current frame.

L1B_first_sub_reduced_carriers field indicates a control unit value for reducing the maximum number of carriers defined per FFT size which is used at the first subframe of the current frame.

L1B_first_sub_guard_interval field indicates a guard interval length of OFDM symbols at the first subframe of the current frame.

L1B_first_sub_num_ofdm_symbols field indicates the number of OFDM symbols included in the first subframe of the current frame.

L1B_first_sub_scattered_pilot_pattern field indicates a scattered pilot pattern of the first subframe of the current frame.

L1B_first_sub_scattered_pilot_boost field indicates a power of a scattered pilot of the first subframe of the current frame by being combined with the scattered pilot pattern.

L1B_first_sub_sbs_first field indicates whether the first symbol of the first subframe of the current frame is a subframe boundary symbol.

L1B_first_sub_sbs_last field indicates whether the last symbol of the first subframe of the current frame is a subframe boundary symbol.

FIGS. 16 to 18 are diagrams illustrating one embodiment of a syntax of L1-Detail signaling data according to the present invention.

The following fields are miscellaneous parameters.

L1D_version field indicates a version of L1-Detail signaling structure used in the current frame.

L1D_time_sec field indicates a second unit of time information.

L1D_time_msec field indicates a milliseconds component of time information.

L1D_time_usec field indicates a microseconds component of time information.

L1D_time_nsec field indicates a nanoseconds component of time information.

The following fields are parameters for L1-Detail channel bonding. A channel bonding method for increasing a transmission data rate by combining multiple RF channels may be applied to the present invention. In this case, the following fields are signaled.

L1D_num_rf field indicates the number of frequency related to channel bonding of the current system except the current channel frequency.

L1D_rf_id field identifies IDs of the other RF channels related to channel bonding.

L1D_rf_frequency field indicates a center frequency of the other RF channel.

The following fields, that is, L1D_mimo field, L1D_miso field, L1D_fft_size field, L1D_reduced_carriers field, L1D_guard_interval field, L1D_num_ofdm_symbols field, L1D_scattered_pilot_pattern field, L1D_scattered_pilot_boost field, L1D_sbs_first field, and L1D_sbs_last field are parameters related to subframes, and are repeated as much as the number of subframes included in the current frame. Each field will be understood with reference to the description of the fields signaled to L1-Basic signaling data, and its description will be omitted.

L1D_subframe_multiplex field indicates whether the current subframe has been time-division multiplexed with a subframe concatenated in time.

L1D_frequency_interleaver field indicates whether a frequency interleaver has been used for the current subframe.

L1D_sbs_null_cells field indicates the number of null cells included in a subframe boundary symbol at the current subframe.

The following fields are parameters related to PLP.

L1D_num_plp field indicates the number of PLPs used at the current subframe.

L1D_plp_id field indicates an identifier of a current PLP.

L1D_plp_lls_flag field indicates whether LLS information is included in the current PLP.

L1D_plp_size field indicates the number of data cells allocated to PLP within the current subframe.

L1D_plp_scrambler_type field indicates a scrambling scheme of a corresponding PLP.

L1D_plp_fec_type field indicates FEC scheme used for encoding of the current PLP as listed in Table 6.

TABLE 6

| Value | Forward Error Correction Method |
| --- | --- |
| 0000 | BCH + 16K LDPC |
| 0001 | BCH + 64K LDPC |
| 0010 | CRC + 16K LDPC |
| 0011 | CRC + 64K LDPC |
| 0100 | 16K LDPC only |
| 0101 | 64K LDPC only |
| 0110-1111 | Reserved for future use |

L1D_plp_mod field indicates a modulation scheme used for the current PLP.

L1D_plp_cod field indicates a code rate used for the current PLP.

L1D_plp_TI_mode field indicates an interleave mode of the current PLP.

L1D_plp_fecframe_start field indicates a starting position of the first FEC frame in PLP within the current subframe.

The following fields are parameters related to LDM.

L1D_plp_layer field is set in the same manner as a layer index of the current PLP.

L1D_plp_ldm_injection_level field indicates a relative injection level of an enhanced layer as compared with the core layer.

The following fields are PLP based channel bonding parameters, and if L1D_num_rf=0, the following fields are not included in the L1-Detail signaling data.

L1D_plp_num_channel_bonded field indicates the number of frequencies related to a channel bonding PLP of the current system except the current channel frequency.

L1D_plp_bonded_rf_id field indicates an identifier of a channel RF for performing channel bonding with the current PLP.

L1D_plp_channel_bonding_format field indicates a channel bonding format for the current PLP.

The following fields are parameters related to PLP based MIMO.

L1D_plp_mimo_stream_combining field indicates whether a stream combination option of MIMO precoding has been used for a given PLP.

L1D_plp_mimo_IQ_interleaving field indicates whether IQ polarity interleaving option of MIMO precoding has been used for the given PLP.

L1D_plp_mimo_PH field indicates whether a phase hopping option of MIMO precoding has been used for the given PLP.

The following fields are parameters related to cell multiplexing.

L1D_plp_start field is set in the same manner as an index of the first data cell of the current PLP at the current subframe.

L1D_plp_type field indicates whether a type of the PLP is a dispersed PLP or a non-dispersed PLP.

L1D_plp_num_subslices field indicates the number of sub-slices used for the current PLP of the current subframe.

L1D_plp_subslice_interval field is set in the same manner as the number of sequential index data cells from the start of a current sub-slice to the start of next sub-slice.

The following fields are parameters related to time interleaving.

L1D_plp_TI_extended_interleaving field indicates whether extended interleaving is used.

The following fields are Convolutional Time Interleaver Mode Parameters among the parameters related to time interleaving.

L1D_plp_CTI_depth field indicates the number of rows of a convolutional interleaver (memory).

L1D_plp_CTI_start_row field indicates a position of a starting switch of a convolutional interleaver at the start of the subframe.

L1D_plp_CTI_fecframe_start field indicates a starting position of a first perfect FEC frame of the current PLP leaving CTI within current or next subframes.

The following fields are Hybrid Time Interleaver (Mode) Parameters among the parameters related to time interleaving.

L1D_plp_HTI_inter_subframe field indicates a hybrid time interleaving mode.

L1D_plp_HTI_num_ti_blocks field indicates the number of TI blocks per interleaving frame in an intra-subframe mode and the number of subframes at which cells of one TI block are transmitted in an inter-subframe mode.

L1D_plp_HTI_num_fec_blocks_max field indicates the maximum number of FEC blocks per interleaving frame for the current PLP.

L1D_plp_HTI_num_fec_blocks field indicates the number of FEC blocks included in a current interleaving frame for the current PLP.

L1D_plp_HTI_cell_interleaver field indicates whether a cell interleaver is used.

Reception System

A reception system according to the present invention may perform a reverse procedure of the transmission system of FIG. 1.

FIG. 19 is a schematic block diagram illustrating one embodiment of a broadcast signal reception apparatus (or reception system) according to the present invention, and may be applied when a reverse procedure of the transmission system of FIG. 1 is performed. In the reception system of FIG. 19, some blocks may be omitted in accordance with intention of a designer, and some blocks may be replaced by other blocks having similar or the same function.

In FIG. 19, a first OFDM demodulation unit 3100, a first frame parsing unit 3200, a first reverse BICM unit 3500 except a second demapper 3502 and a MIMO MUX 3503, a first output processor 3600 and L1 signaling processor 3700 are basic blocks commonly applied to the LDM scheme and the MIMO scheme. If the LDM scheme is applied to the present invention, an LDM processor 3400, a second reverse BICM unit 3550, and a second output formatting unit 3650 are further required. Also, if the MIMO scheme is applied to the present invention, a second OFDM demodulation unit 3150, a second frame parsing unit 3150, a second frame parsing unit 3250, a MIMO processor 330, and the second demapper 3502 and the MIMO MUX 3503 of the first reverse BICM unit 3500 are further required. The aforementioned blocks may be omitted in accordance with intention of a designer, or may be replaced with other blocks having similar or the same function.

The first OFDM demodulation unit 3100 may include a tuner 3101, a bootstrap detector 3102, a guard interval detector 3103, an FFT unit 3104, a channel equalizer 3105, and a MISO processor 3106. The MISO processor 3106 is also referred to as a MISO decoder. The order of the respective blocks is one embodiment for assisting understanding of the present invention, and the order of some blocks may be changed in accordance with a designer, or new blocks may further be provided.

The tuner 3101 receives a broadcast signal of a specific channel through a first antenna and outputs the broadcast signal to the bootstrap detector 3102.

The bootstrap detector 3102 detect a bootstrap within the corresponding frame from the input signal, and extracts bootstrap information from bootstrap symbols transmitted from the detected bootstrap. For example, the bootstrap detector 3102 may detect the bootstrap by performing bootstrap energy detection using a bootstrap sequence. The bootstrap information extracted from the bootstrap symbols may be provided to blocks that need this bootstrap information, and/or may be stored in a storage unit (not shown) for later use.

For example, the bootstrap information extracted from the bootstrap symbols may include wake-up information for emergency alarm, version information, a structure of preamble symbols, for example, FFT size of the preamble symbols, a guard interval, a scattered pilot pattern, and FEC mode of L1-Basic signaling data. The FFT size of the preamble symbols may be used for frequency deinterleaving of the preamble symbols in the frequency deinterleaver 3201.

In one embodiment of the present invention, FFT size and guard interval duration in all the preamble symbols within a frame are equal to each other. In the present invention, frame configuration of the signal currently received from the bootstrap information may be identified. Also, in one embodiment, if the bootstrap information is extracted from the bootstrap detector 3201, the bootstrap symbols are deleted from the input signal and then output to the guard interval detector 3103.

The guard interval detector 3103 detects a guard interval from the input signal, deletes the guard interval and then outputs the input signal to the FFT unit 3104.

At this time, a synchronization block for performing time synchronization and frequency synchronization using the bootstrap information may further be included between the bootstrap detector 3102 and the guard interval detector 3103. Alternatively, the synchronization block may be included at an output terminal of the guard interval detector 3103.

The FFT unit 3104 transforms the input signal to the frequency domain and outputs the input signal to the channel equalizer 3105. The channel equalizer 3105 estimates a transmission channel using pilots inserted in the transmission system, compensates for distortion of the received signal using the estimated transmission channel and then outputs the compensated signal to the MISO processor 3106.

In one embodiment of the present invention, the MISO scheme is applied to OFDM symbols of a subframe but not applied to a bootstrap or preamble. Whether the MISO scheme is applied to each subframe is signaled to L1B_first_sub_miso field and L1D_miso field of the L1 signaling data.

Therefore, the MISO processor 3106 determines whether to perform MISO decoding for the corresponding subframe by using at least the L1B_first_sub_miso field and the L1D_miso field of the information included in the L1 signaling data, and performs MISO decoding for the corresponding subframe in a reverse procedure of the transmission system or skips MISO decoding.

The frame parsing unit 3200 may include a frequency deinterleaver 3201, a frame parser 3202, and a time deinterleaver 3203.

In the transmission system of the present invention, frequency interleaving is essential for the preamble symbols, and is optional for data symbols included in the subframe. Whether frequency interleaving is performed per subframe is signaled to L1D_frequency_interleaver field of the L1-Detail signaling data.

Therefore, the frequency interleaver 3201 performs frequency deinterleaving for the preamble symbols output from the first OFDM demodulation unit 3100 in a reverse procedure of the transmission system and then outputs the result to the L1 signaling processor 3700.

The L1 signaling processor 3700 may include L1-Basic processor for performing a reverse procedure of the transmission system for the L1-Basic signaling data and L1-Detail processor for performing a reverse procedure of the transmission system for the L1-Detail signaling data.

The L1-Basic processor sequentially performs constellation demapping, bit MUX, zero padding, depuncturing, parity depermutation, LDPC decoding, zero removing, BCH decoding, and descrambling for the L1-Basic signaling data of the L1 signaling data transmitted to the preamble symbols and then extracts information included in the L1-Basic signaling data. Some of these functions may be omitted in accordance with intention of a designer, or may be performed by other blocks having a similar or the same function. The information extracted from the L1-Basic signaling data may be provided to blocks that need this information, and/or may be stored in a storage unit (not shown) for later use. For example, in one embodiment, the L1B_first_sub_miso field value extracted from the L1-Basic signaling data is output to the MISO processor 3106.

The L1-Detail processor sequentially performs constellation demapping, bit MUX, zero padding, depuncturing, parity depermutation, LDPC decoding, zero removing, BCH decoding, descrambling, and desegmentation for the L1-Detail signaling data of the L1 signaling data transmitted to the preamble symbols and then extracts information included in the L1-Detail signaling data. If parity data have been added to the L1-Detail signaling data in the transmission system, the L1-Detail processor may further perform constellation demapping and bit MUX for additional parity data and then extract the parity data. Some of these functions may be omitted in accordance with intention of a designer, or may be performed by other blocks having a similar or the same function. The information extracted from the L1-Detail signaling data may be provided to blocks that need this information, and/or may be stored in a storage unit (not shown) for later use. For example, in one embodiment, the L1D_miso field value extracted from the L1-Detail signaling data is output to the frequency deinterleaver 3201.

The frequency deinterleaver 3201 performs frequency deinterleaving for the corresponding subframe based on L1D_frequency_interleaver field value provided from the L1 signaling processor 3700, or skips frequency deinterleaving.

In one embodiment of the present invention, if frequency deinterleaving is performed for the corresponding subframe based on the L1D_frequency_interleaver field value, frequency deinterleaving is performed using one memory. The frequency deinterleaving is operated for data cells within one OFDM symbol.

A procedure of performing frequency deinterleaving using one memory will be described in detail.

A frame that includes preamble symbol(s) for which the frequency deinterleaving is performed by the frequency deinterleaver 3202 and symbols of subframe(s) for which the frequency deinterleaving is performed or frequency deinterleaving is skipped is output to the frame parser 3202 and then parsed therein. PLPs included in the subframe(s) parsed by the frame parser 3202 are output to the time deinterleaver 3203 operating per PLP.

In the transmission system of the present invention, one of three modes, a no time interleaving mode, a Convolutional Time Interleaver (CTI) mode, and a Hybrid Time Interleaver (HTI) mode of time interleaving is applied to each PLP as shown in FIG. 6 as one embodiment. Since each mode has been described in detail in the description of time interleaving of the transmission system, its detailed description will be omitted.

FIG. 20(a) is a schematic block diagram illustrating one embodiment of a convolutional time deinterleaver 20001 when a CTI mode is applied to an nth PLP according to the present invention, and FIG. 20(b) is a schematic block diagram illustrating one embodiment of a hybrid time deinterleaver when an HTI mode is applied to the nth PLP according to the present invention.

The convolutional time deinterleaver of FIG. 20(a) performs convolutional time deinterleaving for corresponding PLP data in a reverse procedure of the transmission system by using at least L1D_plp_CTI_depth field, L1D_plp_CTI_start_row field and L1D_plp_CTI_fecframe_start field values of the information included in the L1 signaling data.

In one embodiment, the hybrid time deinterleaver of FIG. 20(b) includes a convolutional deinterleaver 4101, a block deinterleaver 4103, and a cell deinterleaver 4105. In this case, the convolutional deinterleaver 4101 and the cell deinterleaver 4105 are optionally used in the same manner as the transmission system.

In one embodiment of the present invention, whether to use the convolutional deinterleaver 4101 is determined based on L1D_plp_HTI_inter_subframe field included in the L1-detail signaling data, and whether to use the cell deinterleaver 4105 is determined based on L1D_plp_HTI_cell_interleaver field value included in the L1-Detail signaling data.

Therefore, the hybrid time deinterleaver of FIG. 20(b) performs hybrid time deinterleaving for corresponding PLP data in a reverse procedure of the transmission system by using at least L1D_plp_HTI_inter_subframe field, L1D_plp_HTI_num_ti_blocks field, L1D_plp_HTI_num_fec_blocks_max field, L1D_plp_HTI_num_fec_blocks field and L1D_plp_HTI_cell_interleaver field values.

If the MIMO scheme is applied to the present invention, the corresponding time deinterleaved PLP data are output to the MIMO processor 3300, and if the LDM scheme is applied to the present invention, the corresponding time interleaved PLP data are output to the LDM processor 3400 by skipping or bypassing the MIMO processor 3300. Also, if neither the MIMO scheme nor the LDM scheme is applied to the present invention, the corresponding time interleaved PLP data are output to the first reverse BICM unit 3500 by skipping or bypassing the MIMO processor 3300 and the LDM processor 3400. In the present invention, whether to use the MIMO scheme and whether to use the LDM scheme may be identified by information signaled to the L1 signaling data.

If the LDM scheme is applied to the present invention, the LDM processor 3400 splits core layer PLP data and enhanced layer PLP data from the input PLP data by performing a reverse procedure of the LDM processor of the transmission system using at least L1D_plp_layer field and L1D_plp_ldm_injection_level field of the information included in the L1 signaling data, outputs the split core layer PLP data to the first reverse BICM unit 3500, and outputs the enhanced layer PLP data to the second reverse BICM unit 3550.

The first demapper 3501, the bit deinterleaver 3504, and the decoding unit 3505 in the first reverse BICM unit 3500 are basic blocks when any one of the MIMO scheme and the LDM scheme is applied or both of them are not applied. The first reverse BICM unit 3500 operates per PLP in the same manner as the transmission system.

The first demapper 3501 performs symbol demapping for corresponding PLP data in a reverse procedure of the mapper 2300 of the transmission system by using at least L1D_plp_mod field of the information included in the L1 signaling data, and performs bit deinterleaving for the scorrespodning PLP data symbol demapped in a reverse procedure of the bit interleaver 2200 of the transmission system. The detailed description of the first demapper 3501 will be understood with reference to the description of the transmission system and thus will be omitted.

The decoding unit 3505 includes an inner decoder 4301 and an outer decoder 4303 as shown in FIG. 21. The inner decoder 4301 performs LDPC decoding in a reverse procedure of the inner encoder 2102 of the transmission system by using at least L1D_plp_fec_type field and L1D_plp_cod field of information included in the L1 signaling data.

Even in the transmission system of the present invention, the outer decoder 4303 has three options. That is, BCH decoding may be performed for corresponding PLP data input by being LDPC decoded, CRC decoding may be performed, or outer decoding may not be performed. The outer decoder 4303 performs one of BCH decoding and CRC decoding in a reverse procedure of the outer encoder 2101 of the transmission system by using at least L1D_plp_fec_type field of the information included in the L1 signaling data, or skips the decoding procedure.

The corresponding PLP data processed in a reverse procedure of the transmitting side in the first reverse BICM unit 3500 are output to the first output processor 3600. The corresponding PLP data is input to the first output processor 3600 in a baseband packet unit, and a detailed description of the baseband packet will be understood with reference to the description of the transmission system and will be omitted herein.

The first output processor 3600 may include a BBP deformatter 3601 and a decapsulator 3602, wherein the decapsulator 3602 may be included in a link layer.

The BBP deformatter 3601 descrambles a baseband packet of an input corresponding PLP, and then extracts at least one ALP packet included in a payload of a corresponding baseband packet based on header information of the descrambled baseband packet and outputs the extracted ALP packet to the decapsulator 3602. The decapsulator 3602 restores broadcast service data from at least one ALP packet which is input. If the broadcast service data are included in TS packets, the decapsulator 3602 restores null packets deleted by the transmission system using a DNP field within a header with respect to the TS packets. Also, the broadcast service data may be included in IP packets, and the header of the IP packets may be compressed. If the header of the IP packets is compressed, the reverse procedure of the transmitting side is performed to release compression.

In the present invention, since the second reverse BICM unit 3550 for processing PLP data of the enhanced layer includes the same blocks as blocks of the first reverse BICM unit 3500 except the second demapper 3502 and the MIMO MUX 3503, the detailed description of the second reverse BICM unit 3550 will be omitted.

Also, in the present invention, since the second output processor 3650 for processing PLP data of the enhanced layer includes the same blocks as blocks of the first output processor 3600, the detailed description of the second output processor 3650 will be omitted.

Meanwhile, if the MIMO scheme is applied to the present invention, the first OFDM demodulation unit 3100 performs OFDM demodulation by receiving a broadcast signal through a first antenna, and the second OFDM demodulation unit 3150 performs OFDM demodulation by receiving a broadcast signal through a second antenna.

At this time, since each of the second OFDM demodulation unit 3150 and the second frame parsing unit 3250 includes the same blocks as those of the first OFDM demodulation unit 3100 and the first frame parsing unit 3200, their detailed description will be omitted.

In one embodiment of the present invention, the MIMO scheme is not applied to the preamble symbol, and is not used together with the LDM scheme.

In one embodiment, the MIMO processor 3300 performs MIMO decoding in a reverse procedure of the transmitting side by receiving the data time interleaved by the first frame parsing unit 3200 and the data time interleaved by the second frame parsing unit 3250 based on at least L1B_first_sub_mimo field and L1D_mimo field of the L1 signaling data and then outputs the decoded result to each of the first demapper 3501 and the second demapper 3502 of the first reverse BICM unit 3500. In one embodiment of the present invention, MIMO decoding is performed using a full-rate spatial multiplexing (FR-SM) scheme to provide capacity increase through relatively small complexity increase. Also, in one embodiment of the present invention, MIMO processing is applied at a PLP level.

In the transmission system of the present invention, the same constellations for MIMO processing are used for MIMO, and the same modulation order is transmitted from two transmitting antennas.

Therefore, each of the first demapper 3501 and the second demapper 3502 performs constellation demapping based on the aforementioned description.

A signal of a specific cell output by being constellation demapped by the first demapper 3501 is referred to as a first output signal, and a signal of the same cell output by being constellation demapped by the second demapper 3502 is referred to as a second output signal. The MIMO MUX 3503 multiplexes the first output signal and the second output signal into one signal, and outputs the multiplexed signal to the bit deinterleaver 3504. Since the operation of the bit deinterleaver 3504 and a subsequent operation have been described above, their description will be omitted herein.

Figure 22:
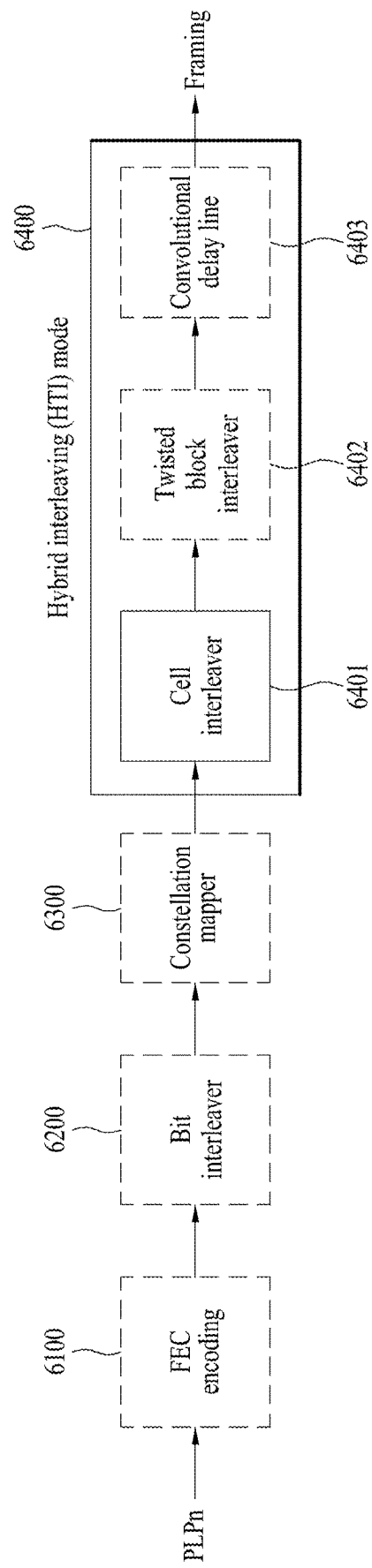
FIG. 22 is a diagram illustrating an operation of a transmission apparatus according to the present invention.

FIG. 22 is a diagram illustrating an operation of a transmission apparatus according to the present invention.

The transmission apparatus according to one embodiment of the present invention may include an FEC encoder block 6100, a bit interleaver block 6200, a mapper block 6300, and/or a hybrid time interleaver (HTI) 6400.

The hybrid time interleaver 6400 may include a cell interleaver 6401, a block interleaver 6402, and/or a delay line (or latency line) 6403. Each component may be implemented as an independent hardware processor, or may be implemented by being included in at least one or more hardware processors. For conciseness, a control and signaling information flow is not shown in FIG. 22.

The FEC encoder 6100 may perform FEC encoding by receiving the baseband packet generated for the nth PLP. The FEC encoder 6100 may generate and output FEC frame.

The bit interleaver 6200 may include a parity interleaver, a group-wise interleaver, and/or a block interleaver. The bit interleaver 6200 may perform bit interleaving for the FEC frame input as described above.

The constellation mapper 6300 maps bit interleaved bits into QAM constellation points having a complex number value on IQ plain. Bits or bit group mapped into one QAM constellation point may be referred to as one cell. The cells output from the mapper may be input to the time interleaver. Hereinafter, the constellation mapper may be referred to as a mapper.

The time interleaver according to one embodiment of the present invention may operate in an HTI mode or a CTI mode. As shown, the time interleaver operates in an HTI mode. In the HTI mode, the time interleaver may include a cell interleaver 6401, a twisted block interleaver 6402, and/or a convolutional delay line 6403.

The cell interleaver 6401 may receive cells input on an FEC blocks basis. The cell interleaver performs cell interleaving for cells within each FEC block and arranges the cells as TI blocks. The cell interleaver may use a different random permutation or cell interleaving sequence for each FEC block.

The block interleaver 6402 performs intra-subframe interleaving by performing block interleaving or twisted block interleaving for the TI blocks.

The convolutional delay line or the delay line 6403 performs inter-subframe interleaving for the cells of the block interleaved TI block. As a result, one block interleaved TI block is spread into several subframes.

Figure 23:
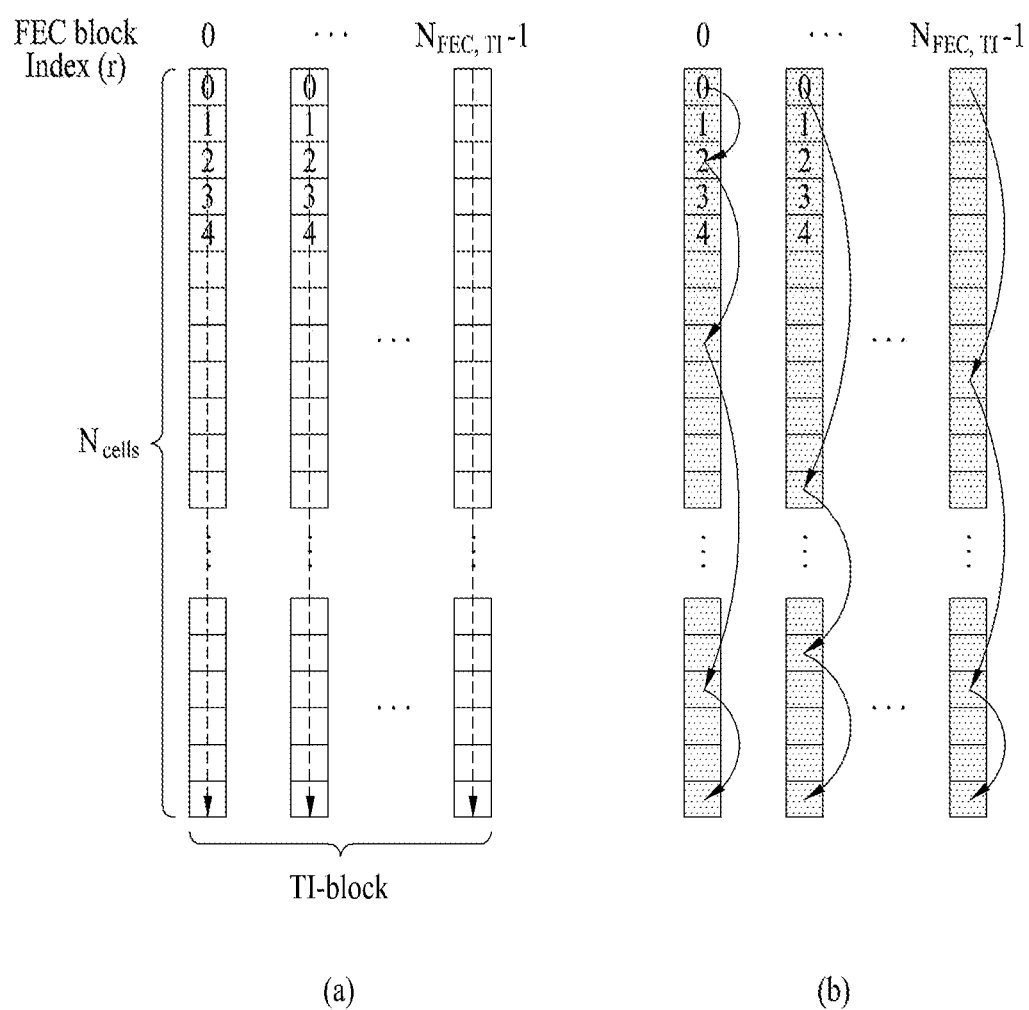
FIG. 23 is a diagram illustrating an operation of a cell interleaver according to the present invention.

FIG. 23 is a diagram illustrating an operation of a cell interleaver according to the present invention.

The cell interleaver according to one embodiment of the present invention may perform (a) a linear writing operation and (b) a random reading operation.

The random reading operation is performed based on cell interleaving address. A cell interleaving address generator may generate a series of addresses, which may correspond to a random position on a memory. The cell interleaver may perform random reading for reading cells from a position of the memory corresponding to a series of the generated addresses.

The cell interleaver according to one embodiment of the present invention may apply a different cell interleaving pattern or cell interleaving sequence to each FEC block. The cell interleaving address generator may generate different cell interleaving patterns by adding a shift value to a permutation.

If the number of cells included in FEC blocks is $N_{cells}$, a shift value (modulo $N_{cells}$) may be added to a permutation generated by a bit-reversed value of $N_d$ bit counter increased in accordance with a relation $N_d = \lceil \log_2 N_{cells} \rceil$. In permutation address and shift, a value exceeding $N_{cells}$ may be discarded, and next value may be generated within a sequence.

Since a memory required for an interleaving operation of the cell interleaver 6401 according to one embodiment of the present invention is determined in accordance with the time interleaver, the time interleaver is efficiently performed, whereby the cell interleaver may efficiently use the memory.

Figure 24:
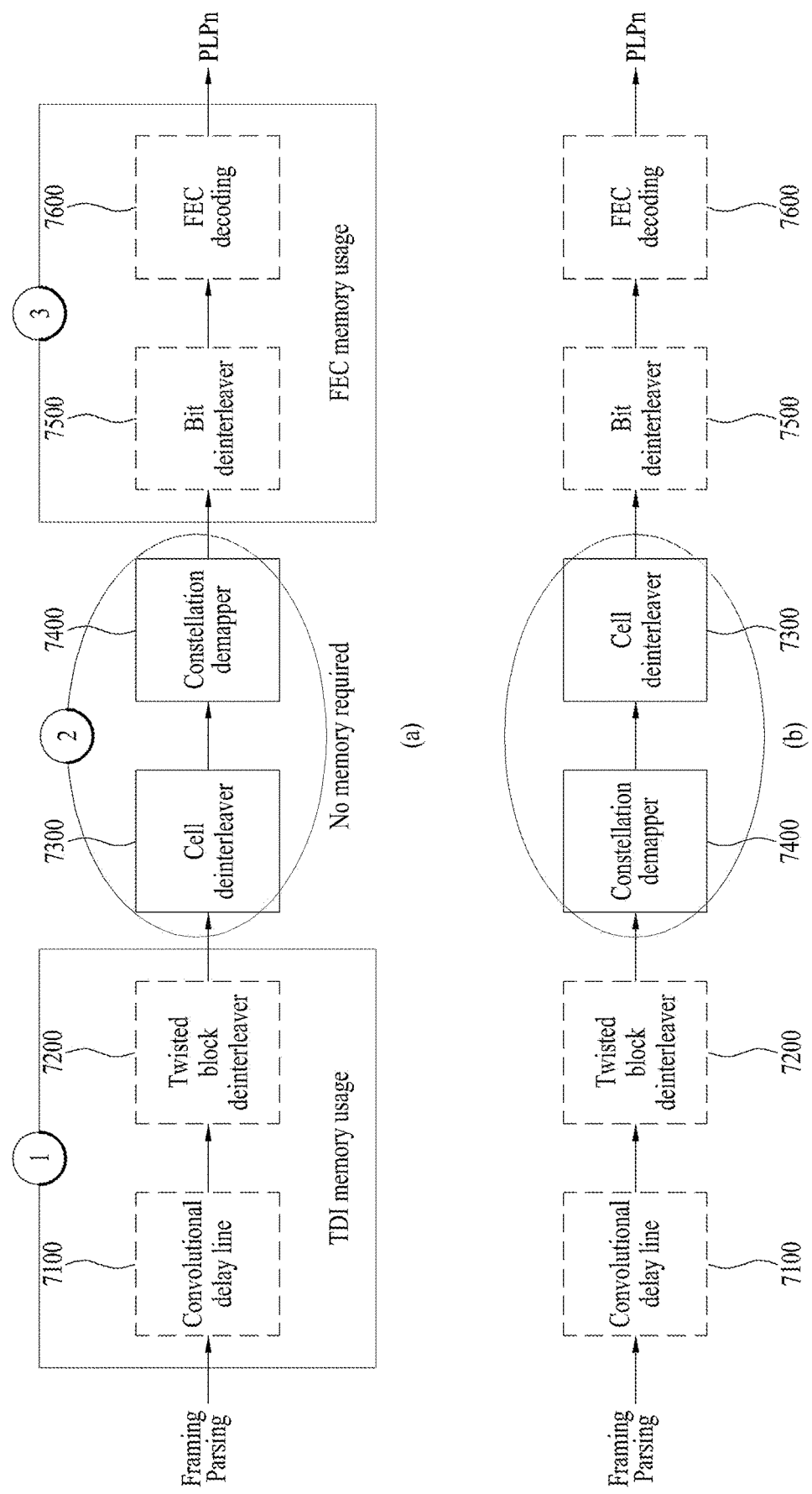
FIG. 24 is a diagram illustrating an operation of a reception apparatus according to the present invention.

FIG. 24 is a diagram illustrating an operation of a broadcast signal reception apparatus according to one embodiment of the present invention.

The broadcast signal reception apparatus according to one embodiment of the present invention may include a delay line 7100 block, a block deinterleaver 7200 block, a cell deinterleaver 7300, a demapper 7400, a bit deinterleaver 7500, and/or an FEC decoder 7600.

The constellation delay line 7100 may perform a reverse procedure of the delay line 1515 of the transmission apparatus. Hereinafter, the constellation delay line may be referred to as a delay line.

The twisted block line deinterleaver 7200 may perform a reverse procedure of the block interleaver 6402 of the transmission apparatus. Hereinafter, the twisted block deinterleaver may be referred to as a block deinterleaver.

The cell deinterleaver 7300 may perform deinterleaving for the cells which are cell interleaved, and its detailed description will be given below.

The demapper 7400 may perform demapping for the bit group mapped into cell, and its detailed description will be given below.

The bit deinterleaver 7500 may perform deinterleaving for the bit interleaved FEC frame, and its detailed description will be given below.

The FEC decoder 7600 may perform a reverse procedure of the FEC encoder 6100 of the transmission apparatus.

The operation of the broadcast signal reception apparatus according to one embodiment of the present invention will be described in view of a user of the memory.

The delay line and the block deinterleaver may use a TDI memory together. The bit deinterleaver and the FEC decoder may use an FEC memory together.

A separate memory is not required for the cell deinterleaver and the demapper according to one embodiment of the present invention. The outputs of the cell deinterleaver and the constellation demapper may be written in the FEC memory, and their detailed description will be given below.

The cell deinterleaver and the demapper according to one embodiment of the present invention may be performed in the order of the cell deinterleaver 7300 and the demapper 7400 as shown in FIG. 24(*a*). Alternatively, the cell deinterleaver and the demapper according to one embodiment of the present invention may be performed in the order of the demapper 7400 and the cell deinterleaver 7300 as shown in FIG. 24(*b*).

Figure 25:
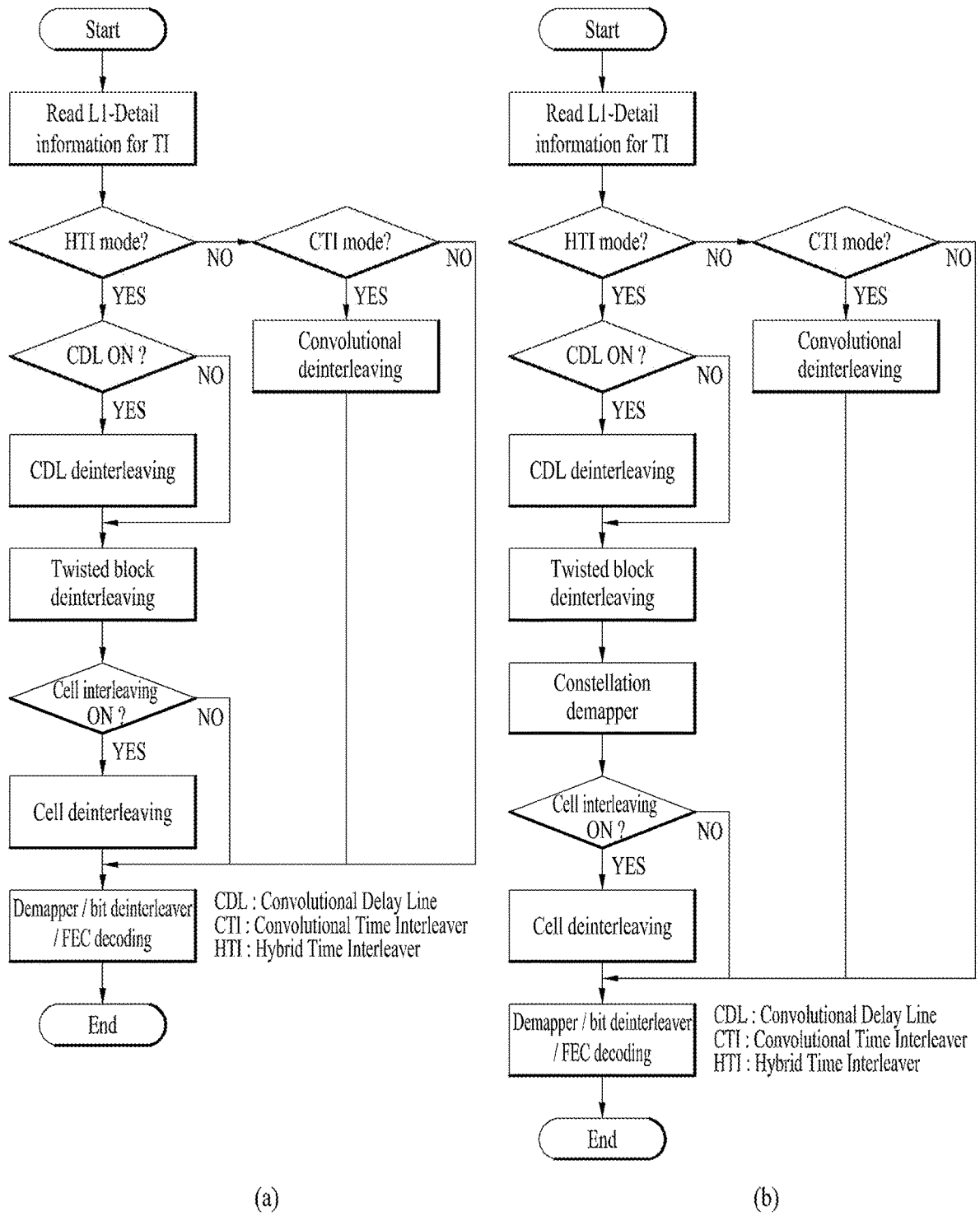
FIG. 25 is a diagram illustrating a time deinterleaving operation according to the present invention.

FIG. 25 is a diagram illustrating a time deinterleaving operation according to one embodiment of the present invention.

FIG. 25(*a*) illustrates a time deinterleaving operation according to one embodiment of the present invention.

The time interleaving operation may include a CTI mode or an HTI mode as described above. A mode of the time interleaving may be determined in accordance with a type of a service which is input.

If one service includes a single PLP of a constant cell rate, or includes a single core PLP of a constant cell rate and one or more enhanced PLPs layered division multiplexed with the single core PLP, one of no time interleaving, a CTI mode and an HTI mode may be applied to a PLP (or PLPs) constituting the service. On the other hand, one of no time interleaving or HTI mode may be applied to PLPs which are not included in the above category.

Also, the time interleaver mode (or modes) for PLPs of a specific service is applied independently from the time interleaver mode (or modes) for PLP (or PLPs) of other services transmitted through the same RF channel. If a specific service includes a plurality of core PLPs and/or PLPs which are not layered division multiplexed, the same or different time interleaving modes (that is, no time interleaving and/or HTI mode) may be applied to the PLPs, and/or the same or different time interleaver parameters may be applied to the PLPs.

For another example, if one service includes a plurality of components and each component is transmitted through each PLP, each PLP may be operated in a no time interleaving or HTI mode, and at this time, parameters of the HTI mode may be different from one another.

The broadcast signal reception apparatus according to one embodiment of the present invention may identify whether the time interleaving mode is no time interleaving mode, HTI mode or CTI mode based on signaling information. The broadcast signal reception apparatus may perform time deinterleaving based on signaling information. If the time interleaving mode is no time interleaving mode, the broadcast signal reception apparatus may bypass time deinterleaving. If the time interleaving mode is HTI mode, the broadcast signal reception apparatus may perform deinterleaving in accordance with the delay line and/or cell interleaving. If the time interleaving mode is CTI mode, the broadcast signal reception apparatus may perform deinterleaving using the delay line. A detailed procedure of deinterleaving is as follows.

If the transmitter does not perform time interleaving, the broadcast signal reception apparatus bypasses time deinterleaving for data. This case means that signaling information is not configured for any one of the HTI mode and the CTI mode. Afterwards, the broadcast signal reception apparatus may perform demapping, bit deinterleaving, and FEC decoding. Details of demapping, bit deinterleaving and FEC decoding follow reverse procedures of FEC encoding bit interleaving and mapping, which are described with reference to FIG. 2.

If the transmitter performs time interleaving of the CTI mode, the broadcast signal reception apparatus may perform delay line deinterleaving. A detailed procedure of delay line deinterleaving follows a reverse procedure of delay line interleaving described in FIG. 7. Afterwards, the broadcast signal reception apparatus may perform demapping, bit deinterleaving and FEC decoding for the delay line deinterleaved data. The operations of demapping, bit deinterleaving and FEC decoding follow reverse procedures of FEC encoding, bit interleaving and mapping, which are described in FIG. 2.

If the transmitter performs time interleaving of the HTI mode and does not perform time interleaving using the delay line, the broadcast signal reception apparatus may bypass deinterleaving using the delay line and perform block deinterleaving. A detailed procedure of block deinterleaving follows a reverse procedure of block interleaving described in FIG. 7.

If the transmitter performs time interleaving of the HTI mode and performs time interleaving using the delay line, the broadcast signal reception apparatus may perform deinterleaving using the delay line. A detailed procedure of deinterleaving using the delay line follows a reverse procedure of delay line interleaving described in FIG. 7. Afterwards, the block deinterleaver may perform block deinterleaving.

Meanwhile, after the broadcast signal reception apparatus according to one embodiment of the present invention performs block deinterleaving, the broadcast signal reception apparatus may perform cell deinterleaving.

If the transmitter does not perform cell interleaving, the broadcast signal reception apparatus may perform demapping, bit deinterleaving, and FEC decoding.

If the transmitter performs cell interleaving, the broadcast signal reception apparatus may perform cell deinterleaving. A detailed operation of cell deinterleaving of the broadcast signal reception apparatus according to one embodiment of the present invention will now be described in detail.

FIG. 25(*b*) illustrates a time deinterleaving operation according to another embodiment of the present invention.

The broadcast signal reception apparatus according to one embodiment of the present invention may read signaling information on time interleaving (TI), for example, L1-Detail. In this case, the signaling information may include information as to whether time interleaving is used and information on a time interleaving mode as described above.

The time deinterleaving operation based on the signaling information is as follows.

If the transmitter does not perform time interleaving, the broadcast signal reception apparatus may bypass time deinterleaving for data. This case means that signaling information is not configured for any one of the HTI mode and the CTI mode. Afterwards, the broadcast signal reception apparatus may perform demapping, bit deinterleaving, and FEC decoding. Detailed procedures of demapping bit deinterleaving and FEC decoding follow reverse procedures of FEC encoding bit interleaving and mapping, which are described with reference to FIG. 2.

If the transmitter performs time interleaving of the CTI mode, the broadcast signal reception apparatus may perform delay line deinterleaving. A detailed procedure of delay line deinterleaving follows a reverse procedure of delay line interleaving described in FIG. 7. Afterwards, the broadcast signal reception apparatus may perform bit deinterleaving and FEC decoding.

If the transmitter performs time interleaving of the HTI mode and does not perform time interleaving using the delay line, the broadcast signal reception apparatus may perform block deinterleaving. A detailed procedure of block deinterleaving follows a reverse procedure of block interleaving described in FIG. 8.

If the transmitter performs time interleaving of the HTI mode and performs time interleaving using the delay line, the broadcast signal reception apparatus may perform deinterleaving using the delay line. A detailed procedure of deinterleaving using the delay line follows a reverse procedure of delay line interleaving described in FIG. 7. Afterwards, the broadcast signal reception apparatus may perform block deinterleaving.

Meanwhile, after the broadcast signal reception apparatus according to one embodiment of the present invention performs block deinterleaving, the demapper may perform demapping. A detailed operation of the demapper will now be described in detail.

If the transmitter does not perform cell interleaving after demapping, the broadcast signal reception apparatus may perform bit deinterleaving, and FEC decoding. Details of bit deinterleaving and FEC decoding follow reverse procedures of FEC encoding and bit interleaving, which are described in FIG. 2.

If the transmitter performs cell interleaving after demapping, the cell deinterleaver may perform cell deinterleaving. A detailed operation of cell deinterleaving will now be described in detail. Afterwards, the broadcast signal reception apparatus may perform bit deinterleaving and FEC decoding.

Figure 26:
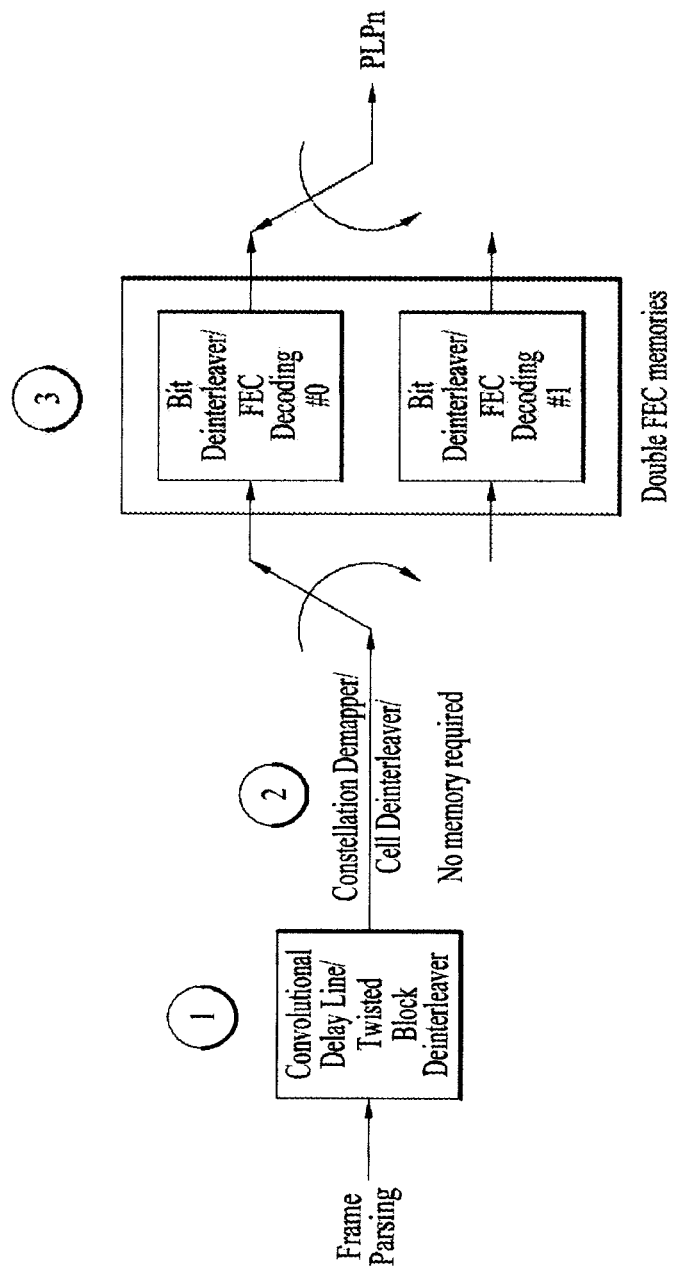
FIG. 26 is a diagram illustrating an operation of a reception apparatus according to the present invention.

FIG. 26 is a diagram illustrating a procedure of demapping and cell deinterleaving of a broadcast signal reception apparatus according to one embodiment of the present invention.

The broadcast signal reception apparatus according to one embodiment of the present invention receives a broadcast signal and parses a frame from the received broadcast signal.

The broadcast signal reception apparatus performs deinterleaving and/or block deinterleaving for data included in the parsed signal frame by using the delay line based on signaling information.

Afterwards, the broadcast signal reception apparatus may perform cell deinterleaving and demapping together. That is, the broadcast signal reception apparatus may consecutively perform cell deinterleaving and demapping on a cell basis. The broadcast signal reception apparatus may write the result of cell deinterleaving and demapping in a memory (hereinafter, FEC memory) for bit deinterleaving or FEC decoding. For example, the broadcast signal reception apparatus may write the result of cell deinterleaving and demapping for a first cell in the FEC memory. That is, the broadcast signal reception apparatus may write a bit group, in which the first cell is demapped, in the FEC memory based on a cell interleaving address. In this way, the broadcast signal reception apparatus according to one embodiment of the present invention may write the result of cell deinterleaving and demapping in the FEC memory without using a separate memory by performing cell deinterleaving and demapping on a cell basis.

The FEC memory is a memory for performing bit deinterleaving and FEC decoding, and may include two memories.

The cell interleaver uses a different cell interleaving pattern for each FEC block as described above. Therefore, the cell deinterleaver may apply a different cell deinterleaving pattern to each FEC block. The broadcast signal reception apparatus may use two FEC memories to perform cell deinterleaving for different FEC blocks.

The cell deinterleaver of the present invention may write FEC block interleaved by a first cell interleaving pattern in a first FEC memory while performing cell deinterleaving. The cell deinterleaver of the present invention may write FEC block interleaved by a second cell interleaving pattern in a second FEC memory while performing cell deinterleaving. That is, the broadcast signal reception apparatus according to one embodiment of the present invention may share and use FEC memory without requiring a separate memory for performing demapping and cell deinterleaving.

The broadcast signal reception apparatus according to one embodiment of the present invention may perform bit deinterleaving and FEC decoding for the FEC block written in the FEC memory and output the result of bit deinterleaving and FEC decoding on a PLP basis.

Figure 27:
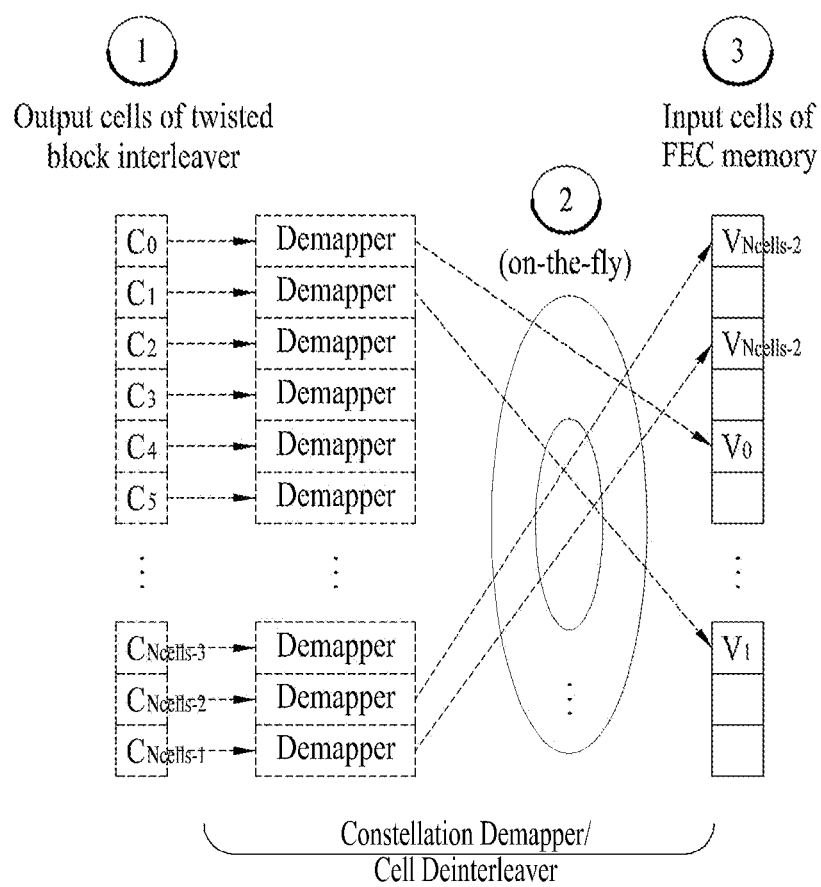
FIG. 27 is a diagram illustrating an operation of cell deinterleaving and demapping according to the present invention.

FIG. 27 is a diagram illustrating an operation of cell deinterleaving and demapping according to one embodiment of the present invention.

1) The block deinterleaver may perform a block deinterleaving operation, and the broadcast signal reception apparatus may read each cell, which is block deinterleaved, from a TDI memory. In this case, the order of cells output from the block deinterleaver or the twisted block deinterleaver is matched with the order of cells input to the block deinterleaver of the transmitter. Also, the cells output from the block deinterleaver correspond to cells input to the demapper and the cell deinterleaver.

2) The broadcast signal reception apparatus according to the present invention may perform demapping and cell deinterleaving in an on-the-fly scheme.

The on-the-fly scheme may mean a process for processing data in real time and immediately without using a separate memory. Hereinafter, the on-the-fly may be used to mean the aforementioned process.

After receiving cells output from the block deinterleaver, the demapper may perform demapping for the cells into bits or bit group. In this case, the bit group may mean bits included in each cell by the mapper of the transmitter.

A method for performing demapping in the demapper in an on-the-fly scheme is as follows.

The demapper may perform an operation for independently demapping each cell output from the block deinterleaver. Since the mapper of the transmitter independently performs mapping of each cell, the demapper of the receiver may also independently perform demapping of each cell.

The demapper may perform demapping in the on-the-fly scheme without using a separate memory for demapping. In this case, the demapped bit group may be output to the cell deinterleaver, whereby a cell deinterleaving writing operation may be performed. That is, the broadcast signal reception apparatus may perform demapping and cell deinterleaving on a cell basis.

The broadcast signal reception apparatus according to the present invention may perform a cell deinterleaving operation in the on-the-fly scheme together with the demapping operation.

A method for performing cell deinterleaving in the cell deinterleaver in an on-the-fly scheme is as follows.

The cell deinterleaver may receive cells on a cell basis instead of receiving the cells on FEC blocks basis. If the demapper performs demapping for each cell into a bit group, the cell deinterleaver may perform cell deinterleaving random writing. That is, if one cell is subjected to demapping by the demapper, cell deinterleaving may consecutively be performed for a bit group included in the corresponding cell.

The broadcast signal reception apparatus may perform random writing based on an address generated by the cell deinterleaver address generator. In this case, the memory in which the cell deinterleaver perform random writing may be FEC memory. The FEC memory means a memory for bit deinterleaving and FEC decoding.

That is, the broadcast signal reception apparatus may perform random writing operation in the FEC memory of a position corresponding to a cell deinterleaving address without writing the demapped bit group in a separate memory for cell deinterleaving.

Since demapping and cell deinterleaving random writing operations are performed in the on-the-fly scheme immediately and in real time, the receiver of the present invention may not need a separate memory for demapping and cell deinterleaving. As a result, the receiver may perform cell deinterleaving random writing by sharing the FEC memory.

The broadcast signal reception apparatus for performing cell deinterleaving on an FEC block basis operates as follows.

The cell deinterleaver needs a separate memory to perform cell deinterleaving. In this case, the memory means a memory existing separately from the aforementioned FEC memory, and has a size corresponding to two FEC blocks. This is because that a memory corresponding to a size of two FEC blocks is required to deinterleave FEC blocks cell interleaved differently from each other.

The cell deinterleaver performs a writing operation on a memory for cell deinterleaving. The cells output from the block deinterleaver are output to the memory for cell deinterleaving.

After the cell deinterleaving writing operation, the cell deinterleaver performs the writing operation from the memory for cell deinterleaving. The cell deinterleaved cells read from the memory are output to the demapper. In this way, the broadcast signal reception apparatus may perform cell deinterleaving on an FEC block basis, and may perform demapping after the cells included in each FEC block are deinterleaved.

After the cell deinterleaving reading operation, the demapper performs demapping for the read cells into bits.

After demapping, the bit deinterleaver performs an operation for writing the demapped bits in a memory. In this case, the memory is FEC memory for bit deinterleaving FEC decoding.

After the bit deinterleaving writing operation, the bit deinterleaver performs the writing operation from the memory for bit deinterleaving and FEC decoding.

After the bit deinterleaving reading operation, the FEC decoder performs FEC decoding for decoding the read bits.

The operation of the broadcast signal reception apparatus according to one embodiment of the present invention is as follows.

The block deinterleaved cells are output from the block deinterleaver.

Afterwards, demapping and cell deinterleaving are performed together in the on-the-fly scheme.

The demapper may perform an operation for demapping the output cells into a bit group, and the cell deinterleaver may perform a random writing operation for cell deinterleaving the demapped bit group. In this case, a target memory for random writing is FEC memory for bit deinterleaving and FEC decoding. In this way, the broadcast signal reception apparatus according to one embodiment of the present invention may sequentially perform deinterleaving and demapping on a cell basis not FEC block basis.

The bit deinterleaver may perform a bit deinterleaving reading operation for reading the cell deinterleaved bits.

The FEC decoder may perform FEC decoding for decoding the bit deinterleaved bits.

In FIG. 27, $C_i$ and $V_i$ are variable values, and indicate bits (or bit group) and vector (codeword) included in each cell.

3) After demapping and cell deinterleaving random writing for each cell, if bits of the FEC block are written in the FEC memory, the broadcast signal reception apparatus may consecutively perform bit deinterleaving and FEC decoding for the bits of the FEC memory.

Since the broadcast signal reception apparatus according to one embodiment of the present invention does not need a separate memory for performing a cell deinterleaving operation, memory efficiency of the receiver is increased.

Since the broadcast signal reception apparatus of the present invention performs demapping and cell deinterleaving random writing on the FEC memory in an on-the-fly scheme, if the cell deinterleaving random writing operation is performed for the FEC block, the bits subjected to demapping and cell deinterleaving may be written in the FEC memory.

As a result, after the cell deinterleaver performs random writing, the cell deinterleaving reading operation for outputting bits in the FEC memory may not be required.

That is, the cell deinterleaver may bypass cell deinterleaving linear reading. In other words, the broadcast signal reception apparatus may not perform the cell deinterleaving writing operation for the cell deinterleaving memory. Also, the broadcast signal reception apparatus does not need to perform a demapping operation by outputting bits to the demapper through a reading operation.

Since the broadcast signal reception apparatus according to one embodiment of the present invention performs cell deinterleaving random writing in the on-the-fly scheme, the broadcast signal reception apparatus may bypass cell deinterleaving linear reading.

After the cell deinterleaving random writing operation, the bits subjected to demapping and cell deinterleaving are written in the FEC memory for bit deinterleaving and FEC decoding. As a result, the bit deinterleaver may not need to perform the bit deinterleaving writing operation. The broadcast signal reception apparatus may perform FEC decoding after reading the bits written in the FEC memory. That is, after the broadcast signal reception apparatus performs demapping for the bits read from the cell deinterleaving memory, the broadcast signal reception apparatus may not need to perform the bit deinterleaving writing operation in the FEC memory.

The bit deinterleaver of the present invention may perform the bit deinterleaving reading operation. The bits read by the bit deinterleaver may be bits subjected to bit deinterleaving, and the FEC decoder may perform FEC decoding.

Figure 28:
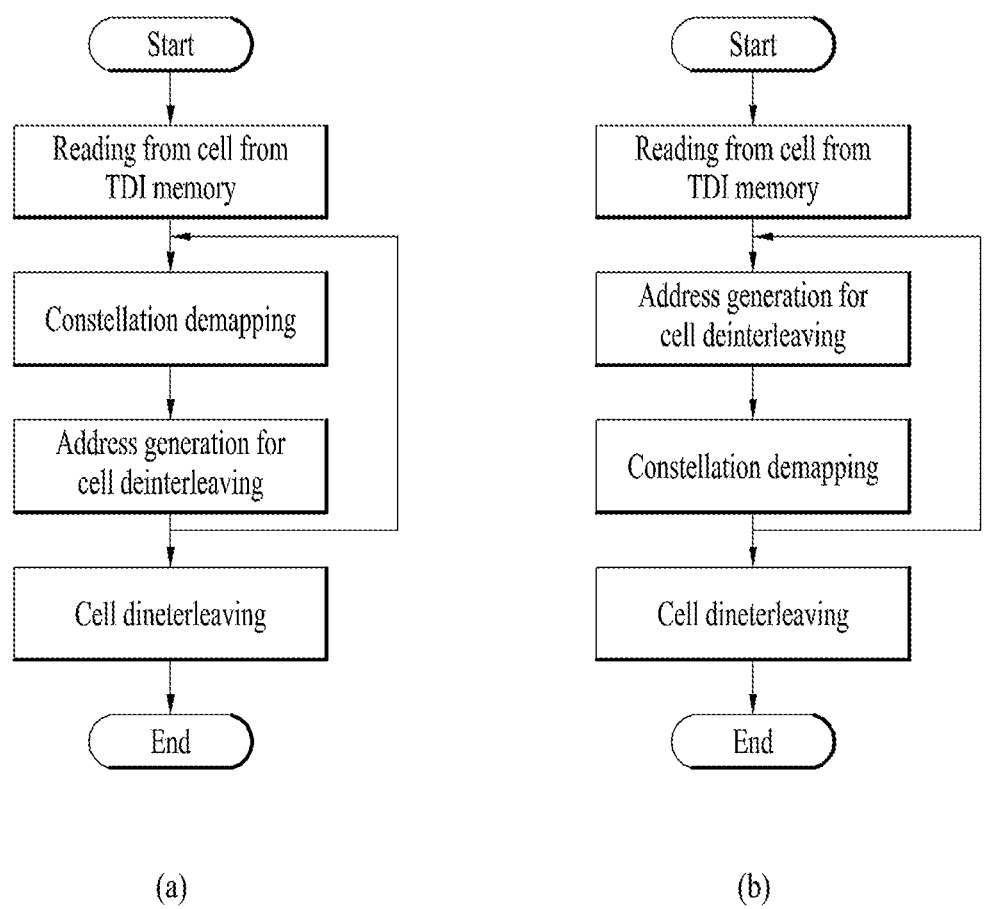
FIG. 28 is a diagram illustrating an operation of cell deinterleaving according to the present invention.

FIG. 28 illustrates an operation of cell deinterleaving according to one embodiment of the present invention.

Hereinafter, a cell deinterleaving method based on demapping and address generating will be described.

It is assumed that the receiver has successfully decoded preamble signaling information. Particularly, it is assumed that the receiver has successfully decoded L1 detail signaling information related to cell interleaving, that is, $N_{cells}$ (or LFDP size and modulation order) and the number of FEC blocks per TI block.

The cell deinterleaving method according to one embodiment of the present invention may perform deinterleaving based on an address value generated by the address generator. Since demapping and cell deinterleaving are together performed in the on-the-fly scheme, an order relation between demapping and address generating may mutually be exchanged as follows.

1) The broadcast signal reception apparatus read cells from a TDI memory. The demapper performs an operation for demappping block deinterleaved cells. Afterwards, the address generator may perform address generating for cell deinterleaving. The cell deinterleaver may perform cell deinterleaving random writing for each demapped bit group based on the generated address.

2) The broadcast signal reception apparatus read cells from the TDI memory. The address generator may perform address generating for cell deinterleaving. The demapper performs an operation for demappping block deinterleaved cells. The cell deinterleaver may perform cell determinterleaving random writing together with demapping based on the generated address.

FIG. 24(a) illustrates an operation of a cell deinterleaving method according to one embodiment of the present invention.

The broadcast signal reception apparatus according to one embodiment of the present invention may read cells from a block deinterleaving or twisted block deinterleaving (TDI) memory.

The demapper may perform demapping for each cell into a bit group. In this case, the bit group means a bits included in a cell.

The demapper may independently perform demapping for each cell. After reading a cell from the block deinterleaving memory, the demapper may perform demapping for the read cell.

The address generator may generate an address for cell deinterleaving. In this case, the generated address may mean a position where each cell is to be written in the FEC memory. The method for generating an address will be described in detail as below.

The cell deinterleaver may perform cell deinterleaving operation based on the generated cell deinterleaving address. In this case, the cell deinterleaving operation may be performed in such a manner that cell deinterleaving random writing is performed in the on-the-fly scheme.

The broadcast signal reception apparatus according to one embodiment of the present invention may independently and consecutively perform demapping and cell deinterleaving for each cell included in the FEC block. After performing demapping and address generating for a first cell, the broadcast signal reception apparatus may perform cell deinterleaving random writing for the first cell. While performing cell deinterleaving random writing for the first cell, the broadcast signal reception apparatus may perform demapping for a second cell, and may perform address generating.

FIG. 28(b) illustrates another embodiment of (a).

The broadcast signal reception apparatus according to one embodiment of the present invention may read cells from a block deinterleaving or twisted block deinterleaving (TDI) memory.

The address generator may perform address generation for cell deinterleaving. As described above, the generated address may mean a positon where each cell is to be written in the FEC memory.

The demapper may perform a demapping operation for demapping cells into a bit group. In this case, the bit group means a bits included in a cell. The demapper may independently perform demapping for each cell. The demapped bit group may be output to the cell deinterleaver.

The cell deinterleaver may perform an operation of cell deinterleaving based on the generated cell deinterleaving address. In this case, the cell deinterleaving operation may be performed in such a manner that cell deinterleaving random writing is performed in the on-the-fly scheme.

The broadcast signal reception apparatus according to one embodiment of the present invention may independently and consecutively perform demapping and cell deinterleaving for each cell included in the FEC block. After performing address generating and demapping for a first cell, the broadcast signal reception apparatus may perform cell deinterleaving random writing for the first cell. While performing cell deinterleaving random writing for the first cell, the broadcast signal reception apparatus may perform address generating for a second cell, and may perform demapping.

Next, the address generator of cell deinterleaving according to one embodiment of the present invention will be described.

A method for cell interleaving address generating is the same as a method for cell deinterleaving address generating.

1) The input of the cell deinterleaver is $G(r)=(g_{r,0}, g_{r,1}, g_{r,2}, \ldots, g_{r,Ncells-1})$ In this case, r indicates an increasing index of FEC block within TI block, and is reset to 0 at the start of each TI block.

Permutation or permutation sequence is varied per FEC block within the TI block. Each permutation sequence is determined by differently shifting one pseudo-random sequence.

The cell deinterleaver may perform a cell deinterleaving operation based on a permutation sequence. In this case, the permutation sequence may be referred to as a cell deinterleaving pattern or a cell deinterleaving sequence.

2) The output of the cell deinterleaver is $D(r)=(d_{r,0}, d_{r,1}, d_{r,2}, \ldots, d_{r,Ncells-1})$. In this case, $d_{r,q}$ is defined as Equation $d_{r,L_r(q)}=g_{r,q}$ ($q=0, 1, \ldots, N_{cells}-1$). The Equation means 1) random writing operation and 2) linear reading operation.

$L_r(q)$ is a permutation function applied to the rth FEC block of the TI block, and is given by Equation $L_r(q)=[L_0(q)+P(r)] \mod N_{cells}$. In this case, $L_0(q)$ is a basic permutation function for a first FEC block of the TI block, and $P(r)$ is a shift value used for the rth FEC block of the TI block.

3) A constant shift is added to basic permutation to generate different interleaving sequences on each FEC block.

4) The basic permutation function $L_0(q)$ is defined by the following algorithm. $N_d$ bit binary word $S_i$ is as follows.

For all: $S_i[N_d-1]=(i \mod 2)$, i=0,1: $S_i[N_d-2, N_d-3, \ldots, 1, 0]=[0, 0, \ldots, 0, 0]$, i=2: $S_2 [N_d-2, N_d-3, \ldots, 1,0]=[0,0, \ldots, 0, 1]$,
$2<i<2^{N_d}$: $S_i[N_d-3, N_d-4, \ldots, 1, 0]=S_i [N_d-2, N_d-3, \ldots, 2, 1]$, $N_d=11$: $S_i [9]=S_{i-1} [0] \oplus S_{i-1} [3]$,
$N_d=12$: $S_i [10]=S_{i-1} [0] \oplus S_{i-1} [2]$,
$N_d=13$: $S_i [11]=S_{i-1} [0] \oplus S_{i-1} [1] \oplus S_{i-1} [4] \oplus S_{i-1} [6]$,
$N_d=14$: $S_i [12]=S_{i-1}[0] \oplus S_{i-1}[1] \oplus S_{i-1}[4] \oplus S_{i-1}[5] \oplus S_{i-1}[9] \oplus S_{i-1}[11]$,
$N_d=15$: $S_i[13]=S_{i-1}[0] \oplus S_{i-1}[1] \oplus S_{i-1}[2] \oplus S_{i-1}[12]$ In this case, $N_d=\lceil \log_2 N_{cells} \rceil$. Sequence $L_0(q)$ is generated by discarding $S_i$ values greater than or equal to $N_{cells}$.

q=0;
for (i=0; i<$2^{N_d}$; i=i+1)
$\{L_0(q)=\Sigma_{j=0}^{N_d-1} S_i(j)2^j$;
if ($L_0(q)<N_{cells}$), q=q+1;}

The shift value P(r) applied to the rth FEC block is a decimally converted value of a bit reversed value of a counter k of a binary mark on $N_d$ bits. The counter is increased if the bit reversed value is too great.

$$k = 0;$$

$$\text{for } (r = 0; r < N_{FEC\_TI}(n, s): r++)$$

$$\{P(r) = N_{cells};$$

$$\text{while } (P(r) \geq N_{cells})$$

$$\{P(r) = \sum_{j=0}^{N_d-1} \left\lfloor \frac{k - \left\lfloor \frac{k}{2^{j+1}} \right\rfloor 2^{j+1}}{2^j} \right\rfloor 2^{N_d-1-j};$$

$$k = k + 1;\}\}$$

In this case, $N_{FEC\_TI}(n, s)$ is the number of FEC blocks in a TI block index 's' of an interleaving frame 'n'. For example, under the condition of $N_{cells}=10800$ and $N_d=14$, a shift value P(r) added to basic permutation (r=0, 1, 2, 3, etc.) may be 0, 8192, 4096, 2048, 10240, 6144, 1024, 9216, etc.

Figure 29:
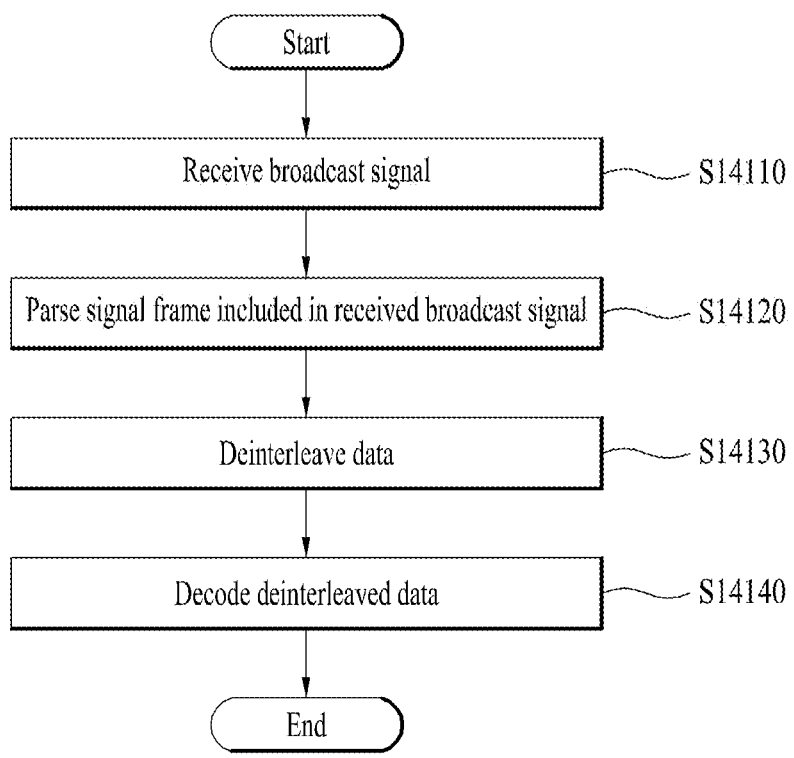
FIG. 29 is a diagram illustrating an operation method of a broadcast signal reception apparatus according to the present invention.

FIG. 29 is a diagram illustrating an operation method of a broadcast signal reception apparatus according to one embodiment of the present invention.

The broadcast signal reception apparatus may receive a broadcast signal (S114110).

The broadcast signal reception apparatus may receive a broadcast signal through RF using a tuner. The broadcast signal reception apparatus may demodulate the received broadcast signal in an OFDM scheme.

The broadcast signal reception apparatus may parse a signal frame included in the received broadcast signal (S14120).

The broadcast signal reception apparatus may parse the signal frame obtained from the demodulated broadcast signal by using a frame parser. The broadcast signal reception apparatus may acquire data included in the parsed signal frame.

The broadcast signal reception apparatus may deinterleave the acquired data (S14130).

The acquired data may be PLP data, and the broadcast signal reception apparatus may parse may perform deinterleaving.

The time deinterleaver included in the broadcast signal reception apparatus may perform time deinterleaving with reference to an interleaving parameter included in the information received through L1 signaling.

The broadcast signal reception apparatus according to one embodiment of the present invention performs time deinterleaving based on L1 signaling information.

If the received broadcast signal is subjected to time interleaving in HTI mode, the broadcast signal reception apparatus may perform deinterleaving, block deinterleaving, and/or cell deinterleaving.

The cell deinterleaver of the present invention may perform cell deinterleaving and demapping in the on-the-fly scheme.

Since the broadcast signal reception apparatus performs cell deinterleaving and demapping in the on-the-fly scheme, a separate memory for demapping and cell deinterleaving may not be used. That is, as the FEC memory may be used for sharing, memory efficiency may be enhanced.

Since bits of the FEC block are written on the FEC memory through the cell deinterleaving random writing operation, linear reading operation of cell deinterleaving and writing operation of bit deinterleaving may be bypassed.

The bit deinterleaver may perform reading operation of bit deinterleaving, and the FEC decoder may perform FEC decoding operation (S14140). As a result, decoding latency performance of the receiver may be enhanced.

The time deinterleaved PLP data may be decoded by a decoder. The time deinterleaved PLP data may be demapped by the symbol demapper on a bit basis before decoding, and may be bit deinterleaved by the bit deinterleaver. Through this procedure, the broadcast signal reception apparatus may provide a user with desired data.

As described above, the broadcast signal transmission apparatus and the broadcast signal reception apparatus according to the present invention may enhance robustness of the broadcast signal transmitted using time interleaving and time deinterleaving. As a result, the broadcast signal may have signal attenuation according to a property of a radio channel and a property robust to fading, and the broadcast signal transmission apparatus may provide a user with broadcast contents of high quality.

It is to be understood by those skilled in the art that various modifications and may be made in the present invention without departing from the spirits or range of the present invention. Therefore, the present invention is intended that the scope of the invention should be determined by the appended claims and their legal equivalents, not by the above description, and all changes coming within the meaning and equivalency range of the appended claims are intended to be embraced therein.

Modules or units may be processors executing consecutive processes stored in a memory (or a storage unit). The steps described in the aforementioned embodiments can be performed by hardware/processors. Modules/blocks/units described in the above embodiments can operate as hardware/processors. The methods proposed by the present invention can be executed as code. Such code can be written on a processor-readable storage medium and thus can be read by a processor provided by an apparatus.

While the embodiments have been described with reference to respective drawings for convenience, embodiments may be combined to implement a new embodiment. In addition, designing a computer-readable recording medium which stores programs for implementing the aforementioned embodiments is within the scope of the present invention.

The apparatus and method according to the present invention are not limited to the configurations and methods of the above-described embodiments and all or some of the embodiments may be selectively combined to obtain various modifications.

The methods proposed by the present invention may be implemented as processor-readable code stored in a processor-readable recording medium included in a network device. The processor-readable recording medium includes all kinds of recording media storing data readable by a processor. Examples of the processor-readable recording medium include a ROM, a RAM, a CD-ROM, a magnetic tape, a floppy disk, an optical data storage device and the like, and implementation as carrier waves such as transmission over the Internet. In addition, the processor-readable recording medium may be distributed to computer systems connected through a network, stored and executed as code readable in a distributed manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both the apparatus and method inventions may be complementarily applied to each other.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, not by the above description, and all changes coming within the meaning and equivalency range of the appended claims are intended to be embraced therein.

In the specification, both the apparatus invention and the method invention are mentioned and description of both the apparatus invention and the method invention can be applied complementarily.

Mode for Implementing the Invention

As described above, the matters related in the best mode for implementing the invention have been described.

INDUSTRIAL APPLICABILITY

As described above, the present invention may entirely or partially be applied to a digital broadcast transmission and reception apparatus or system.

Also, the person of the present invention may apply various modifications within the range of the present invention. That is, the present invention may include the aforementioned modifications, which no not depart from claims and their equivalents.

The invention claimed is:

1. A broadcast signal reception method performed by an apparatus comprising the steps of:
receiving a broadcast signal;
demodulating the received broadcast signal;
parsing at least one signal frame from the demodulated broadcast signal;
convolutionally deinterleaving data in the at least one parsed signal frame;
block deinterleaving the convolutionally deinterleaved data;
demapping the block deinterleaved data;
cell deinterleaving the demapped data using an Forward Error Correction (FEC) memory that is a memory for FEC decoding the cell deinterleaved data, wherein the cell deinterleaving includes random writing the demapped data into the FEC memory,
wherein the random writing is performed based on a permutation sequence and the permutation sequence varies for every FEC block of the demapped data; and
FEC decoding the cell deinterleaved data.

2. The broadcast signal receiving method of claim 1, wherein the demapping step demaps the block deinterleaved data into a bit group.

3. The broadcast signal receiving method of claim 2, wherein the random writing step includes random writing in the FEC memory on a basis of the bit group.

4. The broadcast signal receiving method of claim 1, wherein the FEC memory includes two decoding memories, and the random writing step includes random writing in a first decoding memory based on a first permutation and random writing in a second decoding memory based on a second permutation.

5. The broadcast signal receiving method of claim 4, wherein the first permutation is a random sequence generated by an address generator, and the second permutation is generated by adding a shift value to the first permutation.

6. A broadcast signal reception apparatus comprising:
a receiver configured to receive a broadcast signal;
a demodulator configured to demodulate the received broadcast signal;
a parser configured to parse at least one signal frame from the demodulated broadcast signal;
a convolutional deinterleaver configured to convolutionally deinterleave data in the at least one parsed signal frame;
a block deinterleaver configured to block deinterleave the convolutionally deinterleaved data;
a demapper configured to demap the block deinterleaved data;
a cell deinterleaver configured to cell deinterleave the demapped data using an Forward Error Correction (FEC) memory that is a memory for FEC decoding the cell deinterleaved data, wherein the cell deinterleaving includes random writing the demapped data into the FEC memory,
wherein the random writing is performed based on a permutation sequence and the permutation sequence varies for every FEC block of the demapped data; and
an FEC decoder configured to decode the cell deinterleaved data.

7. The broadcast signal reception apparatus of claim 6, wherein the demapper demaps the block deinterleaved data into a bit group.

8. The broadcast signal reception apparatus of claim 7, wherein the cell deinterleaver performs random writing in the FEC memory on a basis of the bit group.

9. The broadcast signal reception apparatus of claim 6, wherein the FEC memory includes two decoding memories, and the cell deinterleaver performs random writing in a first decoding memory based on a first permutation and random writing in a second decoding memory based on a second permutation.

10. The broadcast signal reception apparatus of claim 9, wherein the first permutation is a random sequence generated by an address generator, and the second permutation is generated by adding a shift value to the first permutation.

11. A broadcast signal reception method performed by an apparatus comprising the steps of:
- receiving a broadcast signal;
- demodulating the received broadcast signal;
- parsing at least one signal frame from the demodulated broadcast signal;
- convolutionally deinterleaving data in the at least one parsed signal frame;
- block deinterleaving the convolutionally deinterleaved data;
- processing the block deinterleaved data by performing at least one of cell deinterleaving operation and demapping operation using one or more Forward Error Correction (FEC) memories, wherein the cell deinterleaving operation includes random writing operation based on a permutation sequence and linear reading operation and the permutation sequence varies for every FEC block of the demapped data; and
- FEC decoding the processed data using the one or more FEC memories.

12. The broadcast signal receiving method of claim 11, wherein:
- in response to the demapping operation performed on the block deinterleaved data before the cell deinterleaving operation, the cell deinterleaving operation is performed on cells of the demapped data; and
- in response to the cell deinterleaving operation performed on the block deinterleaved data before the demapping operation, the demapping operation is performed on the cell deinterleaved data.

13. A broadcast signal reception apparatus comprising:
- a receiver for receiving a broadcast signal;
- a demodulator for demodulating the received broadcast signal;
- a parser for parsing at least one signal frame from the demodulated broadcast signal;
- a convolutional deinterleaver for convolutionally deinterleaving data in the at least one parsed signal frame;
- a block deinterleaver for block deinterleaving the convolutionally deinterleaved data;
- a processor for processing the block deinterleaved data by performing at least one of cell deinterleaving operation and demapping operation using one or more Forward Error Correction (FEC) memories, wherein the cell deinterleaving operation includes random writing operation based on a permutation sequence and linear reading operation and the permutation sequence varies for every FEC block of the demapped data; and
- an FEC decoder for decoding the processed data using the one or more FEC memories.

14. The broadcast signal reception apparatus of claim 13, wherein:
- in response to the demapping operation performed on the block deinterleaved data before the cell deinterleaving operation, the cell deinterleaving operation is performed on cells of the demapped data; and
- in response to the cell deinterleaving operation performed on the block deinterleaved data before the demapping operation, the demapping operation is performed on the cell deinterleaved data.

* * * * *